US006807012B2

(12) United States Patent
Marco

(10) Patent No.: US 6,807,012 B2
(45) Date of Patent: Oct. 19, 2004

(54) DISPLAY DEVICE

(75) Inventor: Doron Marco, Modi'in (IL)

(73) Assignee: Adact Ltd., Modi'in (IL)

(*) Notice: Subject to any disclaimer, the term of this patent is extended or adjusted under 35 U.S.C. 154(b) by 0 days.

(21) Appl. No.: 10/187,767

(22) Filed: Jul. 2, 2002

(65) Prior Publication Data

US 2003/0002126 A1 Jan. 2, 2003

Related U.S. Application Data

(62) Division of application No. 09/555,080, filed on Jul. 24, 2000, now Pat. No. 6,426,826.

(30) Foreign Application Priority Data

Nov. 23, 1997 (IL) ........................................ 122275
Jun. 30, 1998 (IL) ........................................ 125169

(51) Int. Cl.[7] .......................... G02B 26/00; G02B 15/14

(52) U.S. Cl. ....................... 359/676; 359/290; 359/291; 359/292

(58) Field of Search ................................ 359/676, 290, 359/291, 292, 245, 261, 237, 197, 209, 211, 212, 222, 251, 253, 254, 275, 272; 345/55, 72

(56) References Cited

U.S. PATENT DOCUMENTS

| | | | | |
|---|---|---|---|---|
| 4,275,521 A | | 6/1981 | Gerstenberger et al. | 42/84 |
| 4,292,615 A | | 9/1981 | Ohashi | 335/205 |
| 4,688,900 A | | 8/1987 | Doane et al. | 350/347 |
| 5,198,628 A | | 3/1993 | Bitko | 200/61.47 |
| 5,523,776 A | * | 6/1996 | Hougham et al. | 345/211 |
| 5,661,531 A | * | 8/1997 | Greene et al. | 349/73 |
| 5,781,330 A | * | 7/1998 | Kolodner et al. | 359/273 |
| 5,962,975 A | * | 10/1999 | Lepselter | 313/586 |
| 6,014,246 A | * | 1/2000 | Asher et al. | 359/288 |
| 6,020,866 A | * | 2/2000 | Yamaguchi | 345/86 |
| 6,034,659 A | * | 3/2000 | Wald et al. | 345/76 |
| 6,100,478 A | * | 8/2000 | LaPointe et al. | 200/314 |
| 6,104,361 A | * | 8/2000 | Rutherford | 345/55 |
| 6,184,849 B1 | * | 2/2001 | Stroller | 345/72 |
| 6,262,378 B1 | | 7/2001 | Chou | 200/4 |
| 6,271,488 B1 | | 8/2001 | Sasaki | 200/4 |
| 6,297,590 B1 | * | 10/2001 | Nanto et al. | 313/586 |
| 6,306,510 B1 | * | 10/2001 | Verlinden et al. | 428/426 |
| 6,310,813 B1 | * | 10/2001 | Bae | 365/222 |

FOREIGN PATENT DOCUMENTS

| | | |
|---|---|---|
| EP | 0764966 | 3/1997 |
| GB | 2314169 | 12/1997 |
| JP | 56035029 | 4/1981 |
| JP | 01086116 | 3/1989 |
| JP | 01232694 | 9/1989 |

* cited by examiner

*Primary Examiner*—Tim Thompson
(74) *Attorney, Agent, or Firm*—Baker Botts LLP

(57) ABSTRACT

A picture display device is disclosed comprising a suitable substrate carrying a plurality of color cells wherein each color cell is capable of exhibiting a change in its external color from a first color to a second color and/or of emitting electromagnetic energy at least in the form of visible light. Each said color cell comprises color change and/or luminescent means characterized in enabling said cell to exhibit a color change from said first color to said second color and/or in enabling said cell to emit electromagnetic energy at least in the form of visible light in correlation to the application of electrical current and/or voltage to the said cell; suitable electrical connections electrically connectable to a suitable electrical power supply and adapted to provide said color cell with a suitable electrical current and/or voltage; said device characterized in being substantially disposable.

2 Claims, 22 Drawing Sheets

DISPLAY DEVICE

This application is a divisional of U.S. application Ser. No. 09/555,080, filed Jul. 24, 2000, now U.S. Pat. No. 6,426,826.

FIELD OF INVENTION

The present invention relates to display devices, in particular thin picture display devices capable of providing the illusion of moving pictures. The present invention also relates to such display devices which are particularly economic to produce and which may also be disposable.

BACKGROUND

Display devices capable of providing the illusion of moving pictures are well known, and include projectors (both cinematographical as well as tele-video), used typically in the cinema and in large tele-video displays; cathode ray tubes used extensively in Television sets and in computer display screens; liquid crystal displays (LCD's), used extensively in notebook and laptop computers; light-emitting diodes (LED's), used for very large displays; field emission displays and vacuum fluorescent displays among others.

Prior art display devices are relatively complex items and are thus relatively expensive to manufacture. While LCD's for example have been steadily reducing in price over recent years, primarily due to the explosion in the demand for laptop, palmtop and notebook computers worldwide, they are still relatively expensive items costing between tens and hundreds of dollars to manufacture, and in some cases much more. Most certainly the screens used in such applications have a relatively long life, being generally serviceable and intended to be used repeatedly, and are thus never contemplated as disposable items in the sense of being used once or at most several times only, to be discarded after such limited use without significant economic loss. Therefore, display devices have not been incorporated in a host of many and varied applications in which they could provide an advantage since the costs heretofore associated with such prior art devices render their use in such applications totally uneconomic.

For example, the packaging of consumer products has traditionally taken the form of a static visual image, printed onto a suitable packaging material, designed to enable a consumer to readily identify the product and manufacturer thereof, and to appeal to potential customers. The use of motion pictures in attracting the attention of potential customers to a given product is a very powerful marketing tool, and is used extensively in the form of televideo advertising. However, the drawback in such advertising is that it does not generally occur at the point of sale, but rather when the potential customer is at home. While broadcasting tele-video advertisements in a store may attract potential customers to a particular product in some measure, customers do not in general tend to watch such televised advertisements while actually shopping. Further, tele-video advertising in a store does not necessarily overcome broadcast problems relating to the advertising of material, or material of interest, with respect to all goods simultaneously, or even regarding the goods in which a customer may be interested on any particular day. Product advertising on the product itself and by means of a display device capable of providing the illusion of moving pictures is herein considered to be a powerful advertising tool at the point of sale, and therefore potentially a very valuable marketing tool. However to be economically viable, such a display device has to be very inexpensive to manufacture.

Thus, it is an aim of the present invention to provide a picture display device capable of displaying moving pictures at very low cost.

It is another aim of the present invention to provide a low-cost picture display device capable of displaying a single image when desired by a user.

It is another aim of the present invention to provide a low-cost picture display device capable of displaying a series of images, one at a time, in any order desired by the user.

It is also an aim of the present invention to provide such a device which may be attached to the packaging of a very wide variety of products, or optionally which may be integral with the said packaging.

In addition to on-product advertising, there are many and varied applications in which such a low-cost picture display device, in particular capable of providing moving pictures or at least a series of pictures, would be very advantageous.

For example, there are certain types of lottery tickets in general use in which the user has to rub off certain portions of the ticket to uncover a hidden message or characters. If the message or character matches a predetermined format, then the user is declared a winner. Such lottery tickets could take the form of a picture display device, in which only, say, one or a series of pictures may be viewed. A user would activate the picture by actuating a switch, for example, and the picture that is then displayed is compared to the winning image format.

It is thus another aim of the present invention to provide a low-cost picture display device adapted for use as a lottery ticket.

Bill boards, of all sizes—some rather large are used for advertising along the sides of streets and highways, and usually comprise a poster featuring a particular visual image and/or message. Some billboards are more sophisticated and enable up to 3 different images or messages to be displayed on the same bill board, by dividing the billboard into a series of parallel adjacent prismatic elements, triangular in transverse cross section and pivotable about a longitudinal axis. The prismatic elements can then be rotated about the pivot axes to display, in turn, each of the corresponding first, second and third faces of adjacent elements, thereby displaying one of three different visual images or messages in cycles. Low-cost picture display devices capable of providing moving images on a bill-board-sized display would thus enable the advertising of products, services or notices, for example, in the form of a large-scale tele-video presentation, perhaps similar to television or cinema commercials. Such a device, particularly if low-cost, would radically change the face of billboard advertising.

Another possible application of such a low-cost picture display device includes traffic and street signs. In particular, such a display device would be particularly advantageous where the nature of the message displayed by the street signs needs to be periodically changed, particularly cyclically. For example, on a street zone in which parking is only permitted on certain times of the day, such a display device may incorporate two images, say, one denoting the area as a parking zone, and the other image denoting a no-parking zone. A chronometer connected to the device enables either one or the other sign to be displayed at the appropriate times.

It is thus another aim of the present invention to provide a picture display device, in particular a low-cost picture device, adapted for use as an outdoors bill-board for advertising, for use as traffic/street signs, as well as for other related uses.

Postcards and greeting cards, such as birthday cards for example, are also traditionally static visual images printed onto a stiff substrate. Postcards and greeting cards adapted to incorporate picture display devices capable of providing moving images on the cards at low cost would have a radical impact in the postcard and greeting card market.

It is thus another aim of the present invention to provide a low-cost picture display device adapted for use as post-cards and as greeting cards of every variety, including personal and seasonal greeting cards.

Similarly low-cost picture display devices capable of providing moving images, or at least a series of static images, could provide a very attractive alternative to displaying material now commonly found in books, and in particular comics, magazines and brochures (e.g., travel brochures, motorcar brochures etc.). Such devices could optionally display images or information as a moving picture, or optionally as a series of images, appearing one at a time as desired by the user, specially when the images represent printed matter as, for example, the pages of a book.

It is thus another aim of the present invention to provide a low-cost picture display device adapted for use to display material commonly found in books, comics, magazines, brochures and other printed matter.

Another possible application of low-cost picture display devices capable of providing moving images is as a means of providing easy-to-follow instructions. For example, instructions on how to assemble an item of furniture could be incorporated into such a device as a series of images, in which each image, or a set of images, represents a different stage in the assembly. Each instruction can then be viewed by the user at will.

It is thus another aim of the present invention to provide a low-cost picture display device adapted for use as an instruction manual.

It is also another aim of the present invention to provide a picture display device adapted for displaying video images, including for example movies. In particular, it is an aim of the present invention to provide a low-cost picture display device for displaying said video images.

It is also another aim of the present invention to provide a picture display device adapted for displaying computer generated images. It is also an aim of the present invention to provide a low-cost picture display device for displaying computer generated images. In particular, it is also an aim of the present invention to provide a picture display screen capable of being used in conjunction with computers, including desk-top, lap-top, notebook and palm-top computers.

It is also another aim of the present invention to provide such low-cost picture devices which are disposable, particularly in an environment-friendly manner.

The above aims of the present invention are achieved with a revolutionary picture display device based on a substrate carrying a plurality of cells each of which can exhibit a change in colour and/or emit light as a direct or indirect result of the passage of a suitable electric current through the cell and/or the application of a suitable electric voltage to the cell. The cells each comprise electrical input and output connections which enable the cells to be connected to an electrical power source. The cells themselves comprise configurations which are relatively simple and inexpensive to manufacture. By selectively choosing some cells to change colour at given times, a sequence of images, or the illusion of a moving picture may be created on the device. The device may thus be operatively connected to a suitable computer to operate as a computer screen or to a television/video system to operate as a viewing screen. Alternatively, the device may be adapted to display still and/or moving images in a very cost-effective manner by connecting the chosen colour cells for each "picture frame" or image to the suitable electrical power source by means of a simple frame circuit board which comprises a unique circuit to connect the power source to the chosen cells. The device thus comprises a plurality of frame circuit boards, each frame circuit board providing all the necessary connections between the power source and the chosen cells of the device per frame. The power source can then be connected to each frame circuit board at will by the user, thereby providing a series of still images. Alternatively, a sequencing switch may be used to connect each of the frame circuit boards to the power source in a predetermined sequence and at a predetermined rate to enable the illusion of a moving image to be provided. The substrate may be flexible and thus enable the device to be particularly adaptable to being used in connection with product packaging such as cartons, bottles and the like. Alternatively, the substrate may also be rigid or semi rigid, enabling the device to be particularly adaptable for use in connection with such uses as computer screens, bill-boards and the like.

The present invention thus also relates to frame circuit boards as a simple and inexpensive method of connecting a power source to a picture display device.

The present invention also relates to novel sequencing switches enabling connections between at least one electrical conductor and each of a plurality of conductors to be effected sequentially at a variable rate and in a cost effective manner, particularly adaptable to be used in printed circuits and microcircuits. In particular, the present invention relates to sequencing switch means capable of interconnecting a power source to each one of a plurality of frame circuit boards of said device.

DESCRIPTION

Figure 1:
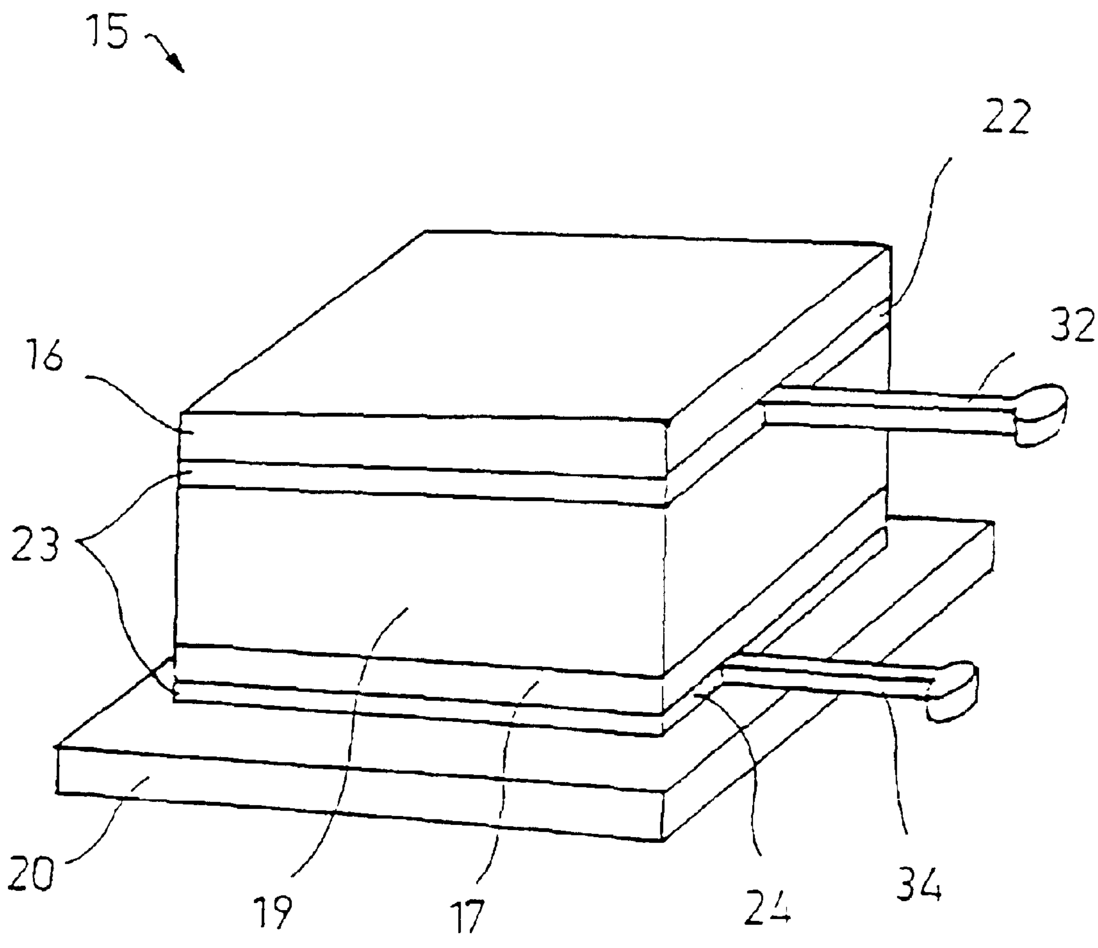
FIG. 1 illustrates in perspective view a colour cell according to the first aspect of the preferred embodiment of the present invention.

The present invention is defined by the claims, the contents of which are to be read as included within the disclosure of the specification, and will now be described by way of example with reference to the accompanying Figures.

The present invention relates to picture display devices, in particular such devices capable of providing the illusion of moving pictures. The display devices of the present invention may be of substantially any size and shape, comprising a plurality of colour cells carried on a suitable substrate. Each of the colour cells is capable of exhibiting a change in its external colour and/or emitting electromagnetic energy at least in the form of visible light, either as a direct or indirect result of the passage of a suitable electrical current through the cell and/or the application of a suitable voltage to the cell.

The term “colour change” herein relates to a change from a colour to colourless (i.e., transparent), and also from colourless to a colour, as well as from one colour to another colour.

In particular, the present invention relates to such picture display devices which are particularly low cost items to manufacture.

Further, the display device of the present invention is preferably made from materials that are recyclable, particularly in an environmentally-friendly manner.

The present invention relates to a picture display device comprising a suitable substrate carrying a plurality of colour cells wherein each colour cell is capable of exhibiting a change in its external colour from a first colour to a second colour and/or of emitting electromagnetic energy at least in the form of visible light, each said colour cell comprising:

- colour change and/or luminescent means characterised in enabling said cell to exhibit a colour change from said first colour to said second colour and/or in enabling said cell to emit electromagnetic energy at least in the form of visible light in correlation to the application of electrical current and/or voltage to the said cell;
- suitable electrical connections electrically connectable to a suitable electrical power supply and adapted to provide said colour cell with a suitable electrical current and/or voltage;
- said device characterised in being substantially disposable.

The term “disposable” in the present application means that the display devices are designed such as to be able to be thrown away after one or more uses with only negligible loss.

In the preferred through eighth embodiments of the invention, particularly as described in detail herein, the colour cells are considered as being of relatively small size, corresponding roughly in size to a television/monitor screen pixel (i.e., approximately 0.2 mm), or preferably a fraction thereof. Nonetheless, cell size is not a limitation, and in fact, the cells can be considerably larger, several tens of centimeters across or far larger, for example, depending primarily on the actual application, the resolution required, and on the expected viewing distance from the observer to the device itself. Thus, in applications such as product advertising on the product packaging itself, such as for example a cereal packet, the device of the present invention may be relatively small, perhaps half the size of one of the large faces of the packet for example, and the individual colour cells may be of a size in the order of that of regular television/monitor screen pixels. For product advertising such as on a large bill-board posted along highways, for example, each cell may be considerably larger, though a large cell may alternatively be made up of a plurality of smaller cells which are operated as a unit.

The present invention relates to a picture display device comprising a suitable substrate carrying a plurality of colour cells wherein each colour cell is capable of emitting electromagnetic energy at least in the form of visible light, each said colour cell comprising:

at least one pair of electrodes comprising a lower electrode comprised on said substrate and an upper electrode superposed and distanced from said lower electrode;

said at least one pair of electrodes capable of being electrically connected to at least one suitable electrical power source capable of providing at least a predetermined voltage and/or current between said upper electrode and said lower electrode of said at least one pair of electrodes;

at least one dielectric layer comprised of suitable dielectric material disposed intermediate said upper electrode and said lower electrode of said at least one pair of electrodes;

wherein said dielectric layer comprises at least one luminescent layer of luminescent material substantially parallel to and in electrical contact with at least one of said upper electrode and said lower electrode of said at least one pair of electrodes, said at least one luminescent layer being capable of emitting electromagnetic energy at least in the form of visible light in response to the establishment of said predetermined voltage and/or current between said upper electrode and said lower electrode of said at least one pair of electrodes, wherein said emission of said visible light is of sufficient intensity as to be capable of being observed from the exterior of said colour cell.

In other words, in the first embodiment of the present invention, the said suitable electrical connections comprises an electrically heatable base comprising at least one suitable electrical input connection means and at least one suitable electrical output connection means capable of connecting said base to a suitable electrical power source, said base capable of being electrically heated at least from a first temperature to at least a second temperature in response to the supply of a predetermined voltage and/or current thereto; and furthermore, the said colour change and/or luminescent means comprises thermally responsive colour change means in thermal contact with said base, said colour change means enabling said cell to exhibit a colour change from said first colour to said second colour in response to said temperature change of the said base from said first temperature to said at least second temperature.

Figure 2:
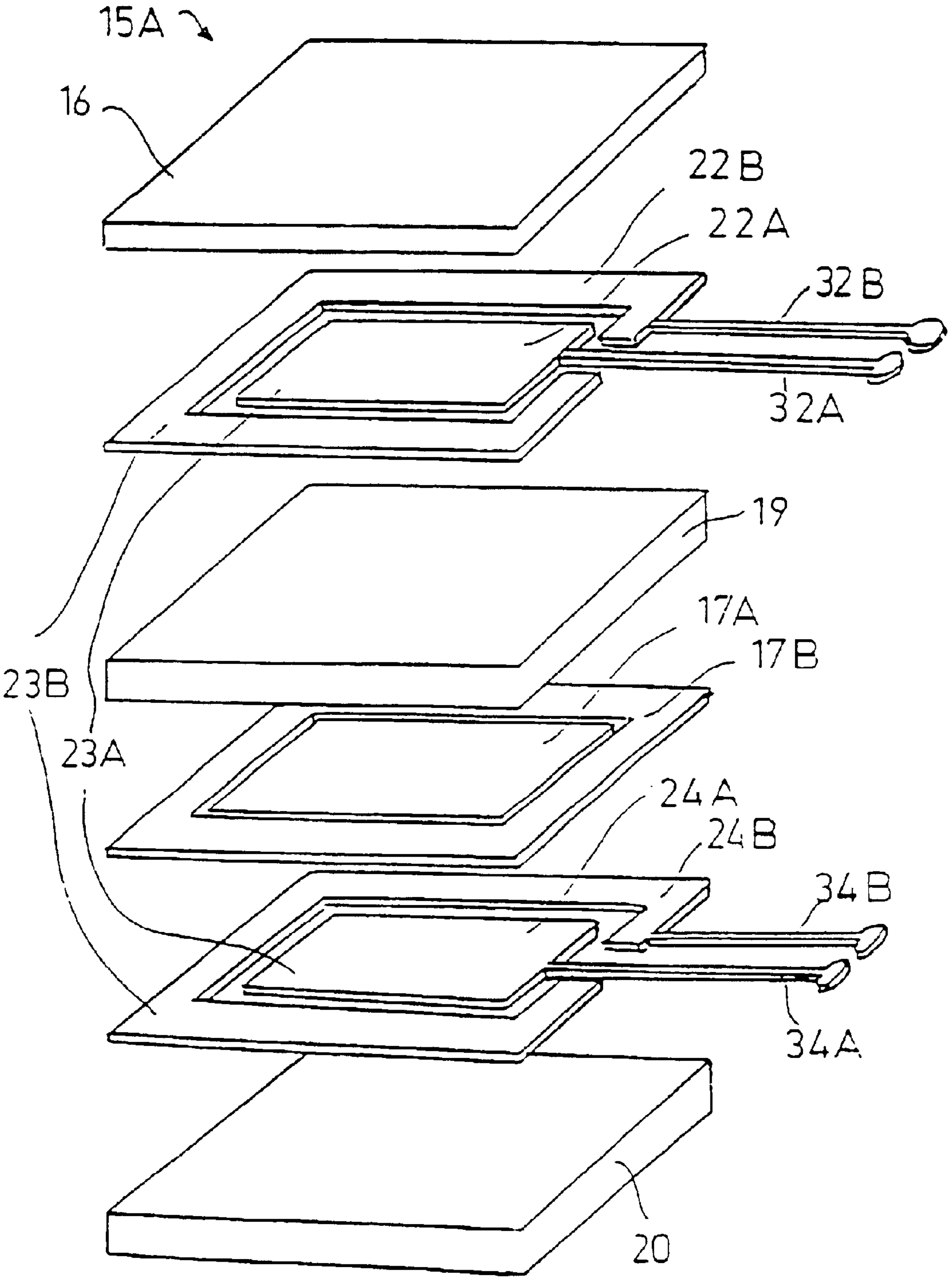
FIG. 2 illustrates in exploded perspective view a colour cell according to the second aspect of the preferred embodiment of the present invention.

Thus, in the preferred embodiment of the present invention, and with reference to FIGS. 1 and 2, the display device, generally designated (10) comprises a suitable substrate (20) carrying a plurality of colour cells, designated (15) and (15A) for the first and second aspects of the preferred embodiment, respectively.

The substrate (20) is typically made from a non-conducting material, but may be made from a conducting or semi-conducting material having a layer of insulating material between the substrate and the cell. Typically, the substrate (20) is substantially flexible, but may also be substantially rigid or semi rigid, depending on the desired physical characteristics and application, and may thus comprise, for example, any one of the following materials: PVC, polypropylene, nylon, ABS, polyethylene, and silicon, among others. In each of the embodiments described herein, each colour cell is electrically insulated from adjacent colour cells. Thus, at least the corresponding electrically conducting elements of adjacent colour cells are insulated one from another. Such insulation may be achieved by means of an insulating material placed between corresponding or adjacent electrically conducting elements of adjacent colour cells, or alternatively by means of a non-conducting space existing between at least corresponding or adjacent electrically conducting elements of adjacent colour cells.

Thus, and with reference to FIG. 1, in a first aspect of a preferred embodiment of the present invention, the picture display device (10) comprises a suitable substrate (20) carrying a plurality of colour cells (15), wherein each of the colour cells is capable of emitting electromagnetic energy at least in the form of visible light, said emission being correlated to the application of a predetermined electrical voltage across the colour cell (15), or alternatively to the passage of a predetermined current therethrough. This predetermined voltage (or current) is the threshold voltage (or current, respectively) for the luminescent layer hereinafter described, and no significant emission of light occurs at voltages (or currents, respectively) below this. Each colour cell (15) of this embodiment comprises at least one pair of substantially parallel and preferably substantially flat and thin electrodes (23), comprising a lower electrode (24) comprised on said substrate (20) and an upper electrode (22) superposed over and distanced from said lower electrode (24). The said at least one pair of electrodes (23) is capable of being electrically connected, preferably by means of suitable conductors, (32) and (34), respectively, to at least one suitable electrical power source, which power source is capable of providing at least a predetermined voltage (Vp), and/or a suitable predetermined current, between said upper electrode (22) and said lower electrode (24) of said at least one pair of electrodes (23). Adjacent upper electrodes (22) of adjacent cells (15) are electrically insulated one from another, as are adjacent lower electrodes (24) of adjacent cells, typically by means of suitable insulating material or a suitable gap between adjacent electrodes or in any other suitable manner. The colour cell (15) further comprises at least one dielectric layer (19) comprised of suitable dielectric material, and the dielectric layer (19) is disposed intermediate said upper electrode (22) and said lower electrode (24) of said at least one pair of electrodes (23). While the pair of electrodes (23) are discretely defined for each cell (15), the dielectric layer (19), being essentially an insulating layer between the pair of electrodes (23), can be contiguous across the whole or part of the display device (10), as desired. The said dielectric layer (19) comprises at least one luminescent layer (17) of luminescent material substantially parallel to and in electrical contact with at least one of said upper electrode (22) and said lower electrode (24) of said at least one pair of electrodes (23). Thus, the luminescent layer (17) may be sandwiched between the upper electrode (22) and the dielectric layer (19) or alternatively between the lower electrode (24) and the dielectric layer (19). In any case, the luminescent layer (17) may alternatively be in the form of a contiguous layer across part or all of the device (10), or alternatively in the form of a single or a plurality of segments comprising an area similar to the plan area of the upper electrode (22) or lower electrode (24), and in corresponding alignment therewith. The said luminescent layer (17) is capable of emitting electromagnetic energy at least in the form of visible light in response to the establishment of said predetermined voltage (Vp) between said upper electrode (22) and said lower electrode (24) of said at least one pair of electrodes (24). Typically, the threshold value for the voltage between the electrodes is in the range of from about 105V to 110V in order for the luminescent layer (17) to emit visible light, and thus the value of said predetermined voltage (Vp) is likewise in the range of from about 105V to 110V, though (Vp) can be greater than 110V or smaller than 105V, according to the properties of the luminescent material comprising the said luminescent layer (17). The said emission of said visible light is of sufficient intensity such as to be capable of being observed from the exterior of said colour cell (15), and thus, there is an open optical path from the said luminescent layer (17) to the exterior of the cell (15). In other words, at least the said upper electrode (22) of said at least one pair of electrodes (23) is in optical communication with said luminescent layer (17), e.g., the said upper electrode (22) is essentially transparent; and similarly, the dielectric layer (19) is also in optical communication with said luminescent layer (17) and the upper electrode (22), e.g., the dielectric layer (19) is also essentially transparent, when the said dielectric layer (19) is sandwiched between the luminescent layer (17) and the upper electrode (22).

Optionally, the said luminescent layer (17) is made from a material having luminescent properties such that the emission of said visible light by said cell (15) ceases in correlation with the voltage between said upper electrode and said lower electrode of said at least one pair of electrodes falling to substantially below a predetermined voltage threshold, typically said predetermined voltage (Vp). Thus, the cell (15) is only capable of emitting visible light when a voltage potential of (Vp) or greater is applied between the pair of electrodes (23), and ceases to emit when the voltage drops to below (Vp). As such the cell (15) is able to respond quickly to changes in the voltage applied thereto, and therefore to changes in the correspond part of the image being displayed by the device (10). Some types of cells (15) may operate optionally or additionally on the basis of an electrical current threshold, mutatis mutandis.

Alternatively, the said luminescent layer (17) is made from a material having luminescent properties such that the emission of said visible light by said cell (17) endures for a period of time, typically with decaying intensity, after the voltage between said upper electrode (22) and said lower electrode (24) of said at least one pair of electrodes (23) falls to substantially below a predetermined voltage threshold, typically, said predetermined voltage (Vp). Thus, even though a voltage of (Vp) is required to initialise emission of light by the cell (15), emission persists for a limited time after the voltage is removed or significantly lowered, and this effect is also known as "afterglow". Thus, the cell (15) enables light to be emitted for longer than the time for which the predetermined voltage (Vp) is applied thereto, and the actual duration of the afterglow may be determined, for example, by the specific properties of the luminescent material, as well as other factors including the thickness of the luminescent layer (17) and the magnitude of the voltage and/or current applied thereto. One important advantage of the afterglow effect in the context of said display device (10) is that it reduces or avoids the necessity of having to refresh any particular pixel, or group of pixels, which needs to be in activated mode for extended periods. In some applications, only a small percentage of pixels in a screen need to be activated/deactivated from frame to frame in the course of displaying a moving image, the remaining pixels requiring to continue as activated or as deactivated. Thus, in video movies, computer games, etc., most pixels need to continue in either the activated or deactivated mode unchanged from frame to frame, though not the same pixels necessarily need to change mode with every subsequent new frame. Normally, even the pixels which preserve their activated mode from frame to frame also need to be refreshed from frame to frame, otherwise they will become deactivated through the lack of voltage and/or current being provided to the corresponding colour cells, and thus all of the cells which need to be in activated mode for each frame need to be activated for the frame. This results in a great deal of memory being required to define each frame, when a microprocessor (19) is used to control the sequencing of images, as described hereinbelow, for example. Cells (15) comprising a luminescent layer (17) capable of providing afterglow for a period of time T are therefore able to perform like corresponding "non-afterglow" colour cells (15) while only needing to be activated about 1/T as often to provide the same effect. Thus, since the precise duty of any cell (15) in the device (10) can be predetermined for any given application, then, by providing cells (15) capable of providing afterglow at locations where the cells are required to remain activated for extended periods saves the corresponding memory space which would otherwise be required to reactivate a "non-afterglow" colour cell continuously during the same period. However, since in many applications all the pixels will eventually change their activated/deactivated mode, the device (10) may be advantageously divided into a number of pairs of, say adjacent, cells (15), in which one cell (15) of each pair is capable of providing afterglow, while the other is not. Alternatively, the device may comprise colour cells (15A) with nested luminescent layers (17A) and (17B), in which one thereof is capable of providing afterglow, according to the second aspect of the preferred embodiment of the present invention as hereinafter described. Thus, at every location of the display (10) the cell capable of providing afterglow is activated as required to maintain a pixel of an image activated for extended periods, while the adjacent or nested cell, which doesn't provide afterglow, is activated when substantially rapid changes in the activation/deactivation mode of the corresponding pixel are imminent or required. Some types of cells (15) may operate optionally or additionally on the basis of an electrical current threshold, mutatis mutandis.

Typically, said luminescent layer (17) comprises a suitable luminescent and/or phosphorescent material, such as, for example, zinc sulphide activated with silver or copper, or alternatively zinc silicate activated with manganese, among others.

The luminescent material of the said luminescent layer (17) may be chosen such that the visible light emitted by said cell (15) is of a wavelength corresponding to that of a predetermined one of the three primary colours, i.e., red, green or blue, or any other suitable colour.

Alternatively, said luminescent layer (17) may be chosen such that the visible light emitted by said cell (15) is substantially white light. Optionally, the cell (15) further comprises a filter layer (16) comprising a suitable optical filter superposed over said upper electrode (22) of said at least one pair of electrodes (23), said optical filter layer (16) adapted to enable the visible light emitted by said cell (15) to be of a predetermined colour, preferably one of the primary colours red, green or blue. Thus, if the said luminescent layer (17) emits substantially white light, then by providing a red, green or blue filter layer (16), the emitted light is correspondingly filtered to red, green or blue, respectively.

The said device (10) may then be conveniently arranged such that the colour cells (15) are divided into clusters of three cells (15) each, a "red" cell, a "green" cell and a "blue" cell, wherein the light emitted by the said luminescent layer (17) is respectively red, green and blue. In this manner, a range of colours may be perceived to be emitted from the cluster of cells (15), according to the combination of cells (15) in the cluster that are activated, i.e., that are emitting light, at any one time. The greater the number of cells (15), or such groups of red, green and blue cells, that represent each pixel of the image, the greater the number of potential colours that may be displayed.

Preferably, and with reference to FIG. 2, the cell (15A) in a second aspect of the preferred embodiment comprises both types of luminescent layer (17) described above. Thus, each said colour cell (15A), comprises a first said luminescent layer (17A) intermediate a first said pair of electrodes (23A), wherein the first luminescent layer (17A) is such that the emission of said visible light by said cell (15A) ceases in correlation with the said voltage between the upper electrode (22A) and the lower electrode (24A) of said first pair of electrodes (23A) falls to substantially below a predetermined voltage threshold, i.e. (Vp), as hereinbefore described, mutatis mutandis. The cell (15A) further comprises a second said luminescent layer (17B) intermediate a second said pair of electrodes (23B), wherein said second luminescent layer (17B) is such that the emission of said visible light by said cell (15A) endures for a period of time after the said voltage between the upper electrode (22B) and the lower electrode (24B) of said second pair of electrodes (23B) falls to substantially below a predetermined voltage threshold, i.e. (Vp), as hereinbefore described, mutatis mutandis. Again, since the dielectric layer (19), is essentially an electrically insulating layer between the first pair of electrodes (23A) as well as between the second pair of electrodes (23B), the said dielectric layer (19) may be contiguous across the whole or part of the cell (15A) or of the display device (10), as desired.

Preferably, the said first upper electrode (22A) and said first lower electrode (24A) are substantially thin and flat, and are parallel one to the other, and the said first pair of electrodes (23A) is capable of being electrically connected, preferably by means of suitable conductors, (32A) and (34A), respectively, to at least one suitable electrical power source, which power source is capable of providing at least a predetermined voltage (Vp) between said first upper electrode (22A) and said lower electrode (24A) of said first pair of electrodes (23A).

Similarly, the said second upper electrode (22B) and said second lower electrode (24B) are substantially thin and flat, and are parallel one to the other, and the said second pair of electrodes (23B) is capable of being electrically connected, preferably by means of suitable conductors, (32B) and (34B), respectively, to at least one suitable electrical power source, which power source may or may not be the power source providing power to the first pair of electrodes (23A), and is capable of providing at least a predetermined voltage (Vp) between said second upper electrode (22B) and said lower electrode (24B) of said second pair of electrodes (23B).

Further, the said first upper electrode (22A) and adjacent said second upper electrode (22B) are electrically insulated from each other and from the corresponding upper electrodes of adjacent colour cells, and likewise the said first lower electrode (24A) and the adjacent said second lower electrode (24B) are also electrically insulated from each other and from the corresponding lower electrodes of adjacent colour cells. Such electrical insulation may be accomplished by the provision of suitable insulating material or a suitable gap between adjacent electrodes, or in any other suitable manner.

Preferably, in the second aspect of the preferred embodiment, said first pair of electrodes (23A) and corresponding said first luminescent layer (17A) disposed therebetween is nested within said second pair of electrodes (23B) and corresponding said second luminescent layer (17B) disposed therebetween. In other words, the first upper electrode (22A) of the first pair of electrodes (23A) is preferably nested within the second upper electrode (22B) of the second pair of electrodes (23B); the first lower electrode (24A) of the first pair of electrodes (23A) is preferably nested within the second lower electrode (24B) of the second pair of electrodes (23B); the first luminescent layer (17A) intermediate the first pair of electrodes (23A) is preferably nested within the second luminescent layer (17B) intermediate the second pair of electrodes (23B).

Optionally, the said first luminescent layer (17A) is substantially disc-shaped, and the said second luminescent layer (17B) is substantially annular-shaped. Alternatively, the said first luminescent layer (17A) is substantially rectangular-shaped, and the said second luminescent layer (17B) is in the form of a strip running along the periphery of the first luminescent layer (17A). Typically, the upper and lower electrodes of the first and second pairs of electrodes (23A) and (23B) respectively, are shaped in a similar manner to the corresponding luminescent layer (17A), (17B), respectively, with the proviso that the outer, second upper electrode (22B) and second lower electrode (24B) each optionally comprise a narrow gap to allow passage of the said conductors (32A) and (34A) from the inner first upper electrode (22A) and first lower electrode (24A) to outside of the cell (15A). Alternatively, the gap may be replaced by providing insulating material between the said conductors (32A) and (34A) and the second upper electrode (22B) and second lower electrode (24B), respectively.

The luminescent material of the said first and second luminescent layers (17A), (17B) respectively, may each be chosen such that the visible light emitted by said cell (15A) from each luminescent layer is of a wavelength corresponding to that of a predetermined one of the three primary colours, i.e., red, green or blue, or any other suitable colour, or alternatively that of white light. Preferably, the luminescent material of both the said first and the second luminescent layers (17A) and (17B), respectively, are chosen such that the visible light emitted by both luminescent layers (17A) and (17B) are of substantially equal wavelength, though alternatively the emitted light from each of the said first and the second luminescent layers (17A) and (17B), respectively, of the cell (15A) may be of different wavelengths.

Optionally, the cell (15A) farther comprises an optical filter layer (16) comprising a suitable optical filter superposed over said first upper electrode (22A) of said first pair of electrodes (23A), and over said second upper electrode (22B) of said second pair of electrodes (23B). The said optical filter layer (16) adapted to enable the visible light emitted by said cell (15A) from each luminescent layer to be of a predetermined colour, preferably one of the primary colours red, green or blue. Thus, if either one or both of the said first and/or second luminescent layers (17A) and (17B) emit substantially white light, for example, then by providing a red, green or blue filter layer (16), the emitted light is correspondingly filtered to red, green or blue, respectively. Of course, suitable filters may usually be employed to modify where possible the wavelength of the emitted light, even when the emitted light is not white light. Alternatively, a separate, and optionally different, filter layer may be superposed over each one of said first upper electrode (22A) and said second upper electrode (22B), thereby enabling the emitted light from each one of the said first and second luminescent layers (17A) and (17B) to be of a different colour.

The said device (10) may then be conveniently arranged such that the colour cells (15A) are divided into clusters of three cells (15A) each, a "red" cell, a "green" cell and a "blue" cell, wherein the light emitted by the both the first and second said luminescent layers (17A) and (17B) of the each cell (15A) is respectively red, green and blue. In this manner, a range of colours may be perceived to be emitted from the cluster of cells (15A), according to the combination of cells (15A) in the cluster that are activated, i.e., that are emitting light, at any given time.

Figure 3:
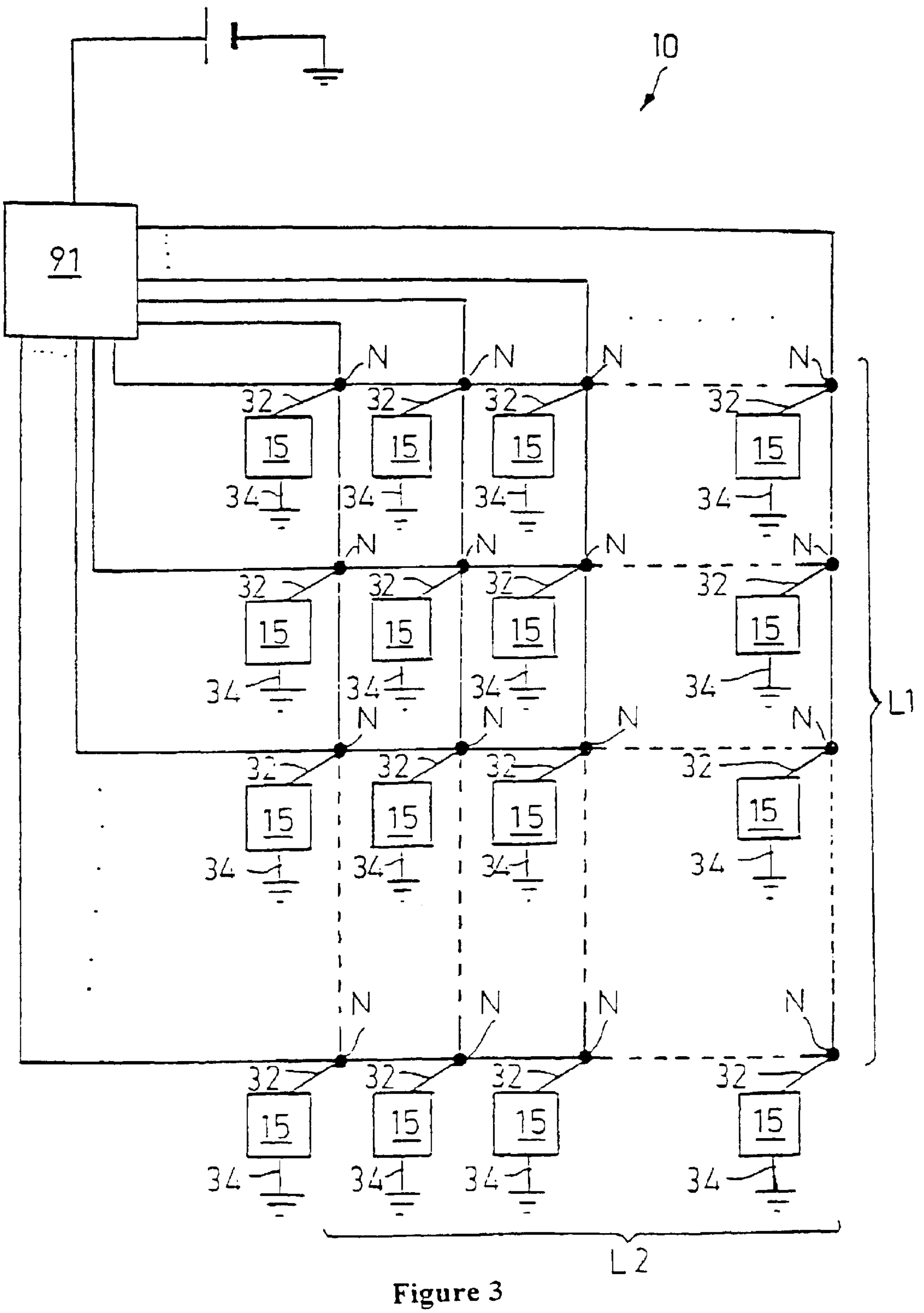
FIG. 3 illustrates schematically the preferred embodiment of a display device comprising a plurality of colour cells as in FIGS. 1 and/or 2, operatively connected to a power source via a suitable microprocessor.
Figure 4:
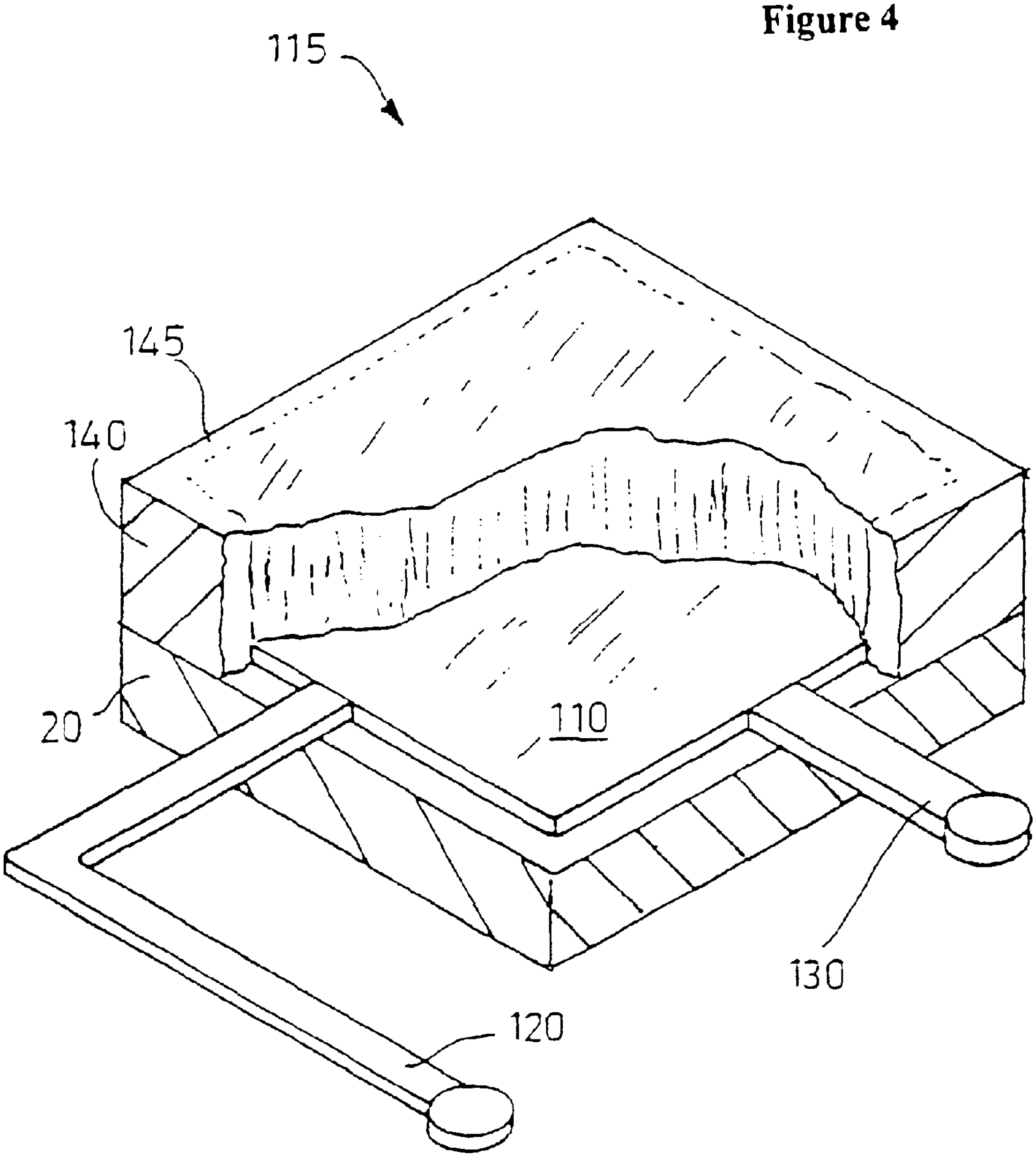
FIG. 4 illustrates in partial cutaway perspective view a colour cell according to the second embodiment of the present invention.
Figure 5A:
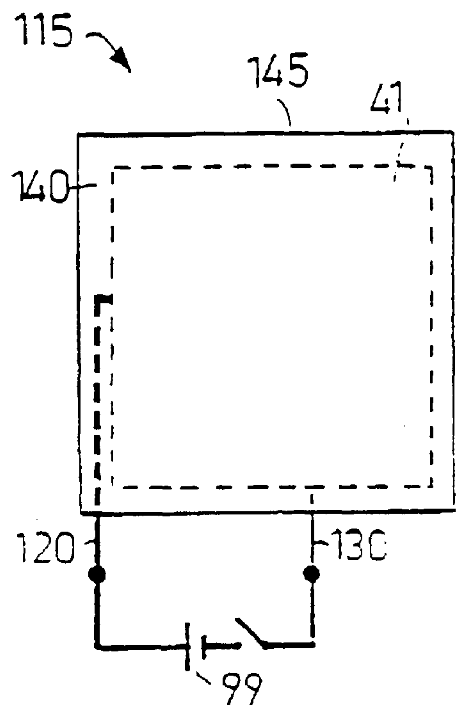
FIGS. 5(*a*) to 5(*d*) illustrate the colour cell of FIG. 4 in top view when electrically disconnected from any electrical power source (FIG. 5(*a*)) and when connected to an electrical power source (FIG. 5(*b*)), and in corresponding side cross-sectional views (FIG. 5(*c*) and FIG. 5(*d*), respectively).
Figure 5B:
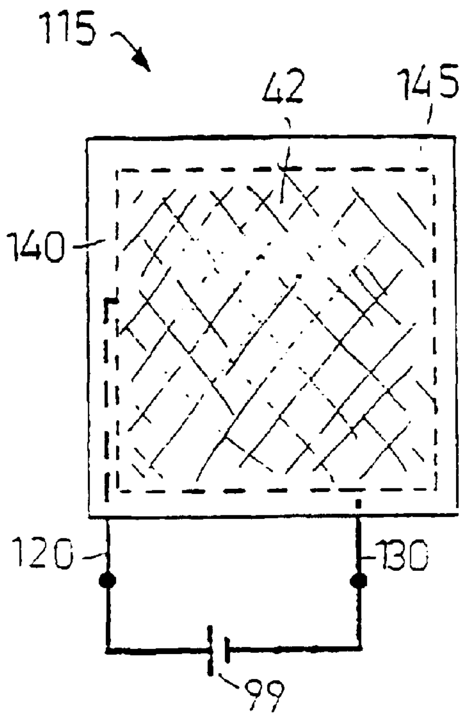
Figure 5C:
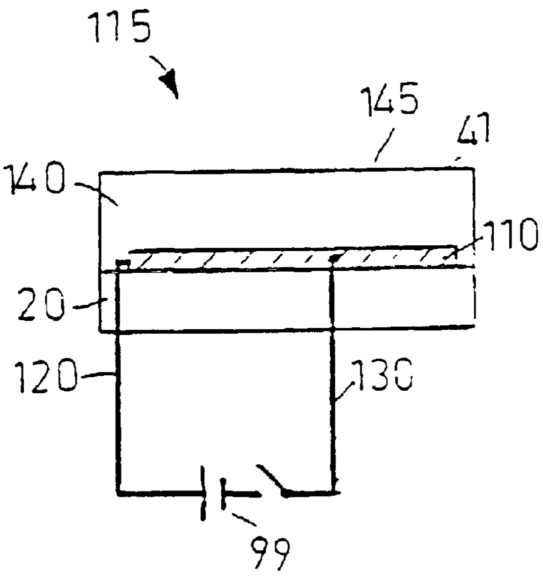
Figure 5D:
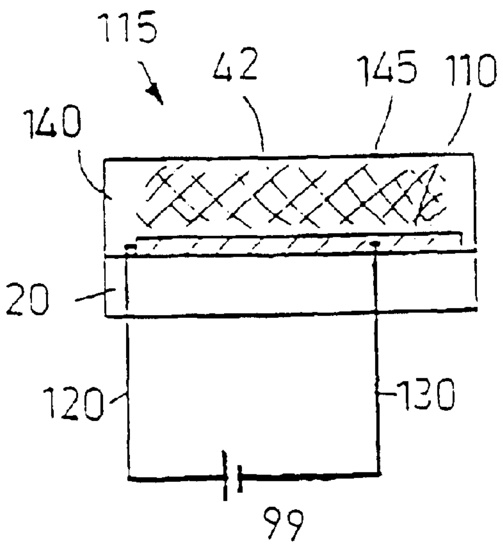
Figure 6:
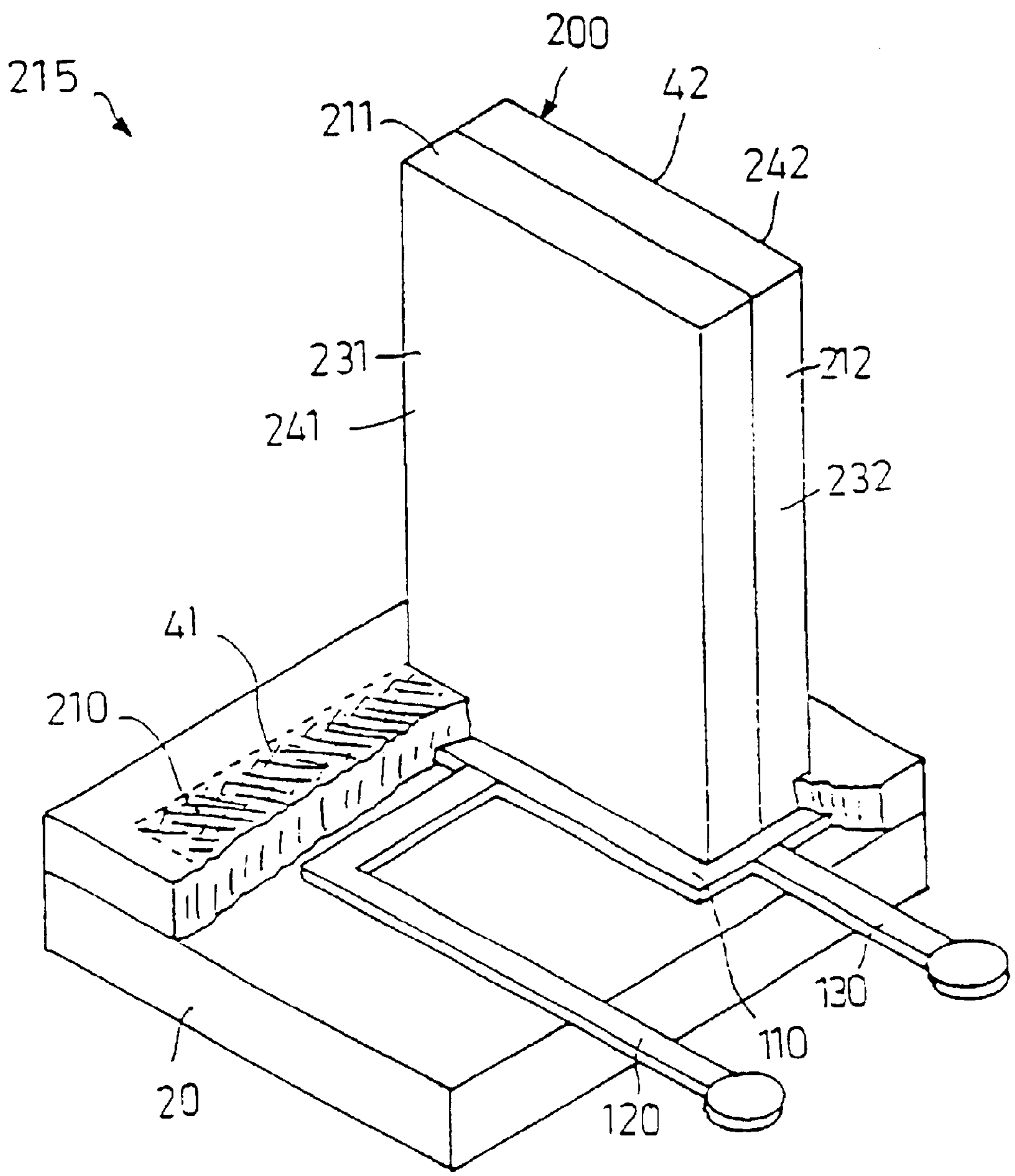
FIG. 6 illustrates in partial cutaway perspective view a colour cell according to the third embodiment of the present invention.
Figure 7A:
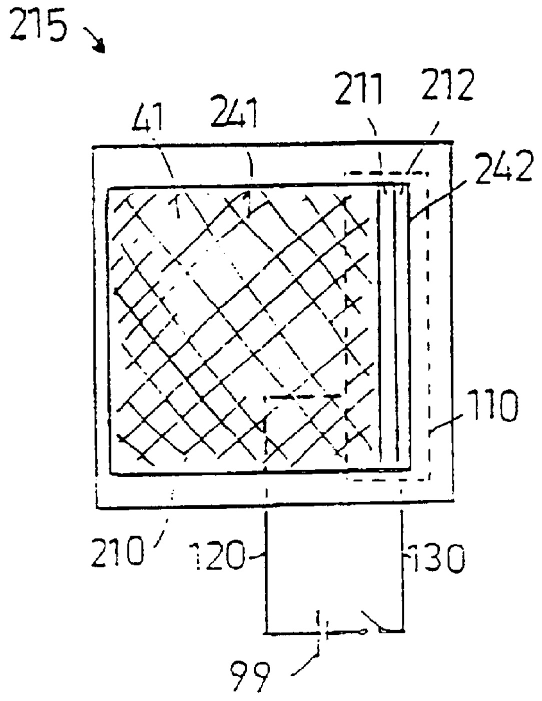
FIGS. 7(*a*) to 7(*d*) illustrate the colour cell of FIG. 6 in top view when electrically disconnected from any electrical power source (FIG. 7(*a*)) and when connected to an electrical power source (FIG. 7(*b*)), and in corresponding side cross-sectional views (FIG. 7(*c*) and FIG. 7(*d*), respectively).
Figure 7B:
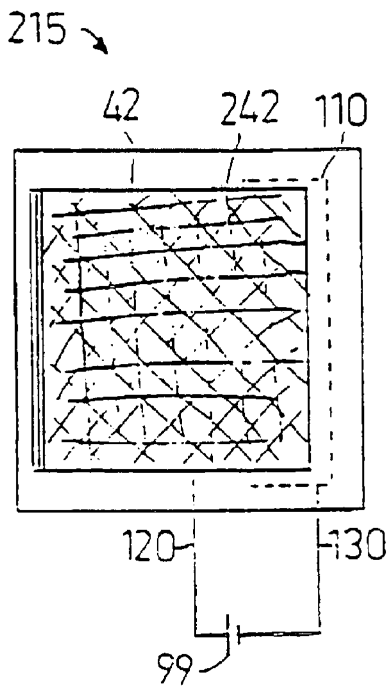
Figure 7C:
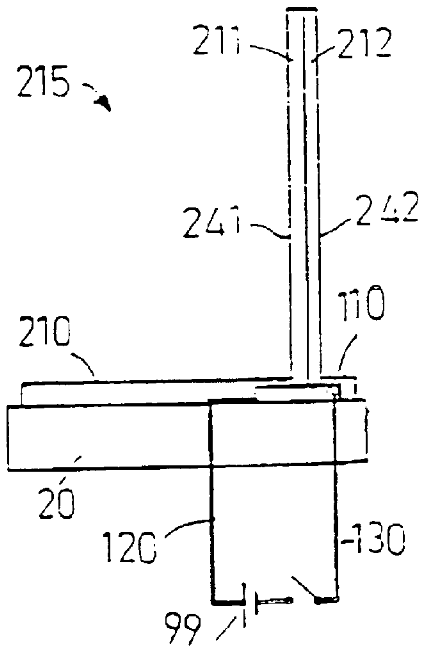
Figure 7D:
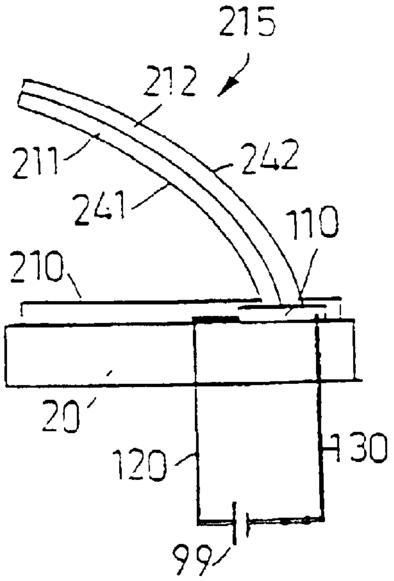
Figure 8:
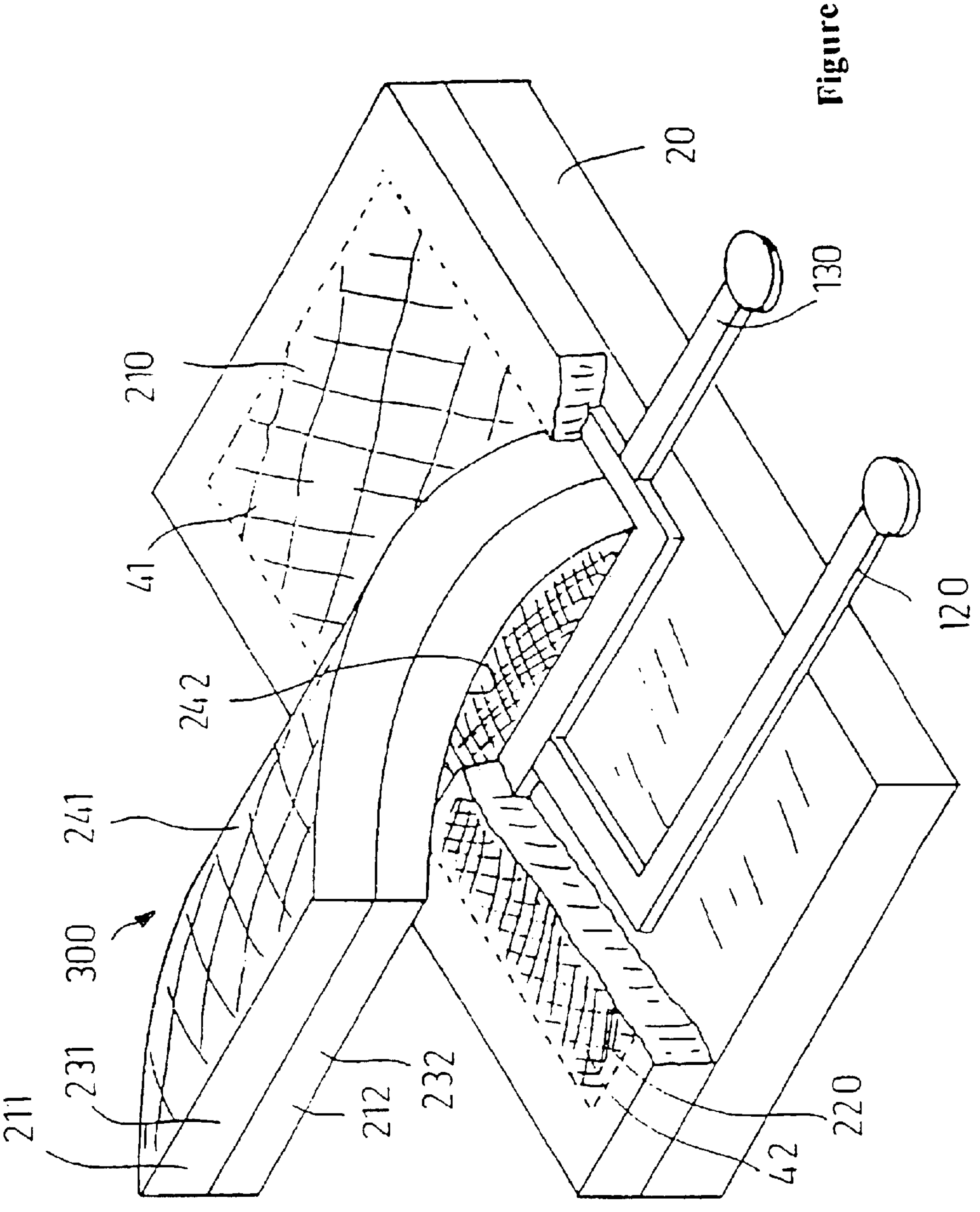
FIG. 8 illustrates in partial cutaway perspective view a colour cell according to the fourth embodiment of the present invention.
Figure 9A:
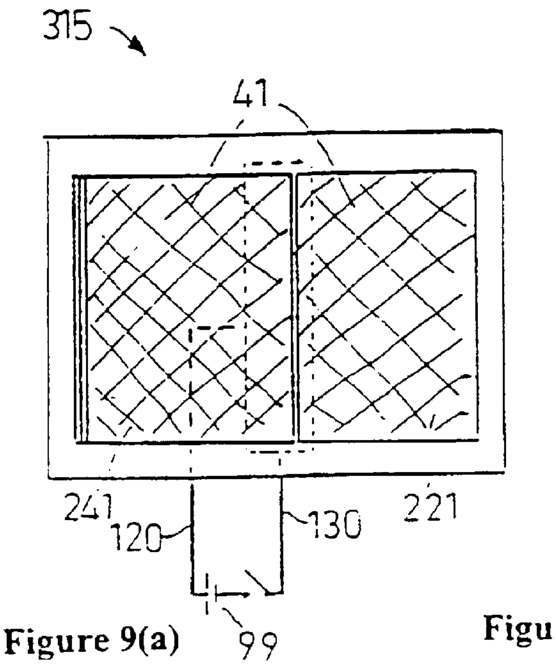
FIGS. 9(*a*) to 9(*d*) illustrate the colour cell of FIG. 8 in top view when electrically disconnected from any electrical power source (FIG. 9(*a*)) and when connected to an electrical power source (FIG. 9(*b*)), and in corresponding side cross-sectional views (FIG. 9(*c*) and FIG. 9(*d*), respectively).
Figure 9B:
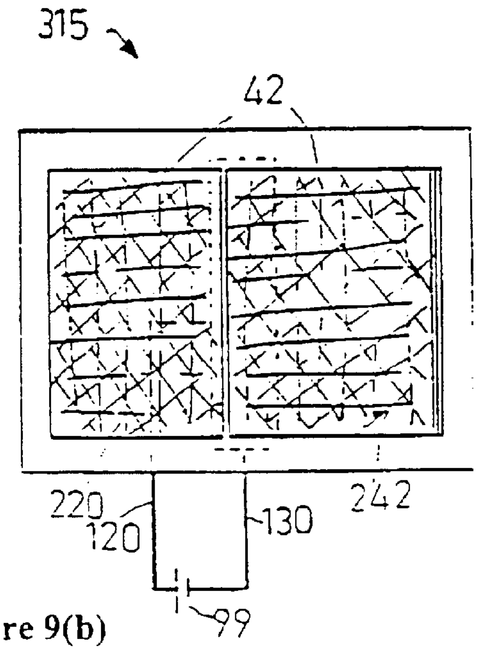
Figure 9C:
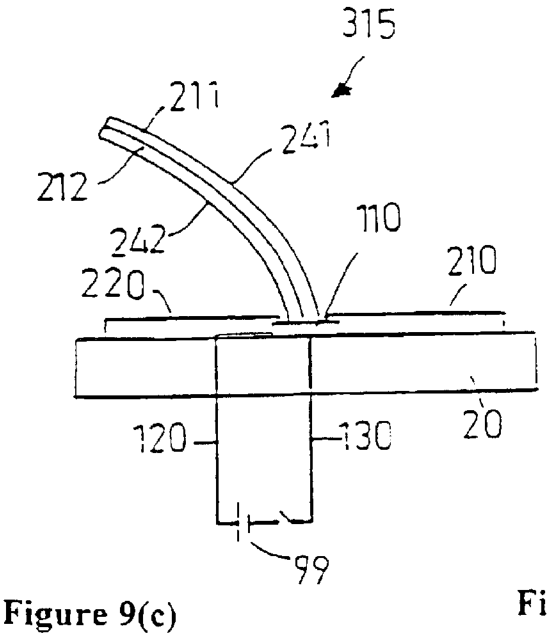
Figure 9D:
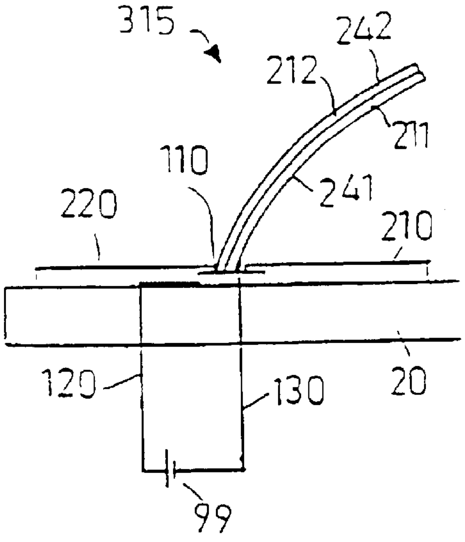
Figure 10A:
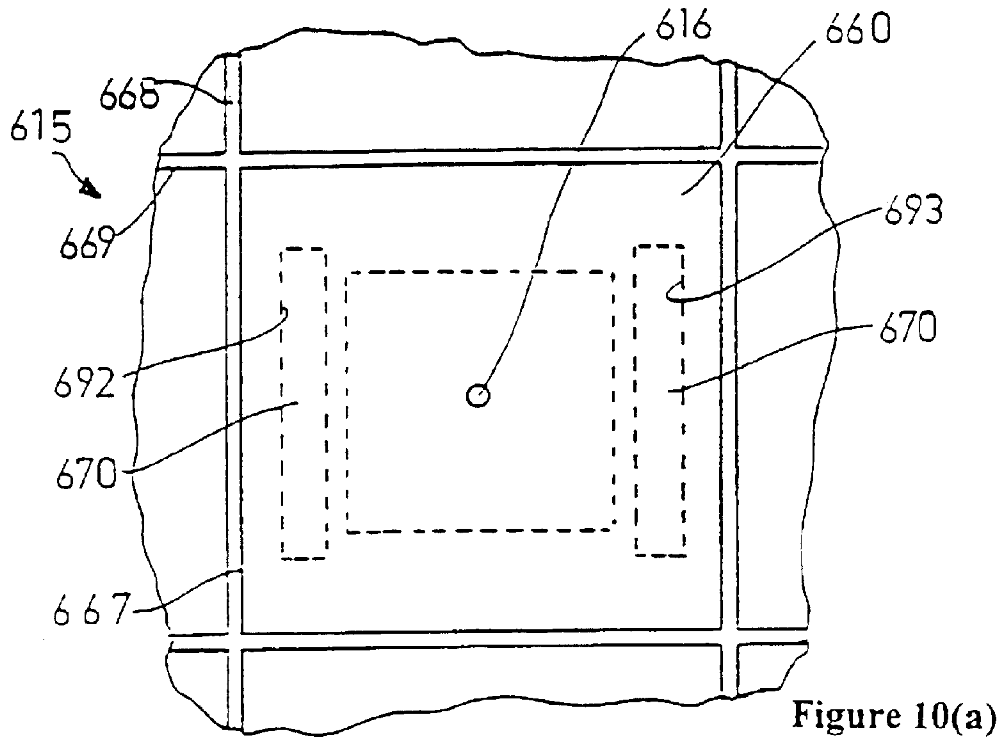
FIGS. 10(*a*) and 10(*b*) illustrate in top view and in side cross-sectional side view, respectively, a colour cell according to the fifth embodiment of the present invention.
Figure 10B:
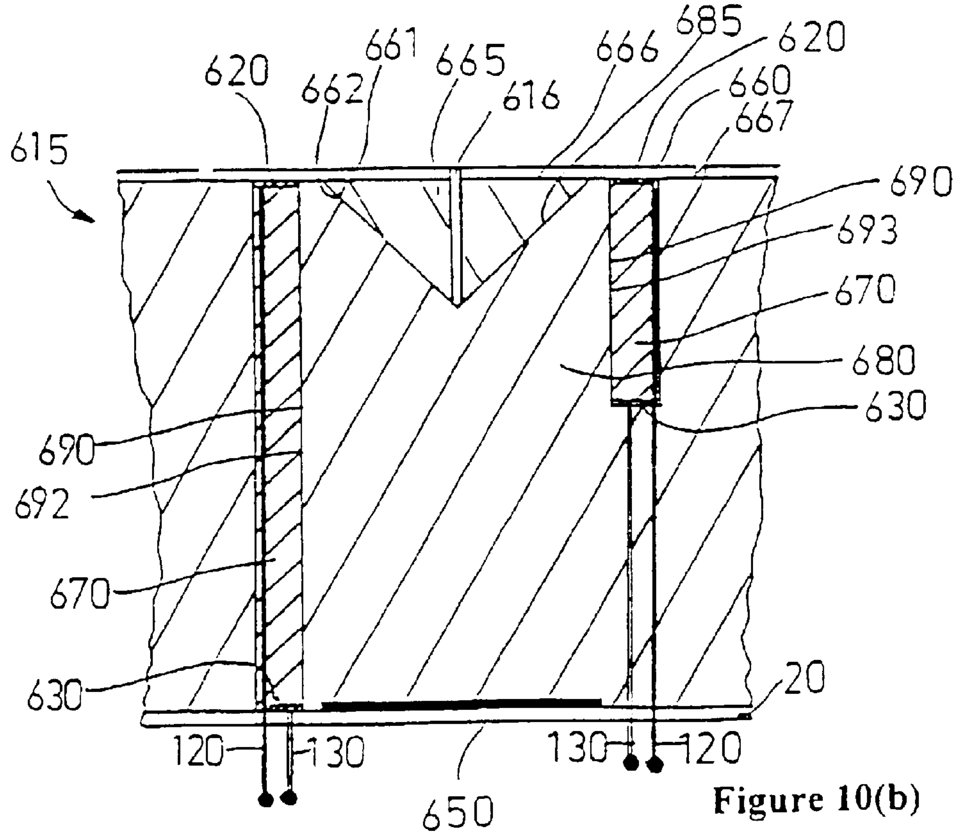
Figure 11A:
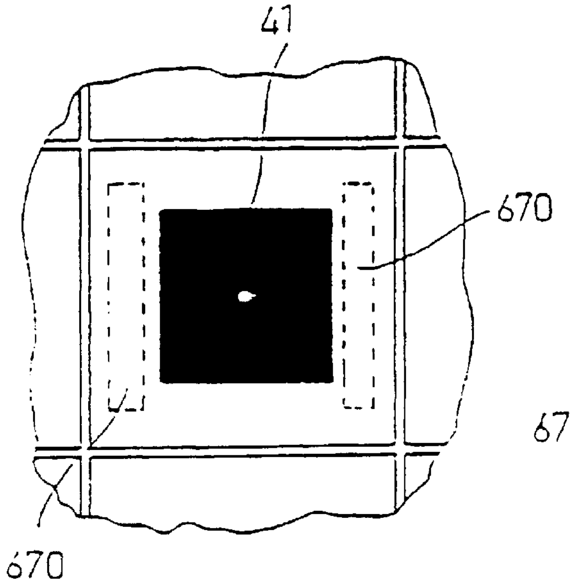
FIGS. 11(*a*) to 11(*d*) illustrate the colour cell of FIG. 10 in top view when electrically disconnected from any electrical power source (FIG. 11(*a*)) and when connected to an electrical power source (FIG. 11(*b*)), and in corresponding side cross-sectional views (FIG. 11(*c*) and FIG. 11(*d*), respectively).
Figure 11B:
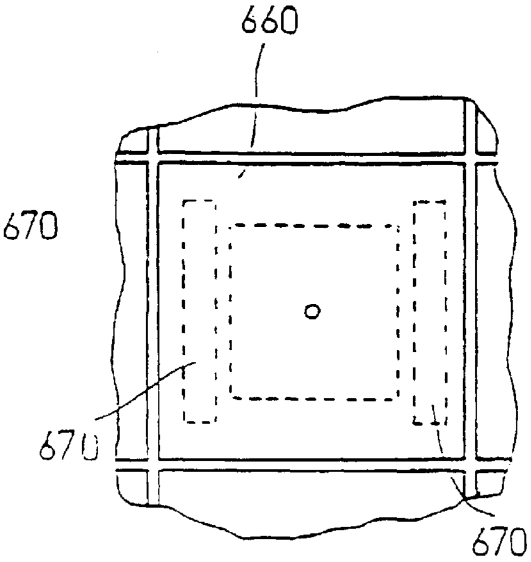
Figure 11C:
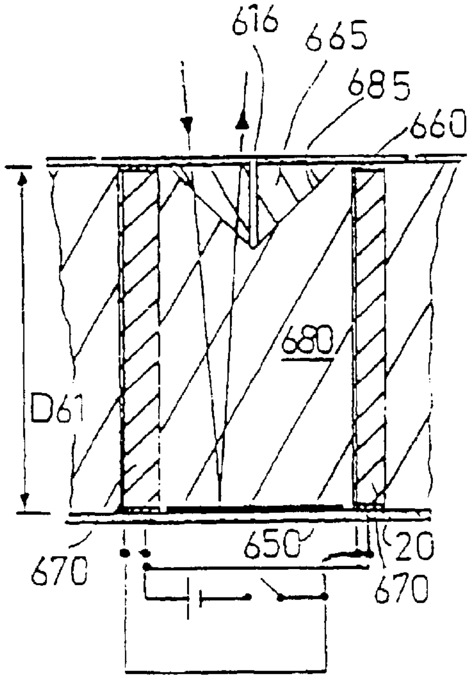
Figure 11D:
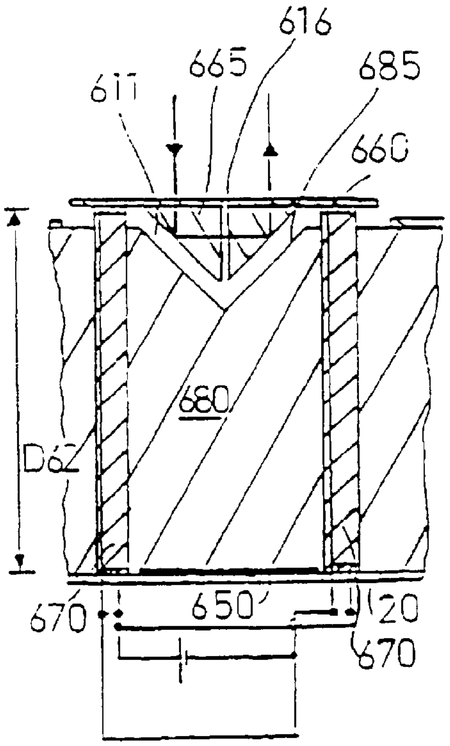

As hereinbefore described, in the first and second aspects of the first embodiment of the present invention, the cells, (15) and (15A) may be activated to emit light by the application of a predetermined voltage across the corresponding upper and lower electrodes. This feature of the cells enables the control of cells to provide predetermined images to be performed in a manner similar to that used for the control of pixels in a typical flat LCD computer screen. With respect to the cell (15) according to the first aspect of the preferred embodiment, for example, the display device (10) may be considered to comprise a plurality of these cells (15), for convenience arranged in an array or grid comprising consecutive rows and columns of cells (15), as illustrated for example in FIG. 3. While in this Figure, a substantial gap is shown between cells (15), in practice the cells (15) are very close together. The device (10) may comprise a series of first input lines (L1) and a series of second input lines (L2) superposed and orthogonal with respect to the said series of first input lines (L1), such as to provide an electrical node (N) at each intersection between a first input line (L1) and a second input line (L2). The rows and columns of cells (15) are arranged such that each cell (15) is in close proximity to an individual node (N), with either the upper electrode (22) or the lower electrode (24) of the cell (15) electrically connected thereto. The lower electrode (24), or upper electrode (22), respectively, may be earthed, for example, or otherwise suitable routed to a terminal of the power source. The series of first input lines (L1), corresponding to the rows of cells (15), are sequentially connected to a suitable terminal of an electrical power source to provide a voltage of less than (Vp), and preferably about (Vp)/2 to each row of cells (15) in turn. Concurrently, said series of second input lines (L2), corresponding to said columns of cells (15), may also be connected in a selective manner to a suitable terminal of the same or a different electrical power source to provide a voltage of less than (Vp), and preferably about (Vp)/2 to each. selected column of cells such that there will be a voltage of (Vp) or greater at nodes (N) corresponding to a row and a column of cells which is directly connected to the power source in this way, enabling the corresponding luminescent layers (17) of the cells (15) at these nodes to be activated and thus emit light, and such that all other nodes will have a voltage of less than (Vp), and will therefore not be activated. In this manner, by synchronising which of the second input lines (L2) to connect to the power source during the sequencing of connections of the power source to the series of first input lines (L1), the particular nodes (N) to be at voltage (Vp) at any one time can be chosen, and thus by also choosing the colour of emitted light that may be obtained from each cell (15) as hereinbefore described, the particular cells (15) on the device (10) that are activated and therefore emit light of a particular colour at any one time may be controlled. Alternatively, selected cells (15) may be similarly activated by supplying thereto suitable electrical currents via the said first and second input lines (L1) and (L2), respectively, such as to provide sufficient electrical current at the selected cells to activate the same to emit light, while providing less than sufficient electrical current to all other cells, which are thus not activated. Thus, the device (10) may be adapted to provide any desired image or sequence of images. Such synchronisation and sequencing may be accomplished typically by a suitable microprocessor (91), for example.

Alternatively, the said device (10) comprising cells (15) and/or (15A) according to the first and/or second aspects, respectively, of the first embodiment may be controlled by means of circuit boards (70) as hereinafter described with reference to the second embodiment, mutatis mutandis.

Each of the first and second luminescent layers (17A) and (17B), respectively of the cell (15A) according to the second aspect of the preferred embodiment of the present invention may be similarly controlled as described above for the cells (15) according to the first aspect of the preferred embodiment of the present invention, mutatis mutandis. Optionally, the first and second pairs of electrodes, (23A), (23B) respectively, of each cell (15A) may be electrically connected to common first input lines (L1), though to two distinct sets of second voltage lines (L2). Of course, the device (10) may comprise any number of any one of the embodiments described herein, in any combination and/or arrangement, as desired.

The said power source may comprise a suitable DC battery, or additionally or alternatively a suitable photoelectric cell such as a solar cell, for example. Advantageously, the power source is comprised on said substrate, and may be suitably printed on it in a manner known in the art, particularly in applications when the device (10) is manufactured using similar techniques used for manufacturing microprocessors as well as printed circuits. Alternatively, the said power source may comprise an AC power source, preferably operatively connected to a suitable rectifier.

The present invention also relates to a method for manufacturing the device (10) comprising said colour cells, (15) or (15A), of the said preferred embodiment, comprising the steps of:

(a) preparing a suitable substrate;

(b) forming at least one suitable substantially colourless lower electrode using a paste mask method in which desired parts of a foil of suitable material superposed over said spacers is rendered, or remains conductive, while other parts remain, or are rendered, respectively, non-conductive;

(c) printing at least one suitable luminescent layer corresponding to and superposed over said at least one lower electrode;

(d) printing a suitable dielectric layer over said at least one luminescent layer, optionally including exposed parts of said substrate;

(e) forming at least one suitable substantially colourless upper electrode corresponding to and superposed over said at least one upper electrode a paste mask method.

Optionally, steps (c) and (d) may be replaced with the following steps:

(d) printing a suitable dielectric layer over said at least one lower electrode, optionally including exposed parts of said substrate;

(c) printing at least one suitable luminescent layer over said dielectric layer, corresponding to and superposed over said at least one lower electrode.

Optionally, step (e) may be followed by step (f) below:

(f) printing a suitable optical filter layer over said at least one upper electrode and optionally over exposed parts of said substrate and/or over exposed parts of said dielectric layer and/or exposed parts of said at least one luminescent layer.

The present invention also relates to a picture display device comprising a suitable substrate carrying a plurality of colour cells wherein each colour cell is capable of exhibiting a change in its external colour from a first colour to a second colour, each said colour cell comprising:

an electrically heatable base comprising at least one suitable electrical input connection means and at least one suitable electrical output connection means capable of connecting said base to a suitable electrical power source, said base capable of being electrically heated at least from a first temperature to at least a second temperature in response to the supply of a predetermined voltage and/or current thereto;

thermally responsive colour change means in thermal contact with said base, said colour change means enabling said cell to exhibit a colour change from said first colour to said second colour in response to said temperature change of the said base from said first temperature to said at least second temperature.

Thus, in the second, third and fourth embodiments of the present invention, the said suitable electrical connections comprises an electrically heatable base comprising at least one suitable electrical input connection means and at least one suitable electrical output connection means capable of connecting said base to a suitable electrical power source, said base capable of being electrically heated at least from a first temperature to at least a second temperature in response to the supply of a predetermined voltage and/or current thereto; and furthermore, said colour change and/or luminescent means comprises thermally responsive colour change means in thermal contact with said base, said colour change means enabling said cell to exhibit a colour change from said first colour to said second colour in response to said temperature change of the said base from said first temperature to said at least second temperature.

Optionally, said colour change means are reversible such that the said colour cell is capable of exhibiting a colour change from said second colour to said first colour in response to a reduction of the temperature of the said base to a temperature at least substantially below said second temperature.

The present invention also relates to such a picture display device wherein said colour change means comprises a suitable layer of thermochromic material capable of exhibiting a colour change from said first colour to said second colour in response to a change of temperature of said base from said at least first temperature to said at least said second temperature.

The said colour change means may comprise a suitable layer of thermochromic material capable of exhibiting a colour change from said first colour to colourless in response to a change of temperature of said base from said at least first temperature to said at least said second temperature, said thermochromic material superposed directly or indirectly over a colour layer of said second colour, such that the said colour cell may exhibit said second colour when said thermochromic layer is colourless.

Alternatively, said colour change means comprises a suitable layer of thermochromic material capable of exhibiting a colour change from colourless to said second colour in response to a change of temperature of said base from said at least first temperature to said at least said second temperature, said thermochromic material superposed directly or indirectly over a colour layer of said first colour, such that the said colour cell may exhibit said first colour when said thermochromic layer is colourless.

The said colour layer may be disposed at least intermediate said thermochromic layer and said base. Alternatively the said colour layer may be disposed at least intermediate said base and said substrate, said base being preferably substantially colourless and transparent. Alternatively, the said colour layer may be disposed on a lower face of said substrate and substantially aligned at least with said thermochromic layer, said base and said substrate being substantially colourless.

Alternatively, the said colour change means may comprise a suitable layer of thermochromic material capable of exhibiting a colour change from said first colour to said second colour in response to a change of temperature of said base from said at least first temperature to said at least said second temperature, wherein at least the colour of said second colour is variable with respect to the magnitude of said second temperature.

Thus, in the second, third and fourth embodiments of the present invention, and with reference to FIGS. 4 and 5, FIGS. 6 and 7, and FIGS. 8 and 9, respectively, the display device, generally designated (10) comprises a suitable substrate (20) as described herein with reference to the preferred embodiment, mutatis mutandis, carrying a plurality of colour cells, designated (115), (215) and (315) for the second, third and fourth embodiments respectively.

Each of the colour cells (115, 215, 315) of the device (10) comprises an electrically conducting base (110), having at least one suitable electrical input connection means (120) and at least one suitable electrical output means (130), for enabling the base (110) to be electrically connected, directly or alternatively indirectly, to a suitable electrical power source (99). In these embodiments, the base (110) is capable of being heated in a predetermined manner in response to the application of a voltage across same and/or the passage of a suitable electrical current therethrough. The base (110) is thus typically comprised of a conducting or semiconducting material having a suitable electrical resistance, for example. The said base (110) may also be made from some materials which are generally considered non-conductive materials, but which may nonetheless enable an electrical current to pass therethrough under certain conditions, in particular when the non-conducting material is in the form of a very thin layer constituting the base (110).

The said cells (115, 215, 315) further comprise colour change means in thermal contact with the base (110). The colour change means enable a first colour (41) to be exhibited by the corresponding colour cell (115, 215, 315) when the cell (115, 215, 315) is disconnected from an electrical power source, and a second colour (42) to be exhibited by the cell (115, 215, 315) in response to a substantial change in temperature of the base (110). While the change in temperature of the base (110) is achieved by the passage of a suitable electric current therethrough and/or the application of a voltage thereto, there may be additional temperature effects arising from the environment in which the device is operated.

In the second embodiment, the said colour change means comprises a layer (140) of thermochromic material, extending at least over the said base (110), and may optionally contiguous over part or all of the device (10). Thermochromic materials are well known in the art and include, for example, Tungsten oxide. The thermochromic material in said thermochromic layer (140) may undergo a colour change, in response to a change in its temperature, in a number of different ways. Thus, for example, the thermochromic layer (140) of the cell (115) may exhibit a first colour (41) over its upper exposed surface (145) when no current is passed therethrough (FIGS. 5(*a*) and 5(*c*)), but changes its colour to said second colour (42) when current is switch on, FIGS. 5(*b*) and 5(*d*), and the base (110) and overlying thermochromic layer (140) are heated as a result thereof. Alternatively, the thermochromic layer (140) may exhibit a colour change from said first colour to colourless, i.e. it becomes substantially transparent, when the power source is operatively connected thereto and the said base (110) is heated to at least said second temperature, the base preferably being of said second colour (42), or alternatively comprising a colour layer comprising said second colour (42). Alternatively, the thermochromic layer (140) may exhibit a colour change from colourless, i.e., transparent, to said second colour (42), when the power source is operatively connected thereto, the base preferably being of said first colour (41), or alternatively comprising a colour layer comprising said first colour (41).

Alternatively, the thermochromic layer may exhibit a change in its colour as a function of its actual temperature. The actual colours of said first colour (41) and said second colour (42) will thus depend on the actual temperature of the thermochromic layer (140) before activation of the cell (115), as well as on the actual temperature change that occurs as a result of the passage of current through the base (110) and/or the application of a voltage thereto, including any changes in ambient temperature that occur. Further, by changing the magnitude of the current flowing through the base (110) or alternatively the magnitude of the voltage applied thereto, the temperature thereof may be controlled, and thereby, the colour of the said second colour (42) may be changed in correlation to the magnitude of the current and/or voltage. Further, the ambient environmental temperature may also affect the colour of at least the said second colour. For example, in a relatively cold environment there will be a greater change in the colour of the second colour for a given magnitude of electrical current as compared with a relatively hotter environment.

The present invention also relates to a method for manufacturing the said device comprising said colour cell (115) of the said second embodiment, comprising the steps of:

(a) preparing a suitable substrate;

(b) printing a plurality of bases on said substrate corresponding to each cell of said device using a suitable printing material, each said base being suitably spaced with respect to an adjacent base;

(c) for each said base, printing corresponding said electrical input connection means and said electrical output connection means using a suitable conducting ink;

(d) applying a layer of thermochromic material over said substrate, bases and input and output connection means.

Thus, the structure of the colour cell (115) of the second embodiment is particularly suitable for enabling such cells to be manufactured layer by layer in a manner similar to that used in manufacturing printed circuits and particularly integrated circuits and microchips, as well as by suitable printing methods.

Alternatively, said colour change means comprises:

a suitable bimaterial strip comprising a first layer of a first material having a first coefficient of thermal expansion superposed on, and in substantially shearless contact with, a second layer of a second material having a second coefficient of thermal expansion, said second coefficient of thermal expansion being greater than said first coefficient of thermal expansion, said bimaterial strip being in thermal contact at an edge thereof with said base such that at least a part of said first layer and at least a part of said second layer are in thermal contact with said base, said strip projecting from said base;

a colour layer of said second colour comprised on an exposed face of said second layer of said strip; and a first area at least on said base having said first colour, said first area in juxtaposition with an exposed face of said first layer of said strip;

whereby said bimaterial strip bends from a first configuration to a second configuration in response to said temperature change of said base from said at least first temperature to said at least second temperature, wherein in said first configuration said strip is substantially perpendicular to said base enabling said first colour on said first area to be exhibited, and wherein in said second configuration said strip is substantially bent towards said first area substantially covering said first colour on said first area and enabling said second colour of the said colour layer comprised on the said second layer to be exhibited.

Alternatively, said colour change means comprises:

a suitable bimaterial strip comprising a first layer of a first material having a first coefficient of thermal expansion superposed on, and in substantially shearless contact with, a second layer of a second material having a second coefficient of thermal expansion, said second coefficient of thermal expansion being greater than said first coefficient of thermal expansion, said bimaterial strip being in thermal contact at an edge thereof with said base such that at least a part of said first material and at least a part of said second material are in thermal contact with said base, said strip projecting from said base;

a colour layer of said first colour comprised on an exposed face of said first layer of said strip;

a first area at least on said base having said first colour, said first area in juxtaposition with an exposed face of said first layer of said strip;

a colour layer of said second colour comprised on an exposed face of said second layer of said strip;

a second area at least on said base having said second colour, said second area in juxtaposition with an exposed face of said second layer of said strip; and whereby said bimaterial strip changes from a first configuration to a second configuration in response to said temperature change of said base from said at least first temperature to said at least second temperature, wherein in said first configuration said strip is substantially bent towards said second area substantially covering said second colour on said second area and enabling said first colour of the said colour layer comprised on the said first layer and said first colour on said first area to be exhibited, and wherein in said second configuration said strip is substantially bent towards said first area substantially covering said first colour on said first area and enabling said second colour of the said colour layer comprised on the said second layer and said second colour on said second area to be exhibited.

Thus, in the third and fourth embodiments of the present invention, the said colour cell, (215) and (315) respectively, comprises at least a first area (210) having said first colour (41), which may be painted or printed thereon as a colour layer, for example. The said colour change means in the third and fourth embodiments comprises a suitable bimaterial strip, (200) and (300) respectively, comprising a first layer (211) of a first material (231) having a first coefficient of thermal expansion, superposed on a second layer (212) of a second material (232) having a second coefficient of thermal expansion. The first layer (211) and second layer (212) are securely attached to each other, preferably bonded together, and the said second coefficient of thermal expansion is chosen to be greater than said first coefficient of thermal expansion, in order to control the primary direction of bending or distortion of the strip (200, 300). Thus when heated, the said bimaterial strip (200, 300) bends due to the difference in the thermal expansion coefficients, with the outer surface (242) of second layer (212) becoming generally convex, while the outer surface (241) of said first layer (211) becomes correspondingly concave. In particular, when the width of the strip (200, 300) is significantly smaller than the length thereof, the strip bends primarily along the lengthwise dimension. The said bimaterial strip, (200, 300) is in thermal contact with said base (110) and projecting therefrom, such that said first layer (211) and said second layer (212) are in thermal contact with the base (110). Preferably the strip (200, 300) is mounted to the base (110) along the narrow width of the strip (200, 300). The said first area (210) is typically located next to the said first layer (211), as illustrated in the FIGS. 6 to 9. The said strip (200, 300) comprises a layer or coating of said second colour (42) on the surface (242) of said second layer (212), such as to allow said second colour (42) on the said surface (242) to be exhibited when the strip (200) bends over to the said second position.

Referring to the third embodiment, the said base (110) is heated in response to the passage of current therethrough and/or the application of a voltage thereto, and the base (110) correspondingly heats the said bimaterial strip (200) from, say, a first temperature to a second temperature. The strip (200) correspondingly deflects or bends from a first, substantially upright position, wherein said first colour (41) on said first area (210) is exposed and exhibited, to a second position, wherein the strip (200) bends over and substantially covers said first colour (41) on said first area (210), exposing and exhibiting said second colour (42) on said surface (242).

In the fourth embodiment, the said colour cell (315) further comprises at least a second area (220) having said second colour (42), which may be painted or printed thereon as a colour layer, for example. In the cold state (i.e., in the absence of a heating effect from the base (110)), the strip (300) is biased to be bent over away from said first area (210), and actually covering said second area (220), which is typically disposed next to the said second layer (212), as illustrated in the FIGS. 8 and 9. In this embodiment, the said strip (300) comprises a layer or coating of said first colour (41) on the surface (241) of said first layer (211), such as to allow said first colour (41) on the said surface (241) to be exhibited together with that on said first area (210), when the strip (300) is in said first position.

Thus in the fourth embodiment, the said base (110) is heated in response to the passage of current therethrough and/or the application of a voltage thereto, and the base (110) correspondingly heats the said bimaterial strip (300) from, say, a first temperature to a second temperature. The strip (300) correspondingly deflects or bends from a first, biased position, substantially covering said second area (220), and wherein said first colour (41) on said first area (210) and on said surface (241) is exposed and exhibited, to a second position, wherein the strip (300) bends over to substantially cover said first colour (41) on said first area (210) and wherein said second colour (42) on said second area (220) and said surface (242) is exposed and exhibited.

The present invention also relates to a method for manufacturing the said device (10) comprising said colour cells (215) of the said third embodiment, comprising the steps of:

(a) preparing a suitable substrate;

(b) preparing a suitable zebra plate comprising a plurality of bimaterial elements and applying a layer of said second colour over the exposed face of said second layer of said bimaterial elements;

(c) printing a plurality of bases on said substrate corresponding to each cell of said device using a suitable printing material, each said base being suitably spaced with respect to an adjacent base;

(d) for each said base, printing corresponding said electrical input connection means and said electrical output connection means using a suitable conducting ink;

(e) applying a colour layer of said first colour over said first area of each cell;

(f) bonding said zebra plate onto said substrate such that each bimaterial element of said strip is bonded to a corresponding set of bases;

(g) cutting each bimaterial element adhered to each set of bases into individual bimaterial strips for each cell.

The present invention also relates to a method for manufacturing the said device (10) comprising said colour cells (315) of the said fourth embodiment, comprising the steps of:

(a) preparing a suitable substrate;

(b) preparing a suitable zebra plate comprising a plurality of bimaterial elements and applying a layer of said first colour over the exposed face of said first layer of said bimaterial strips, and a layer of said second colour over the exposed face of said second layer of said bimaterial strips, said bimaterial strips being in said first configuration at least at said first temperature;

(c) printing a plurality of bases on said substrate corresponding to each cell of said device using a suitable printing material, each said base being suitably spaced with respect to an adjacent base;

(d) for each said base, printing corresponding said electrical input connection means and said electrical output connection means using a suitable conducting ink;

(e) applying a colour layer of said second colour over said second area of each cell;

(f) applying a colour layer of said first colour over said first area of each cell;

(g) preheating said zebra plate to a predetermined temperature such that said bimaterial elements are substantially perpendicular to said zebra plate;

(h) bonding said zebra plate onto said substrate substantially at said predetermined temperature such that each bimaterial element of said strip is bonded to a corresponding set of bases;

(i) cutting each bimaterial element adhered to each set of bases into individual bimaterial strips for each cell.

Alternatively, the colour cell (215) of the third embodiment may be configured differently wherein the, said colour change means comprises:

a suitable bimaterial strip comprising a first layer of a first material having a first coefficient of thermal expansion superposed on, and in substantially shearless contact with, a second layer of a second material having a second coefficient of thermal expansion, said second coefficient of thermal expansion being greater than said first coefficient of thermal expansion, said bimaterial strip being in thermal contact at an edge thereof with said base such that at least a part of said first material and at least a part of said second material are in thermal contact with said base, said strip projecting from said base;

a colour layer of said first colour comprised on an exposed face of said first layer of said strip; and a second area at least on said base having said second colour, said second area in juxtaposition with an exposed face of said second layer of said strip;

whereby said bimaterial strip bends from a first configuration to a second configuration in response to said temperature change of said base from said at least first temperature to said at least second temperature, wherein in said first configuration said strip is substantially bent towards said second area substantially covering said second colour on said second area and enabling said first colour of the said colour layer comprised on the said first layer to be exhibited, and wherein in said second configuration said strip is substantially perpendicular to said base enabling said second colour on said second area to be exhibited.

The present invention also relates to a method for manufacturing the device (10) comprising said alternative configuration of said colour cells (215) of the said third embodiment, comprising the steps of:

(a) preparing a suitable substrate;

(b) preparing a suitable zebra plate comprising a plurality of bimaterial elements and applying a layer of said first colour over the exposed face of said first layer of said bimaterial strips, said bimaterial strips being in said first configuration at least at said first temperature;

(c) printing a plurality of bases on said substrate corresponding to each cell of said device using a suitable printing material, each said base being suitably spaced with respect to an adjacent base;

(d) for each said base, printing corresponding said electrical input connection means and said electrical output connection means using a suitable conducting ink;

(e) applying a colour layer of said second colour over said second area of each cell;

(f) preheating said zebra plate to a predetermined temperature such that said bimaterial elements are substantially perpendicular to said zebra plate;

(g) bonding said zebra plate onto said substrate substantially at said predetermined temperature such that each bimaterial element of said strip is bonded to a corresponding set of bases;

(h) cutting each bimaterial element adhered to each set of bases into individual bimaterial strips for each cell.

Thus, the colour cell (215), (315) of the third and fourth embodiments, respectively, may be manufactured via a process comprising first forming the base (10) and electrical input connection means (120) and electrical output means (130), as "printed" layers on substrate (20), in a manner similar to that used in manufacturing printed circuits and particularly integrated circuits and microchips. Preferably, the cells are arranged in a rectangular grid of rows and columns. In a separate operation, a series of bimetallic strips are manufactured in the form of a zebra plate, as is known in the art. The strips are aligned over the bases of cells of, say, corresponding columns of cells, and each strip is bonded or otherwise adhered onto the corresponding column, so that each column of cells comprises a continuous bimetallic strip joining adjacent cells together, the strip extending away from the bases of the cells substantially perpendicularly to same. A laser is then used to cut the strip into portions corresponding to each individual cell, such that each cell comprises a single bimetallic strip element joined to its base (110). In the said third embodiment, the bonding of the bimetallic strip onto the bases (110) occurs with the bimetallic strip at approximately the normal working temperature of the device (10). In the fourth embodiment, the bimetallic strips of the zebra plate are originally manufactured at a much higher temperature than the normal working temperature of the device (10) approximately intermediate between the working temperature and the highest temperature to which the base (110) is normally heated in the normal operation of the colour cell. At such an intermediate temperature, the bimetallic strips are substantially rectilinear and perpendicular to the base (110). Bonding of the bimetallic strips to the said bases (10) is effected as for the third embodiment, except at the elevated intermediate temperature, and then the strip is cut into the individual cell units as before. When the individual strips eventually cool down to the normal working temperature of the cell, in general the ambient temperature, they will naturally bend away from said first area (210) to expose the side having said first colour.

Typically, the said bimaterial strip (200, 300) constitutes a bimetallic strip comprised of two suitable metals having substantially different coefficients of thermal expansion in shearless contact with one another. Said first material may be iron, and said second material may be brass, for example.

In the second, third and fourth embodiments of the present invention, at least the said base (110) of adjacent colour cells (115, 215, 315) are electrically insulated one from another. Such insulation may be achieved by means of an insulating material placed at least between the said bases of adjacent colour cells, or alternatively by means of a non-electrically-conductive space existing between at least the said bases of adjacent colour cells.

The present invention also relates to a picture display device comprising a suitable substrate carrying a plurality of colour cells wherein each colour cell is capable of exhibiting a change in its external colour from a first colour to a second colour, each said colour cell comprising:

a first, upper, substantially transparent layer comprising an inverted substantially transparent prismatic element protruding from a lower surface thereof; said transparent layer being superposed over:

a second, lower, substantially transparent layer comprising an upper concavity complementary to and substantially aligned with said prismatic element, said second transparent layer being superposed over said substrate;

said first transparent layer capable of being displaced a first distance between a first position and a second position, wherein in said first position said concavity is substantial direct optical contact with said prismatic element, and wherein in said second position said concavity is spaced from said prismatic element by a predetermined spacing;

a colour layer comprising said first colour disposed below said second transparent layer and in optical communication therewith;

at least one actuator element in abutting contact with first transparent layer comprising at least one suitable electrical input connection means and at least one suitable electrical output connection means capable of connecting said at least one actuator element to a suitable electrical power source, said at least one actuator element characterised in being capable of increasing at least one dimension thereof in the direction of displacement of said first transparent layer by said first distance in response to the supply of a predetermined voltage and/or current thereto, thereby displacing said first transparent layer to said first position;

whereby said actuator element increases said at least one dimension thereof by said first distance in response to the supply of a predetermined voltage and/or current to said actuator element, thereby propelling said first transparent layer from said first position to said second position and establishing said spacing between said prismatic element and said concavity, said prismatic element having a configuration such as to internally reflect light entering said cell via said upper transparent layer thereby enabling said colour cell to exhibit a second colour as determined by the reflection of external light by said prismatic element, and whereby said actuator element returns to its datum dimension when said electrical power source is subsequently disconnected or alternatively when the polarity of the said voltage and/or current supply is reversed, returning said first transparent layer to the said first position and bringing said concavity is substantial direct optical contact with said prismatic element thereby enabling said first colour on said colour layer to be exhibited by said colour cell.

Thus, in a fifth embodiment of the present invention, the said suitable electrical connections comprises at least one suitable electrical input connection means and at least one suitable electrical output connection means capable of connecting said at least one actuator element to a suitable electrical power source; and furthermore, the said colour change and/or luminescent means comprises:

a first, upper, substantially transparent layer comprising an inverted substantially transparent prismatic element protruding from a lower surface thereof; said transparent layer being superposed over:

a second, lower, substantially transparent layer comprising an upper concavity complementary to and substantially aligned with said prismatic element, said second transparent layer being superposed over said substrate;

said first transparent layer capable of being displaced a first distance between a first position and a second position, wherein in said first position said concavity is substantial direct optical contact with said prismatic element, and wherein in said second position said concavity is spaced from said prismatic element by a predetermined spacing;

a colour layer comprising said first colour disposed below said second transparent layer and in optical communication therewith;

at least one actuator element in abutting contact with first transparent layer comprising said at least one suitable electrical input connection means and said at least one suitable electrical output connection means, said at least one actuator element characterised in being capable of increasing at least one dimension thereof in the direction of displacement of said first transparent layer by said first distance in response to the supply of a predetermined voltage and/or current thereto, thereby displacing said first transparent layer to said first position;

whereby said actuator element increases said at least one dimension thereof by said first distance in response to the supply of a predetermined voltage and/or current to said actuator element, thereby propelling said first transparent layer from said first position to said second position and establishing said spacing between said prismatic element and said concavity, said prismatic element having a configuration such as to internally reflect light entering said cell via said upper transparent layer thereby enabling said colour cell to exhibit a second colour as determined by the reflection of external light by said prismatic element, and whereby said actuator element returns to its datum dimension when said electrical power source is subsequently disconnected or alternatively when the polarity of the said voltage and/or current supply is reversed, returning said first transparent layer to the said first position and bringing said concavity is substantial direct optical contact with said prismatic element thereby enabling said first colour on said colour layer to be exhibited by said colour cell.

Thus, in the fifth embodiment of the present invention, the picture display device (10) comprises a suitable substrate (20) as described with reference to the preferred embodiment, mutatis mutandis, carrying a plurality of colour cells (615), wherein each colour cell (615) is capable of exhibiting a change in its external colour, said change being correlated to the application of an electrical voltage across said colour cell (615). Each said colour cell (615) comprises a colour layer (650) comprising a first colour (41), and further comprises a first upper substantially transparent layer (660) having an upper and a lower surface, (661) and (662) respectively, said first transparent layer (660) being superposed over said substrate (20) and distanced therefrom.

The said first transparent layer (660) comprises a substantially transparent prismatic element (665) wherein the base (666) of the prismatic element (665) is on the lower surface (662) of the said first transparent layer (660). As with the prismatic element (665) of the sixth embodiment, hereinafter described, the prismatic element (665) of the fifth embodiment may similarly take the form of a regular triangular prism, or alternatively a pyramidal form having a rectangular or polygonal base, or alternatively a conical form. Preferably, said prismatic element (665) is integral with said lower surface (662), though alternatively, said prismatic element (665) may be mounted or bonded onto said lower surface (662) by any suitable means. Advantageously, said first transparent layer (660) and said prismatic element (665) comprise substantially identical refractive indices.

The said colour cell (615) further comprises a second transparent layer (680) superposed onto said substrate (20) at least over said colour layer (650), said second transparent layer (680) characterised in comprising an upper concavity (685) aligned with and complementary to said prismatic element (665). Said first transparent layer (660) is superposed over said second transparent layer (680) such as to ensure substantial contact between facing surfaces of the prismatic element (665) and the said concavity (685).

Alternatively, said substrate (20) may constitute the said second transparent layer (680), the substrate (20) thus comprising said upper concavity (685) aligned with and complementary to said prismatic element (665). In this case, said first transparent layer (660) is superposed over said substrate (20) such as to ensure substantial contact between facing surfaces of the prismatic element (665) and the said concavity (685).

Alternatively, said second transparent layer (680) is integral with said substrate (20).

The said colour layer (650) may be disposed at least intermediate said second transparent layer (680) and said substrate (20). Alternatively, said colour layer (650) is disposed on a lower face of said substrate (20) and substantially aligned at least with said prismatic element (665), said substrate (20) being substantially transparent.

The said cell (615) further comprises at least one actuator element (670), and preferably a plurality thereof. Said actuator element (670) is characterised in increasing at least one dimension thereof in response to an electrical voltage applied across the actuator element (670) and/or the passage of an electrical current therethrough, said actuator element (670) typically comprises an active gel or shape memory alloy, among other materials. Alternatively, said actuator element (670) may comprise a suitably-configured piezo-electric crystal. Alternatively, the actuator element (670) may comprise a ferromagnetic material, preferably a ferromagnetic liquid. The actuator element (670) is superposed over said substrate (20) and comprises at least one pair of conductors (620) and (630). The said actuator element (670) is also in contact with, and preferably bonded to, the lower surface (662) of said first transparent layer (660). At least one suitable electrical input connection means (120) and at least one suitable electrical output connection means (130) are operatively connected to said conductors (620) and (630), respectively, for enabling said conductors (620) and (630) to be electrically connected to a suitable electrical power source, and thus to provide an electrical voltage across at least part of said actuator element (670) and/or an electrical current therethrough. The said actuator element (670) increases at least one dimension thereof from a datum magnitude (D61) to an extended magnitude (D62) in response to an electrical voltage applied across the actuator element (670) and/or the passage of an electrical current therethrough, by means of said conductors (620) and (630). In this embodiment, said dimension is chosen as the depth of the actuator element (670) taken in the direction extending perpendicularly from the substrate (20) to the said transparent layer (660).

The colour cell (615) further comprises at least one guiding means for facilitating reciprocation of said first transparent layer (660) between said first position and said second position. Thus, at least one guiding means (690) substantially enables said actuator element (670) to expand between said datum magnitude (D61) to said extended magnitude (D62). Typically, the guiding means (690) may comprise a suitably profiled well (692) in said second transparent layer (680). Thus the guiding means (690) may comprise a number of narrow rectangular wells (692) aligned along each side of the cell (615) and extending to said substrate (20), and which permit direct contact of said actuator element (670) (optionally including said lower conductor (630)) with the said substrate (20). Alternatively, said guiding means (690) may comprise a number of rectangular wells (693) aligned along each side of the cell (615) and extending partially into said second transparent layer (680), wherein said actuator element (670) is thus only afforded indirect contact with the said substrate (20).

Thus, the said datum magnitude (D61) is such as to ensure substantial contact between facing surfaces of said prismatic element (665) and said concavity (685). Under this condition, light entering said colour cell (615) via said upper transparent layer (660) may be reflected by said first colour (41) and thus enable said colour cell (615) to exhibit said first colour (41), FIGS. 11(*a*) and 11(*c*). When voltage is applied across the cell (615), and/or a current flows therethrough, in particular by means of said conductors (620) and (630), the said actuator element (670) extends to said extended magnitude (D62), pushing against the said first transparent layer (660) and thus separating the same from the said second transparent layer (680), concurrently separating the said concavity (685) from the said prismatic, element (665), and providing an air gap or clearance (611) therebetween. Said prismatic element (665) is suitably configured so, that in the absence of contact with said concavity (685), any light entering said cell (615) via said first transparent layer (660) is internally reflected by the prismatic element (665) and back out of the cell (615). Advantageously, a passage (616) through the said prismatic element (665) and said first transparent layer (660) facilitates the passage of ambient air, for example, to and from said clearance (611) during operation of the said colour cell (615). When the voltage is switched off, or alternatively the polarities reversed, the depth of the actuator element (670) reduces back to (D61), thereby reestablishing contact between the said prismatic element (665) and the concavity (685). An optically continuous path is thus reestablished between the prismatic element (665) and second transparent layer (680) such as to enable light passing through the prismatic element (665) to continue through the said second transparent layer (680) at the said concavity (685). Advantageously, at least one passage is comprised on said first transparent layer (660), optionally including said prismatic element (665), for enabling fluid communication between said spacing or clearance (611) and the external environment at least when said first transparent layer (660) is in said first position. Thus, at least one passage (616) through the said prismatic element (665) and said transparent layer (660) facilitates the passage of ambient air, for example, to and from said clearance (611) during operation of the said colour cell (615).

Preferably, the said prismatic element (665) and said second transparent layer (680) comprise substantially equal refractive indexes.

In the fifth embodiment of the present invention, at least the said conductors (620), (630) of adjacent colour cells (615) are electrically insulated one from another. Such insulation may be achieved by means of an insulating material placed at least between the said conductors (620), (630) of adjacent colour cells (615), or alternatively by means of a non-electrically-conductive space existing between at least the said conductors (620), (630) of adjacent colour cells (615).

The present invention also relates to a method for manufacturing the device (10) comprising said cells (615) of the said fifth embodiment, comprising the steps of:

(a) preparing a suitable substrate;

(b) suitably aligning and bonding said second transparent layer onto said substrate, said second transparent layer comprising suitable indentations over the upper surface thereof corresponding to said concavities of said cells;

(c) forming at least one suitable well in said second transparent layer corresponding to each said colour cell;

(d) printing suitable electrical input means or electrical output means in said well using a suitable conducting ink;

(e) inserting said actuator element in said well at least over said electrical input connection means or said electrical output connection;

(f) printing suitable electrical output means or electrical input means, respectively, over said actuator element using a suitable conducting ink.

(g) aligning and suitably bonding said first transparent layer onto said actuator element and/or said electrical output means, or electrical input means respectively;

(h) cutting suitable slots in said first transparent layer to separate said transparent layer into sections each corresponding to said cells;

(i) applying a colour layer of said first colour in step (a) optionally above or below said substrate.

Optionally, said colour cells do not comprise said second transparent layer, wherein step (b) is omitted, and all operations in steps (c) to (i) relating to said second transparent layer are performed with reference to said substrate (20), mutatis mutandis, said substrate (20) being substantially transparent.

Thus the colour cell (615) of the fifth embodiment may be manufactured in a layer by layer manner as follows. Said colour layer (650) is superposed and bonded on said substrate (20) or alternatively printed or coated thereon. Next, said second transparent layer (680) is superposed and bonded onto said substrate (20) including said colour layer (650). Guiding means (690) in the form of substantially rectangular wells (692) or (693) are then formed on said second transparent layer (680) along at least two opposite sides of the cell (615) by etching or by drilling by means known in the art, for example by laser. An actuating element (670) comprising conductors (620) and (630), and corresponding electrical input and output connection means, (120) and (130) respectively, is inserted into said guiding means (690).

Finally, said first transparent layer (660) comprising integrally-formed prismatic elements (665) is aligned over the cell (615) and bonded onto the said actuator elements (670) and/or the upper conductors (620). Finally, the said first transparent layer (660) is cut along two orthogonal series of parallel lines (668) and (669) to the full depth of the said first transparent layer (660), thereby defining the free edges (667) of the said first transparent layer (660) of the cell (615).

The present invention also relates to a picture display device comprising a suitable substrate carrying a plurality of colour cells wherein each colour cell is capable of exhibiting a change in its external colour from a first colour to a second colour, each said colour cell comprising:

an upper substantially transparent layer comprising an inverted substantially transparent prismatic element protruding from a lower surface thereof, said transparent layer being superposed over said substrate and distanced therefrom by suitable spacing means;

a substantially transparent movable element comprising an upper concavity complementary to and substantially aligned with said prismatic element, said movable element capable of being displaced a first distance between a first position and a second position, wherein in said first position said concavity is spaced from said prismatic element by a predetermined spacing, and wherein in said second position said concavity is substantial direct optical contact with said prismatic element;

a colour layer comprising said second colour disposed below said movable element and in optical communication therewith;

guiding means for enabling said movable element to reciprocate between said first position and said second position;

at least one actuator element in abutting contact with said movable element comprising at least one suitable electrical input connection means and at least one suitable electrical output connection means capable of connecting said actuator element to a suitable electrical power source, said actuator element characterised in being capable of increasing at least one dimension thereof in the direction of displacement of said movable element by said first distance in response to the supply of a predetermined voltage and/or current thereto, thereby displacing said movable element to said first position;

whereby said at least one actuator element increases said at least one dimension thereof by said first distance in response to the supply of a predetermined voltage and/or current to said actuator element, thereby propelling said movable element from said first position to said second position and bringing said concavity is substantial direct optical contact with said prismatic element thereby enabling said second colour on said colour layer to be exhibited by said colour cell, and whereby said actuator element returns to its datum dimension when said electrical power source is subsequently disconnected or alternatively when the polarity of the said voltage and/or current supply is reversed, returning said movable element to the said first position and establishing said spacing between said prismatic element and said concavity, said prismatic element having a configuration such that in the said first position the said prismatic element internally reflects light entering said cell via said upper transparent layer thereby enabling said colour cell to exhibit a first colour as determined by the reflection of external light by said prismatic element.

Thus, in the sixth embodiment of the present invention, the said suitable electrical connections comprises at least one suitable electrical input connection means and at least one suitable electrical output connection means capable of connecting said actuator element to a suitable electrical power source; and furthermore the said colour change and/or luminescent means comprises:

an upper substantially transparent layer comprising an inverted substantially transparent prismatic element protruding from a lower surface thereof, said transparent layer being superposed over said substrate and distanced therefrom by suitable spacing means;

a substantially transparent movable element comprising an upper concavity complementary to and substantially aligned with said prismatic element, said movable element capable of being displaced a first distance between a first position and a second position, wherein in said first position said concavity is spaced from said prismatic element by a predetermined spacing, and wherein in said second position said concavity is substantial direct optical contact with said prismatic element;

a colour layer comprising said second colour disposed below said movable element and in optical communication therewith;

guiding means for enabling said movable element to reciprocate between said first position and said second position;

at least one actuator element in abutting contact with said movable element comprising said at least one suitable electrical input connection means and at least one suitable electrical output connection means, said actuator element characterised in being capable of increasing at least one dimension thereof in the direction of displacement of said movable element by said first distance in response to the supply of a predetermined voltage and/or current thereto, thereby displacing said movable element to said first position;

whereby said at least one actuator element increases said at least one dimension thereof by said first distance in response to the supply of a predetermined voltage and/or current to said actuator element, thereby propelling said movable element from said first position to said second position and bringing said concavity is substantial direct optical contact with said prismatic element thereby enabling said second colour on said colour layer to be exhibited by said colour cell, and whereby said actuator element returns to its datum dimension when said electrical power source is subsequently disconnected or alternatively when the polarity of the said voltage and/or current supply is reversed, returning said movable element to the said first position and establishing said spacing between said prismatic element and said concavity, said prismatic element having a configuration such as to internally reflect light entering said cell via said upper transparent layer thereby enabling said colour cell to exhibit a first colour as determined by the reflection of external light by said prismatic element.

Figure 12:
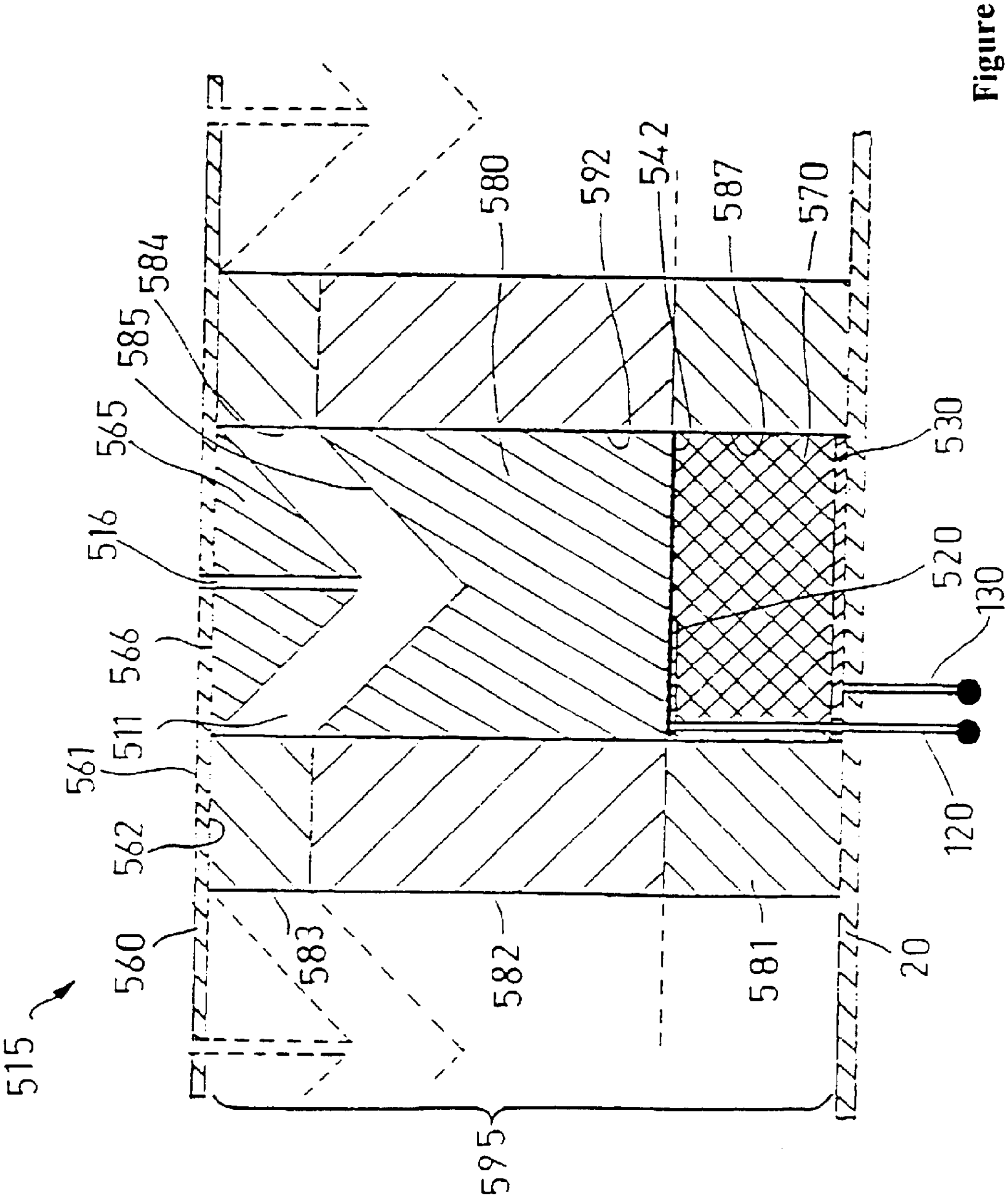
FIG. 12 illustrates in side cross-sectional side view a colour cell according to the sixth embodiment of the present invention.
Figure 13A:
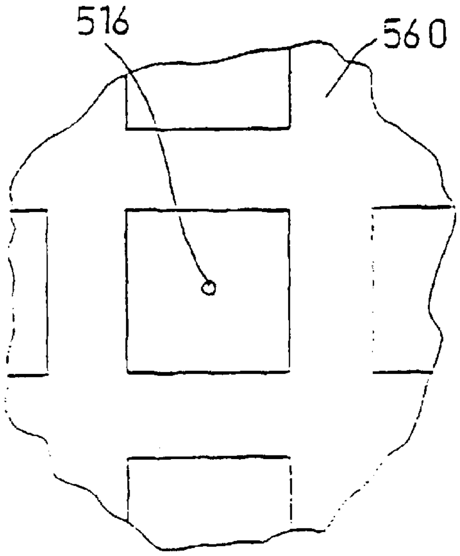
FIGS. 13(*a*) to 13(*d*) illustrate the colour cell of FIG. 12 in top view when electrically disconnected from any electrical power source (FIG. 13(*a*)) and when connected to an electrical power source (FIG. 13(*b*)), and in corresponding side cross-sectional views (FIG. 13(*c*) and FIG. 13(*d*), respectively).
Figure 13B:
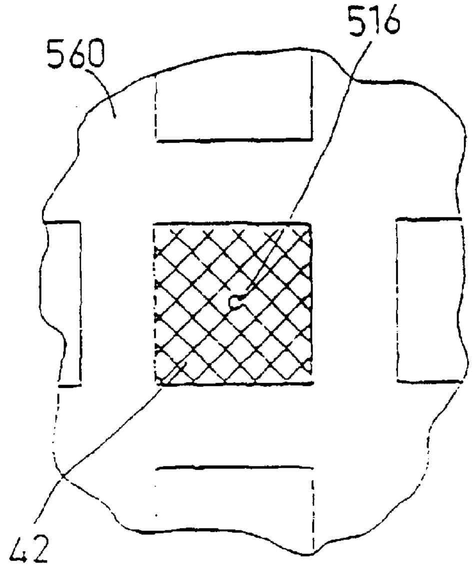
Figure 13C:
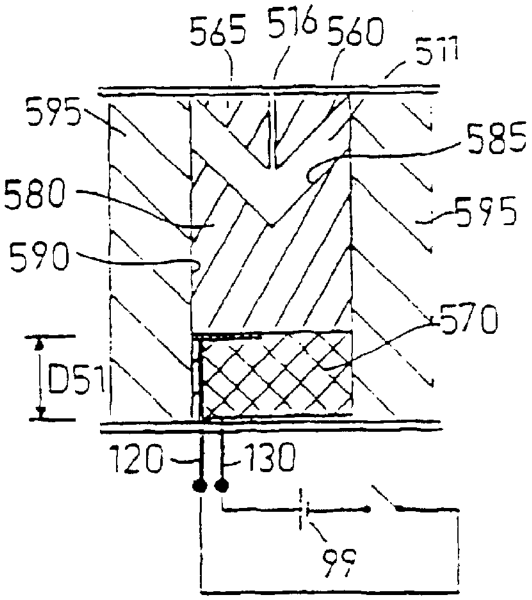
Figure 13D:
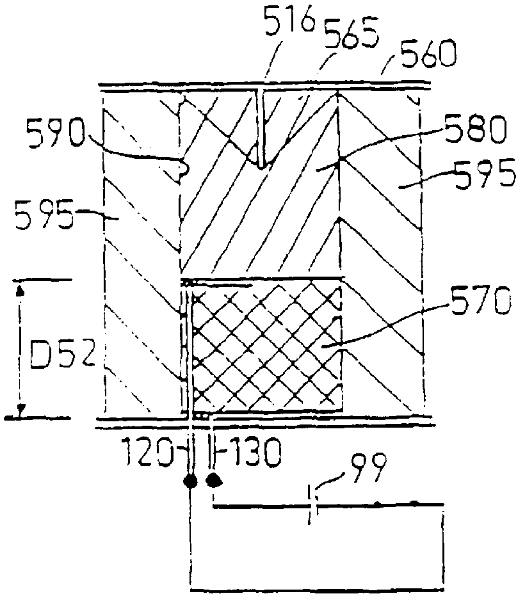
Figure 14:
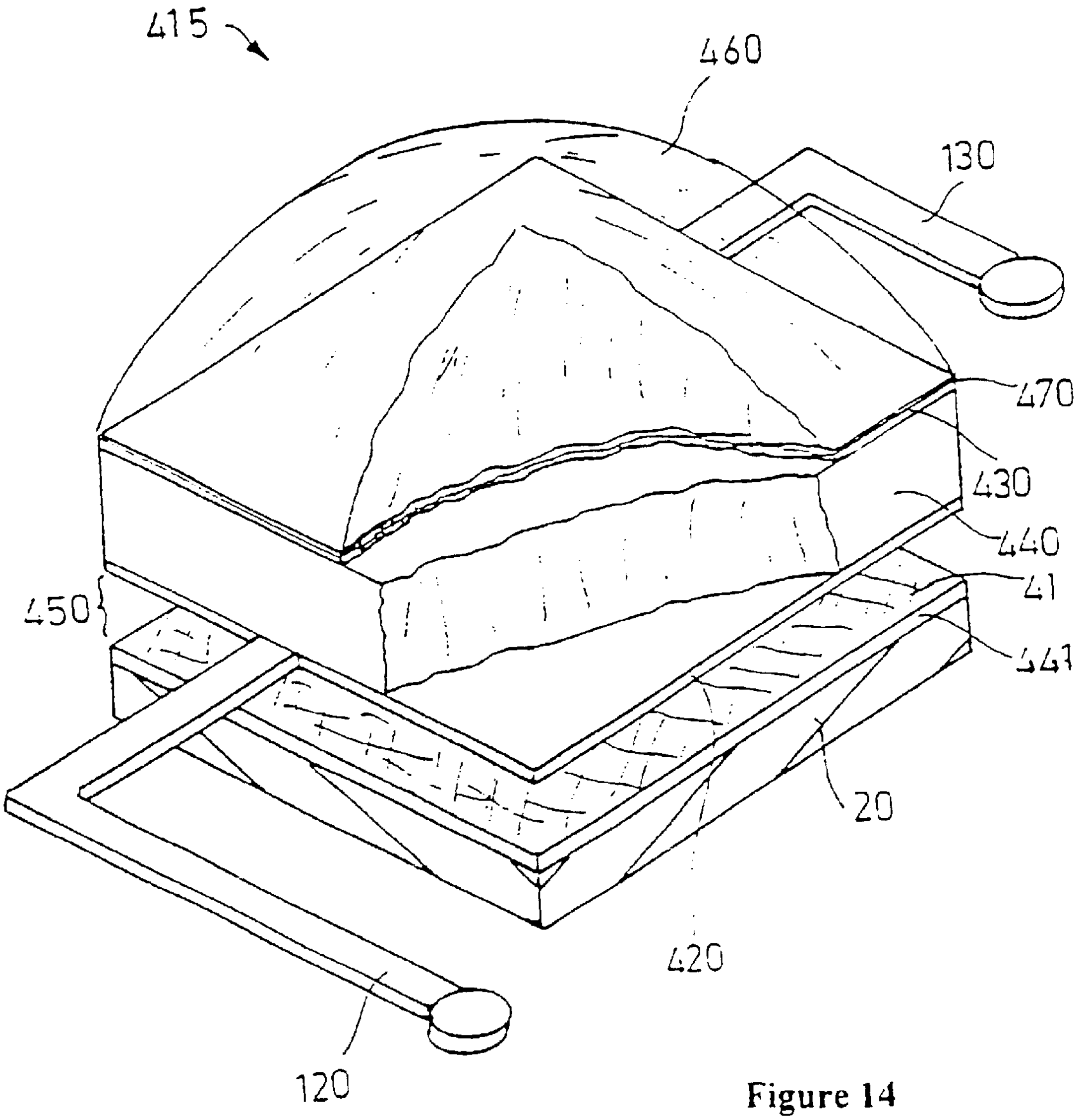
FIG. 14 illustrates in partial cutaway perspective view a colour cell according to the seventh embodiment of the present invention.
Figure 15A:
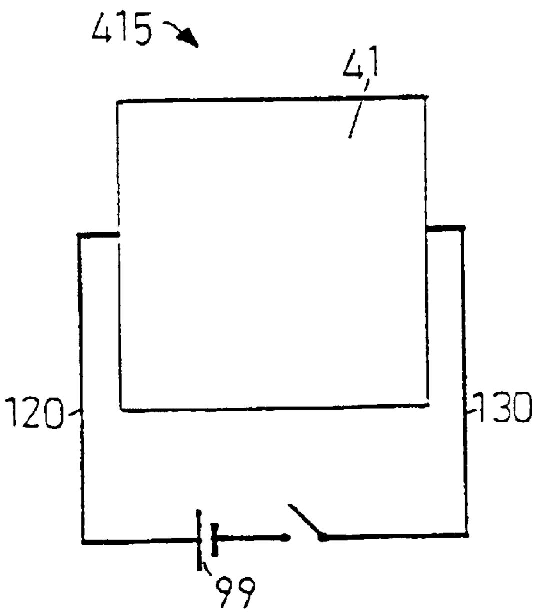
FIGS. 15(*a*) to 15(*d*) illustrate the colour cell of FIG. 14 in top view when electrically disconnected from any electrical power source (FIG. 15(*a*)) and when connected to an electrical power source (FIG. 15(*b*)), and in corresponding side cross-sectional views (FIG. 15(*c*) and FIG. 15(*d*), respectively).
Figure 15B:
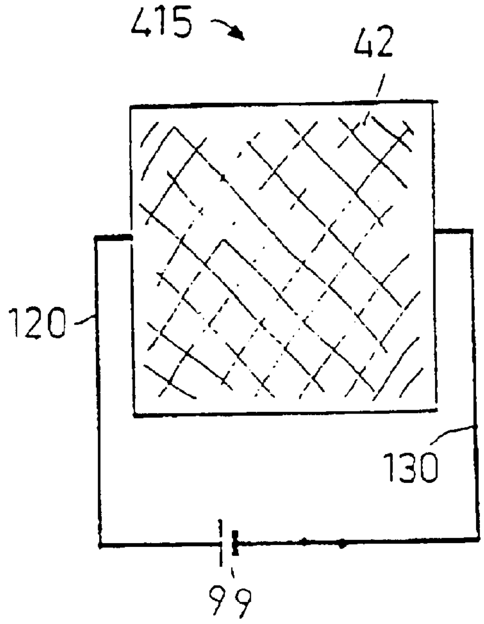
Figure 15C:
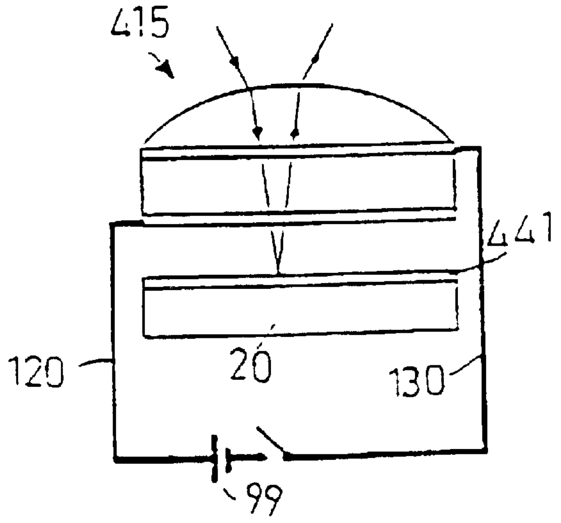
Figure 15D:
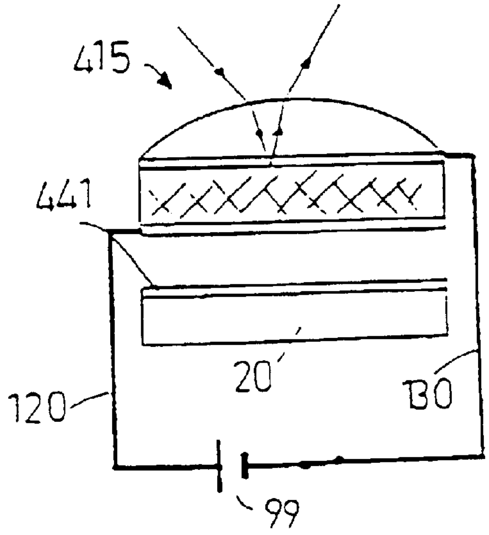

Thus, in a sixth embodiment of the present invention, the picture display device (10) comprises a suitable substrate (20) as hereinbefore described with reference to the preferred embodiment, mutatis mutandis, carrying a plurality of colour cells (515) wherein each colour cell (515) is capable of exhibiting a change in its external colour, said change being correlated to the application of an electrical voltage across said colour cell (515) and/or a current flows therethrough. Referring to FIGS. 12 and 13, each said colour cell (515) of the sixth embodiment of the present invention comprises an upper substantially transparent layer (560) having an upper and a lower surface, (561) and (562) respectively, said transparent layer (560) being superposed over said substrate (20) and distanced therefrom. The said transparent layer (560) comprises a substantially transparent prismatic element (565), wherein the base (566) of the prismatic element (565) is on the lower surface (562) of the said transparent layer (560). Typically, said prismatic element (565) may take the form of a regular triangular prism, or alternatively a pyramidal form having a rectangular or polygonal base, or alternatively a conical form. Preferably, said prismatic element (565) is integral with said lower surface (562), though alternatively, said prismatic element (565) may be mounted or bonded onto said lower surface (562) by any suitable means. Advantageously, said transparent layer and said prismatic element comprise substantially identical refractive indices.

The colour cell (515) further comprises an actuator element (570) which is characterised in increasing at least one dimension thereof in response to an electrical voltage applied across the actuator element (570) and/or a current flows therethrough. Said actuator element (570) typically comprises an active gel or shape memory alloy, or any other suitable material. Alternatively, said actuator element (570) may comprise a suitably-configured piezoelectric crystal. Alternatively, the actuator element (570) may comprise a ferromagnetic material, preferably a ferromagnetic liquid. The actuator element (570) is superposed over and in direct or indirect contact with said substrate (20) and comprises at least one pair of conductors (520) and (530). At least one suitable electrical input connection means (120) and at least one suitable electrical output connection means (130) are operatively connected to said conductors (520) and (530), respectively, for enabling said conductors (520) and (530) to be electrically connected to a suitable electrical power source, and thus to provide a voltage across at least part of said actuator element (570) and/or a current therethrough. The said actuator element (570) increases at least one dimension thereof from a datum magnitude (D51) to an extended magnitude (D52) in response to an electrical voltage applied by means of said conductors (520) and (530) across the actuator element (570). In this embodiment, said dimension is chosen as the depth of the actuator element (570) taken in the direction extending perpendicularly from the substrate (20) to the said transparent layer (560).

The colour cell (515) of the sixth embodiment of the present invention further comprises a substantially transparent movable element (580) superposed on and in direct or indirect contact with said actuator element (570). Said movable element (580) comprises an upper concavity (585) complementary to and substantially aligned with said prismatic element (565). Preferably, said movable element (580) is suitably bonded or attached directly or indirectly to said actuator element (570).

The said cell (515) further comprises a second colour (42) below said movable element (580). Said second colour may be in the form of a layer (542) of colour at least between said movable element (580) and said actuator element (570), and/or one of said conductors (520) and (530), providing said conductor (520) or (530), respectively, is disposed between said actuator element (570) and said movable element (580). Alternatively, if said actuator element (570) and where appropriate said conductors (520) and (530) are made from substantially transparent materials, the said second colour (42) of the said cell (515) may be in the form of a colour layer between said substrate (20) and at least said actuator element (570), and/or one of said conductors (520) and (530), providing said conductor (520) or (530), respectively, is disposed at least partially between said substrate (20) and said actuator element (570). Alternatively, the said actuator element (570) itself may be of said second colour (42). Alternatively, at least said conductor (520) may be of said second colour (42). Alternatively, said colour layer is disposed on a lower face of said substrate (20) and substantially aligned at least with said movable element (580), at least said actuator element (570) and said substrate (20) being substantially transparent, and preferably said conductors (520) and (530) are also substantially transparent.

The actuator element (570) is held in situ in substantial alignment with the movable element (580) by any suitable means, for example by means of a first spacing layer (581) superposed over said substrate (20) and comprising a suitable well (587) for accommodating said actuator element (570). Alternatively, said well (587) may be comprised in the substrate (20) itself, wherein said first spacing layer (581) may be redundant. Alternatively, said first spacing layer (581) and said substrate (20) form an integrated unit, said well being comprised in said fist spacing layer (581) and optionally extending at least into said substrate (20).

The colour cell (515) further comprises guiding means (590) for enabling said movable element (590) to reciprocate between an upper position and a lower position corresponding the change in dimension of said actuator element (570) from said datum magnitude (D51) to said extended magnitude (D52), respectively. Typically, the guiding means may take the form of a number of parallel rail columns disposed between the said substrate (20) and the said transparent layer (560) and substantially orthogonal to both (the said substrate (20) and the said transparent layer (560) being substantially parallel), and located around the periphery of the said movable element (580). Alternatively, the rail columns may instead be disposed between the upper surface of said first spacing layer (581) and the said transparent layer (560). The movable element (580) may thus laterally abut the rail columns as it slides up and down to reciprocate between said upper position and said lower position to make and break contact, respectively, with said prismatic element (565). Alternatively, a second spacing layer (582) may be superposed onto said first spacing layer (581), said guiding means (590) comprising a suitably profiled well (592) in said second spacing layer (582). Advantageously, the said second spacing layer comprises a width substantially equal to the height of said movable element (580).

The said colour cell (515) comprises suitable spacing means (595) for maintaining a suitable clearance (511) between the said prismatic element (565) and said movable element (580) when the cell (515) is not connected to any electrical power source, while ensuring that substantial contact between the prismatic element (565) and said concavity (585) is achieved when a predetermined electrical voltage is applied to said cell (515) and/or an electrical current flows therethrough. Thus, the said rail columns, hereinbefore described, may constitute the spacing means, the rail columns being sized appropriately. Alternatively, the said first spacing layer (581) together with the second spacing layer (582) may constitute said spacing means, the total width of the said first spacing layer (581) and said second spacing layer (582) being such as to provide the required clearance (511). Alternatively, and preferably, where the said second spacing layer (582) is of substantially the same height as that of the said movable element (580), and the said actuator element (570) is of substantially the same depth as that of the said first spacing layer (581), the said spacing means (595) may comprise in addition to said first spacing layer (581) and said second spacing layer (582), a third spacing layer (583). Preferably, said third spacing layer (583) is superposed over said second spacing layer (582) and comprises an aperture (584) sufficient to permit the said movable element (580) to pass therethrough and establish contact with the said prismatic element (565) as hereinbefore described. The depth, i.e., thickness, of the third spacing layer (583) will then be similar to the required clearance (511), which in turn is substantially identical to the arithmetical difference between the said datum magnitude (D51) and said extended magnitude (D52).

Thus, the said extended magnitude (D52) is such as to ensure substantial contact between facing surfaces of said prismatic element (565) and said concavity (585). Under this condition, light entering said colour cell (515) via said upper transparent layer (560) may be reflected by said second colour (42) and thus enable said colour cell (515) to exhibit said second colour (42), FIGS. 13(*b*) and 13(*d*). When the said power source (99) is disconnected from the cell (515), the said actuator element (570) returns to its original datum magnitude (D51), lowering the said movable element (580) and breaking contact between the same and the said prismatic element (565), thus providing said clearance (511) between said concavity (585) and said prismatic element (565). Said prismatic element (565) is suitably configured so, that in the absence of contact with said concavity (585), any light entering said cell via said upper transparent layer is internally reflected by the prismatic element and back out of the cell (515), FIGS. 13(*a*) and 13(*c*). Advantageously, at least one passage is comprised on said upper transparent layer, optionally including said prismatic element, for enabling fluid communication between said spacing and the external environment at least when said movable element is in said first position. Thus, at least one passage (516) through the said prismatic element (565) and said transparent layer (560) facilitates the passage of ambient air, for example, to and from said clearance (511) during operation of the said colour cell (515).

Thus, when an electrical voltage is applied to said cell (515) and/or a current flows therethrough as hereinbefore described, the said actuator element (570) increases its height from (D51) to (D52) thereby pushing against the movable element (580) which is brought into contact at its concavity (585) with the prismatic element (565). An optically continuous path is thus established between the prismatic element (565) and movable element (580) such as to enable light passing through the prismatic element (565) to continue through the said movable element (580) at the said concavity (585). Light entering the cell (515) via said transparent layer (560) thus penetrates the cell and is reflected by the said second colour (42), thereby enabling the cell (515) to exhibit this colour. When the said power source (99) is disconnected or alternatively if its polarity is reversed, the height of the actuator element (570) reduces back to (D51), thereby disengaging contact between the prismatic element (565) and the movable element (580). Light now entering the cell (515) via the transparent layer (560) will penetrate the prismatic element (565) and be internally reflected by it, the cell (515) thus appearing to reflect ambient light, thus masking the said second colour (42).

Preferably, the said prismatic element (565) and said movable element (580) comprise substantially equal refractive indexes.

In the sixth embodiment of the present invention, at least the said conductors (520), (530) of adjacent colour cells (515) are electrically insulated one from another. Such insulation may be achieved by means of an insulating material placed at least between the said conductors (520), (530) of adjacent colour cells (515), or alternatively by means of a non-electrically-conductive space existing between at least the said conductors (520), (530) of adjacent colour cells (515).

The present invention also relates to a method for manufacturing the device (10) comprising said colour cells (515) of the said sixth embodiment, comprising the steps of:

(a) preparing a suitable substrate;

(b) suitably bonding a first spacing layer onto said substrate;

(c) forming a well in said first spacing layer corresponding to each said colour cell;

(d) printing suitable electrical input means or electrical output means in said well using a suitable conducting ink;

(e) inserting said actuator element in said well at least over said electrical input connection means or said electrical output connection;

(f) printing suitable electrical output means or electrical input means, respectively, over said actuator element using a suitable conducting ink.

(g) suitably aligning and bonding a second spacing layer onto said first spacing layer around the periphery of each said well, said second spacing layer comprising suitable indentations over the upper surface thereof corresponding to said concavities of said cells;

(h) cutting suitable slots in said second spacing layer to separate said movable element from said second spacing layer;

(i) suitably bonding a third spacing layer onto said second spacing element and forming an aperture on said third element at least equal to the cross-sectional profile of said movable element;

(j) suitably bonding said upper transparent layer onto said third spacing layer;

(k) applying a colour layer of said second colour either in step (a) optionally above or below said substrate, or in step (g) on the lower surface of said second spacing element prior to bonding same onto said first spacing layer.

Optionally, said colour cells do not comprise said first spacing layer, wherein step (b) is omitted, and all operations in steps (c) to (k) relating to said first spacing layer are performed with reference to said substrate (20), mutatis mutandis.

Thus, the colour cell (515) of the sixth embodiment may be manufactured in a layer by layer manner as follows. Said first spacing layer (581) is superposed and bonded on said substrate (20), and said well (587) is etched or drilled into said first spacing layer (581) by means known in the art, for example by laser. An actuator element (570) comprising conductors (520) and (530), and corresponding electrical input and output connection means, (120) and (130) respectively, is inserted into said well (587). Next, a second layer of an optically transparent material is superposed onto said first layer. This second layer comprises indentations across its upper surface corresponding to the concavity (585) of each cell (515), and the second layer is bonded onto the said first spacing layer (581) at predetermined locations or along its entire surface. A laser then cuts through the second layer along number of parallel and orthogonal lines in order to divide the said second layer into a movable element (580) and second spacing layer (582) for each cell (515). A third spacing layer (583) is then superposed and bonded onto said second spacing layer (582), while cutting into said third spacing layer (583) said aperture (584). Finally, said upper transparent layer (560) comprising integrally-formed prismatic elements (565) is aligned over the cell (515) and bonded onto the said third spacing layer (583).

The present invention also relates to a picture display device comprising a suitable substrate carrying a plurality of colour cells wherein each colour cell is capable of exhibiting a change in its external colour from a first colour to a second colour, each said colour cell comprising:

a colour layer superposed on said substrate;

a layer of liquid crystal material comprising at least one suitable electrical input connection means and at least one suitable electrical output connection means capable of connecting said liquid crystal layer to a suitable electrical power source, said liquid crystal layer capable of exhibiting a colour change in response to the supply of a predetermined voltage and/or current thereto;

said layer of liquid crystal material being substantially superposed over said colour layer and substantially spaced therefrom by at least a suitable clearance.

Thus, in a seventh embodiment of the present invention, the said suitable electrical connections comprises at least one suitable electrical input connection means and at least one suitable electrical output connection means capable of connecting said liquid crystal layer to a suitable electrical power source,; and furthermore, said colour change and/or luminescent means comprises:

a colour layer superposed on said substrate;

a layer of liquid crystal material comprising said at least one suitable electrical input connection means and at least one suitable electrical output connection means, said liquid crystal layer capable of exhibiting a colour change in response to the supply of a predetermined voltage and/or current thereto;

said layer of liquid crystal material being substantially superposed over said colour layer and substantially spaced therefrom by at least a suitable clearance.

Optionally, the said liquid crystal layer is capable of exhibiting a colour change from said first colour to colourless in response to the supply of a predetermined voltage and/or current to said liquid crystal layer, and the said colour layer is of said second colour, such that the said colour cell may exhibit said second colour when said liquid crystal layer is colourless, wherein said first colour is the colour exhibited by the said liquid crystal layer when opaque.

Alternatively, the said liquid crystal layer is capable of exhibiting a colour change from colourless to said second colour in response to the supply of a predetermined voltage and/or current to said liquid crystal layer, and the said colour layer is of said first colour, such that the said colour cell may exhibit said first colour when said liquid crystal layer is colourless, wherein said second colour is the colour exhibited by the said liquid crystal layer when opaque.

Thus, in a seventh embodiment of the present invention, the picture display device (10) comprises a suitable substrate (20) as hereinbefore described with reference to the preferred embodiment, mutatis mutandis, carrying a plurality of colour cells (415) wherein each colour cell is capable of exhibiting a change in its external colour, said change being correlated to the application of an electrical voltage across said colour cell (415) and/or the passage of an electrical current therethrough. Each colour cell (415) of the seventh embodiment comprises a colour layer (441) on said substrate (20). The colour cell (415) further comprises a layer (440) of a liquid crystal material, and at least part of said layer (440) is sandwiched between a pair of conductors (420) and (430) which are capable of creating an electric field between them. At least one suitable electrical input connection means (120) and at least one suitable electrical output connection means (130) are operatively connected to said conductors (420) and (430), respectively, for enabling said conductors (420) and (430) to be electrically connected to a suitable electrical power source, and thus to provide a voltage across at least part of said layer (440) and/or an electrical current therethrough. The said layer (440) may be colourless, i.e., transparent, when the cell (415) is not connected to any electrical power source, becoming opaque (and preferably said second colour) when said liquid crystal layer (440) is subjected to an electric field in response to the passage of an electrical current to said conductors (420) and (430) and/or when an electrical current flows through said layer (440), wherein said colour layer (441) comprises said first colour (41).

Alternatively, the said layer (440) may be opaque (and preferably of said first colour), when the cell (415) is not connected to any electrical power source, becoming colourless, i.e., transparent, when said liquid crystal layer (440) is subjected to an electric field in response to the passage of an electrical current to said conductors (420) and (430) and/or when an electrical current flows through said layer (440), wherein said colour layer (441) comprises said second colour (42).

The said colour cell (415) further comprises a gap or clearance (450) at least between said colour layer (441) on said substrate (20) and said layer (440). Said clearance (450) substantially prevents the colour of said colour layer (441) showing through said liquid crystal layer (440), when opaque, which would be so to a significant degree at least, if the said liquid crystal layer (440) were in direct contact with said colour layer (441). Without said clearance, the said first and said second colours exhibited by the said cell (415) would not appear to be significantly different.

The conductors (420) and (430) are typically made from a transparent material, such as for example indium tin oxide or tin oxide.

Advantageously, the said display device according to the seventh embodiment further comprises light scattering means superposed over the said liquid crystal layer (440), thereby improving the range of possible viewing angles. The said light scattering means may comprise a layer of water droplets (460) disposed over said liquid crystal layer and suitably electrically insulated therefrom, for example by means of a transparent insulating layer (470). Alternatively, the light scattering means may comprise a layer of light diffractive material comprising at least one and preferably a plurality of light scattering centers on its surface. Said light diffractive layer may comprise a relatively thin transparent plastic layer in which said light-scattering centres are each in the form of transparent substantially hemispherical protrusions, for example. Typically, said water droplets and said hemispherical protrusions are preferably not greater than the size of the cell (415).

In the seventh embodiment of the present invention, at least the said base (110) of adjacent colour cells (415) are electrically insulated one from another. Such insulation may be achieved by means of an insulating material placed at least between the said corresponding conductors (420) and (430) of adjacent colour cells, or alternatively by means of a non-electrically-conductive space existing between at least the said corresponding conductors (420) and (430) of adjacent colour cells.

The present invention also relates to a method for manufacturing the device (10) comprising said colour cells (415) of the said seventh embodiment, comprising the steps of:

(a) preparing a suitable substrate;

(b) printing a colour layer on said substrate;

(c) printing suitable spacers along the periphery of each cell;

(d) forming suitable substantially colourless electrical input means or electrical output means over said spacers using a paste mask method in which desired parts of a foil of suitable material superposed over said spacers is rendered, or remains conductive, while other parts remain, or are rendered, respectively, non-conductive;

(e) applying a layer of suitable liquid crystal material at least over said electrical input connection means or said electrical output connection;

(f) forming suitable substantially colourless electrical output means or electrical input means, respectively, over said liquid crystal material using a paste mask method.

Optionally, step (f) is followed by the following step:

(g) aligning and suitably bonding a suitable layer of light diffractive material over said cells, such that at least one light-scattering centre is aligned over each said cell (415).

Thus, the structure of the colour cell (415) of the seventh embodiment is particularly suitable for enabling such cells to be manufactured layer by layer in a manner similar to that used in manufacturing printed circuits and integrated circuits and microchips, as well as by suitable printing methods.

The present invention also relates to a picture display device comprising a suitable substrate carrying a plurality of colour cells wherein each colour cell is capable of exhibiting a change in its external colour from a first colour to a second colour, each said colour cell comprising:

a layer of electrochromic material comprised on said substrate, said electrochromic material capable of changing colour from said first colour to second colour in response to the passage of a suitable electrical current therethrough and/or the application of a suitable voltage thereto;

at least one pair of electrical conductors in electrical contact with said electrochromic layer, said pair of electrical conductors capable of being electrically connected to a suitable electrical power source and adapted to provide a suitable current and/or voltage to said electrochromic layer such as to enable said cell to exhibit a colour change from said first colour to second colour.

Thus, in an eighth embodiment of the present invention, the said colour change and/or luminescent means comprises a layer of electrochromic material comprised on said substrate, said electrochromic material capable of changing colour from said first colour to second colour in response to the passage of a suitable electrical current therethrough and/or the application of a suitable voltage thereto; and furthermore, said suitable electrical connections comprises at least one pair of electrical conductors in electrical contact with said electrochromic layer, said pair of electrical conductors capable of being electrically connected to a suitable electrical power source and being adapted to provide a suitable current and/or voltage to said electrochromic layer such as to enable said cell to exhibit a colour change from said first colour to second colour.

Figure 16:
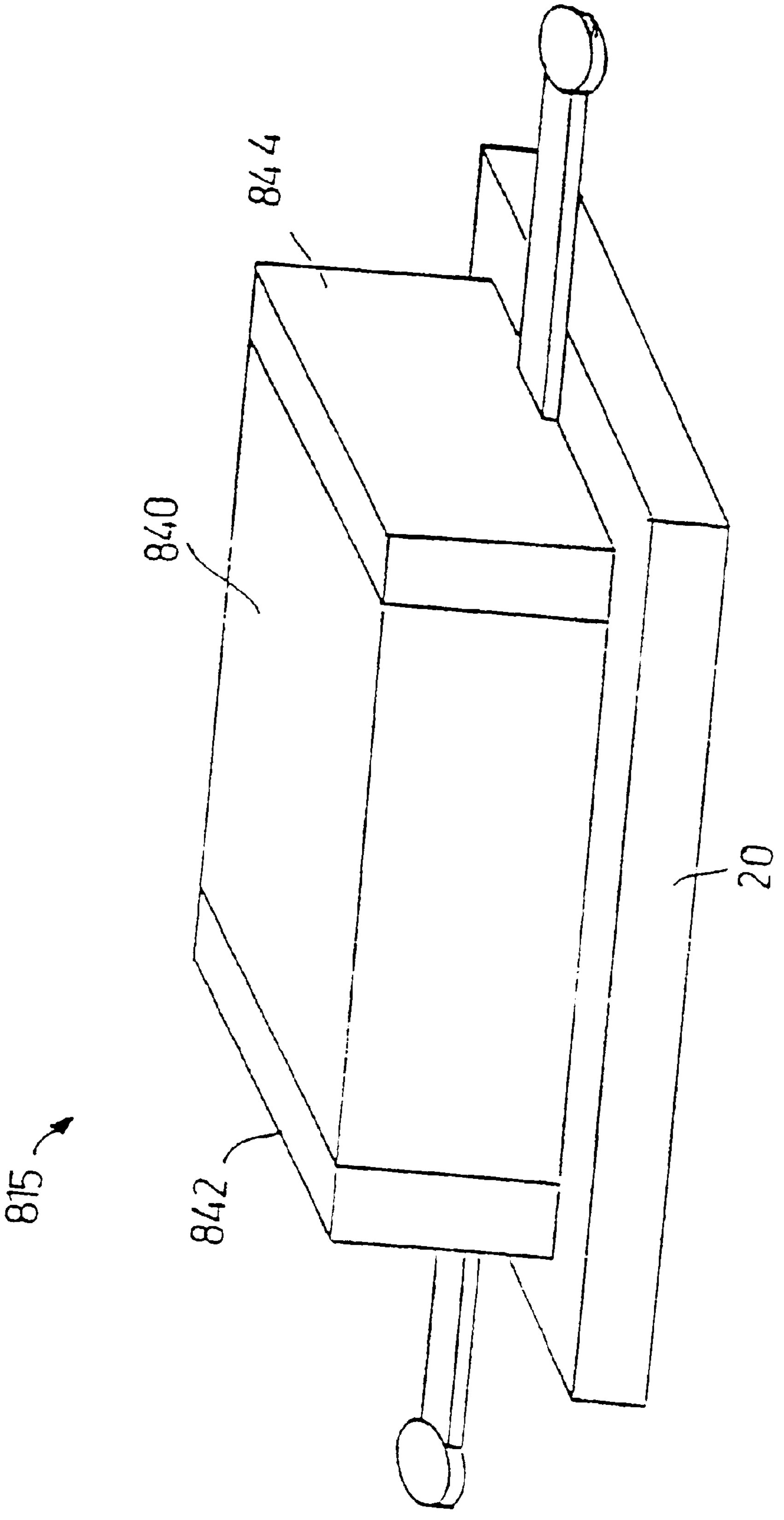
FIG. 16 illustrates in perspective view a colour cell according to the eighth embodiment of the present invention.

Thus, in the eighth embodiment of the present invention, and with reference to FIG. 16, the said device (10) comprises a substrate (20), as hereinbefore described with reference to the preferred embodiment, mutatis mutandis, carrying a plurality of colour cells (815), wherein each colour cell (815) is capable of exhibiting a colour change in its external colour, said colour change being correlated to the passage of electrical current through the cell, or additionally or alternatively, to the application of electrical voltage across said colour cell (815). Each colour cell (815) comprises a layer of electrochromic material (840) comprised on said substrate, said electrochromic material capable of changing colour from said first colour to second colour in response to the passage of a suitable electrical current therethrough and/or the application of a suitable voltage thereto. The electrochromic layer (840) comprises at least one pair of electrical conductors (842), (844) in electrical contact with said electrochromic layer (840). The said pair of electrical conductors (842), (844) said pair of electrical conductors capable of being electrically connected to a suitable electrical power source. The electrochromic layer (840) comprises at least one pair of electrical conductors (842), (844) are typically opposed one to the other, as shown in FIG. 16, or alternatively nested one within the other, and are adapted to provide a suitable current and/or voltage to said electrochromic layer (840) such as to enable said cell (815) to exhibit a colour change from said first colour to second colour. Typically, a reduction-oxidation reaction is initiated in the said cell (815) when electrical current is passed therethrough, resulting in a colour change from said first colour to said second colour. Said colour change is typically reversible when the current and/or voltage is turned off or alternatively reversed. The said eighth embodiment may be controlled by means of circuit boards (70) as hereinafter described with reference to the second embodiment, mutatis mutandis, wherein said electrical conductors (842), (844) may be considered synonymous with said input and output connection means, (120) and (130), respectively.

The structure of the colour cell (15, 15A), (115), (215), (315), (615), (515), (415) and (815), according to each one of the preferred, second, third, fourth, fifth, sixth seventh or eighth embodiments, respectively, of the present invention is thus simple, enabling the colour cells, and thus the device (10) to be mass produced easily and relatively inexpensively. This leads to a very low unit cost per said device (10), significantly lower, by orders of magnitude, than other display devices known in the art. In fact the unit cost of such said display devices (10) is sufficient low to enable the said device (10) to be regarded as disposable, since it may be discarded after use with relatively negligible loss to the user.

Thus, as hereinbefore described with reference to the preferred through eighth embodiments, the display device (10) of the present invention comprises a substrate (20) carrying a plurality of colour cells, (15, 15A), (115), (215), (315), (615), (515), (415) and (815), respectively. The colour cells, according to each one of the embodiments, may be arranged in any convenient form on the substrate (20), and the colour cells themselves may also have any convenient shape. The colour cells on any particular device (10) may be homogeneously shaped, and at least some colour cells may optionally have a unique shape. For example, the colour cells may be rectangular or circular in shape, and they may then be conveniently arranged in the form of a substantially rectangular grid. Alternatively they may be hexagonally-shaped or in the shape of triangles and the cells may thus be conveniently arranged in the form of a substantially honeycomb-shaped grid. Likewise, circular-shaped cells may also be conveniently arranged in a honeycomb grid pattern. Alternatively, some of the colour cells may be arranged in groups of seven and appropriately shaped to form the known figure-"8" configuration, thus enabling digits from 0 to 9 to be displayed in the traditional manner.

Within the picture display device (10), the said colour cells may be conveniently divided into a first, a second and a third group, the said second colour (42) of the colour cells in said first group being of a red colour, the said second colour (42) of the colour cells of said second group being of a blue colour, and the second colour (42) of the colour cells in said third group being of a green colour. The said first colour (41) may be white or black, for example, or any other colour as desired by the user, or as appropriate to each application. Thus, when any of the colour cells of the first group are activated, they exhibit a change in colour to red, while when any of the colour cells of the second and third group are activated they exhibit a change in colour to blue and green, respectively. Alternatively, the cells in each of the first, second and third groups may be configured so that the colour of the said second colour (42) of each group may comprise a different set of three colours, for example, yellow, magenta and cyan, or any other group of colours. This arrangement eventually allows colour pictures to be displayed by said display device (10). For monochromic pictures, such division of the cells may not be necessary.

Advantageously, the colour cells comprising said three groups are substantially homogeneously distributed over the said substrate.

Typically, each said colour cell (15, 15A), (115), (215), (315), (615), (515), (415) and (815), of the preferred through eighth embodiments, respectively, may have an equivalent diameter of between 0.1 mm and 1 meter, though the said equivalent diameter may alternatively be less that 0.1 mm or greater than 1 meter. Further, the colour cells on any one substrate need not all be the same size or shape. By equivalent diameter is meant the diameter of a round colour cell having the same area as the colour cell in question.

As hereinbefore described with reference to the preferred through eighth embodiments, the display device (10) of the present invention comprises a plurality of colour cells, (15, 15A), (115), (215), (315), (615), (515), (415) and (815), respectively, carried on a substrate (20). The colour cells according to each embodiment are electrically connected, either directly or indirectly to a suitable electrical power source (99). The said power source may comprise a suitable DC battery, or additionally or alternatively a suitable photoelectric cell such as a solar cell, for example. Advantageously, the power source (99) is comprised on said substrate, and may be suitably printed on it in a manner known in the art, particularly in applications when the device (10) is manufactured using similar techniques used for manufacturing microprocessors as well as printed circuits.

Alternatively, the said power source (99) may comprise an AC power source, preferably operatively connected to a suitable rectifier.

While the following description is based on the colour cells (115) of the second embodiment, it also applies to the other embodiments of the colour cells described herein mutatis mutandis.

The said power source (99) may be electrically connected to at least a portion of said colour cells (115) via a frame circuit board (70), said frame circuit board (70) being characterised in providing suitable interconnections between said power source (99) and the input and output connection means, (120) and (130) respectively, of each of the colour cells (115) of the said portion of colour cells. Said portion of colour cells may be chosen such that when the said colour cells of said portion of said colour cells are electrically connected to said power source a predetermined image comprised of each said second colour of each corresponding said colour cells of said portion of colour cells is exhibited by the said device.

Thus, any particular image may be created by the display device (10) by selectively activating some of the color cells (115), while leaving others inactivated. The said frame circuit board (70) thus enables all the necessary colour cells (115) that are required to be activated to be simultaneously connected to the said power source (99) and thus create the image.

Optionally, some said frame circuit boards (70) may not provide any interconnections from the battery to the cells, thereby creating a "blank" image.

Figure 17:
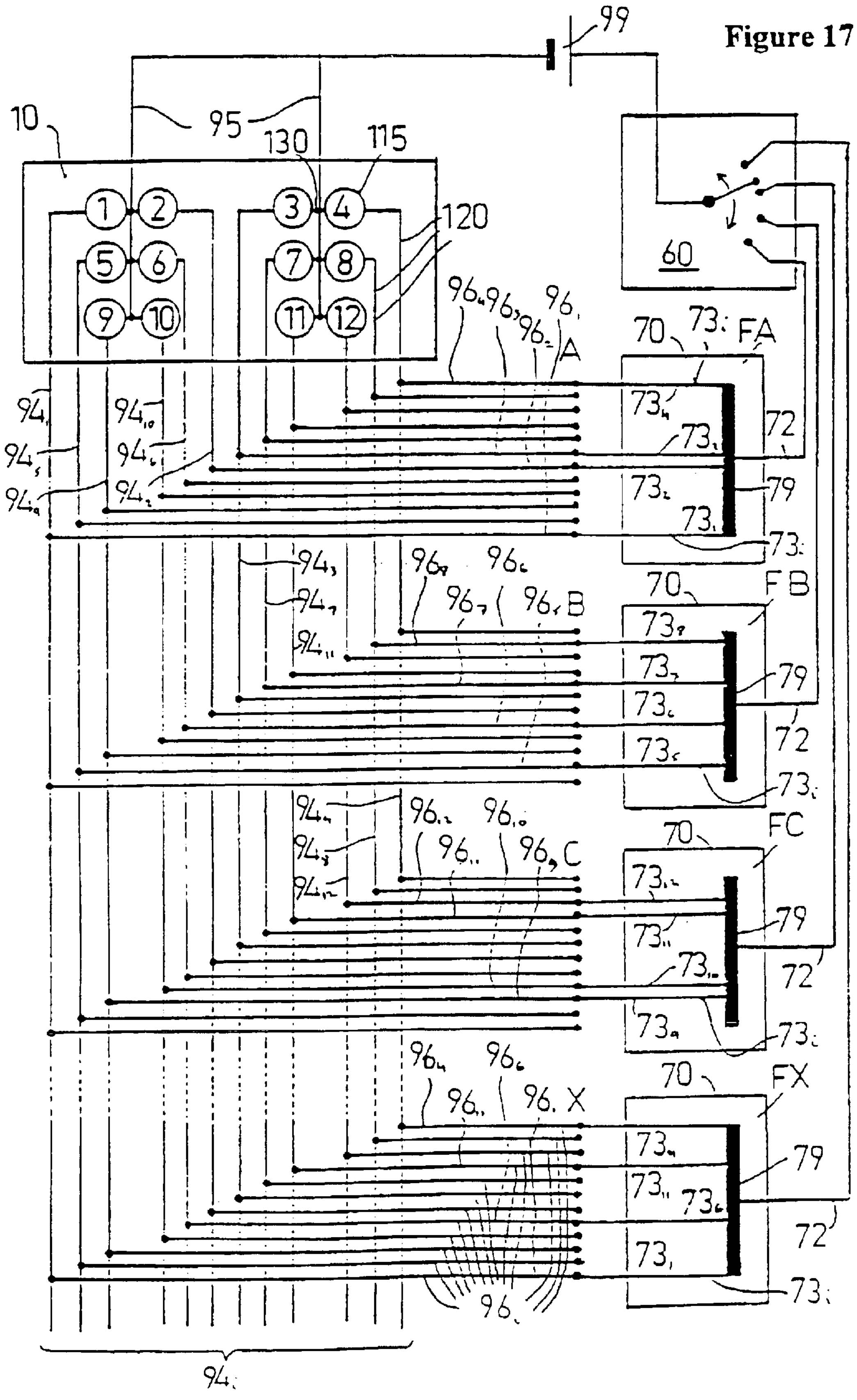
FIG. 17 illustrates schematically one embodiment of a display device comprising a plurality of colour cells illustrated in any one of in FIGS. 1, 2 and 4 to 16, operatively connected to a power source via sequencing means and a plurality of frame circuit boards.
Figure 18:
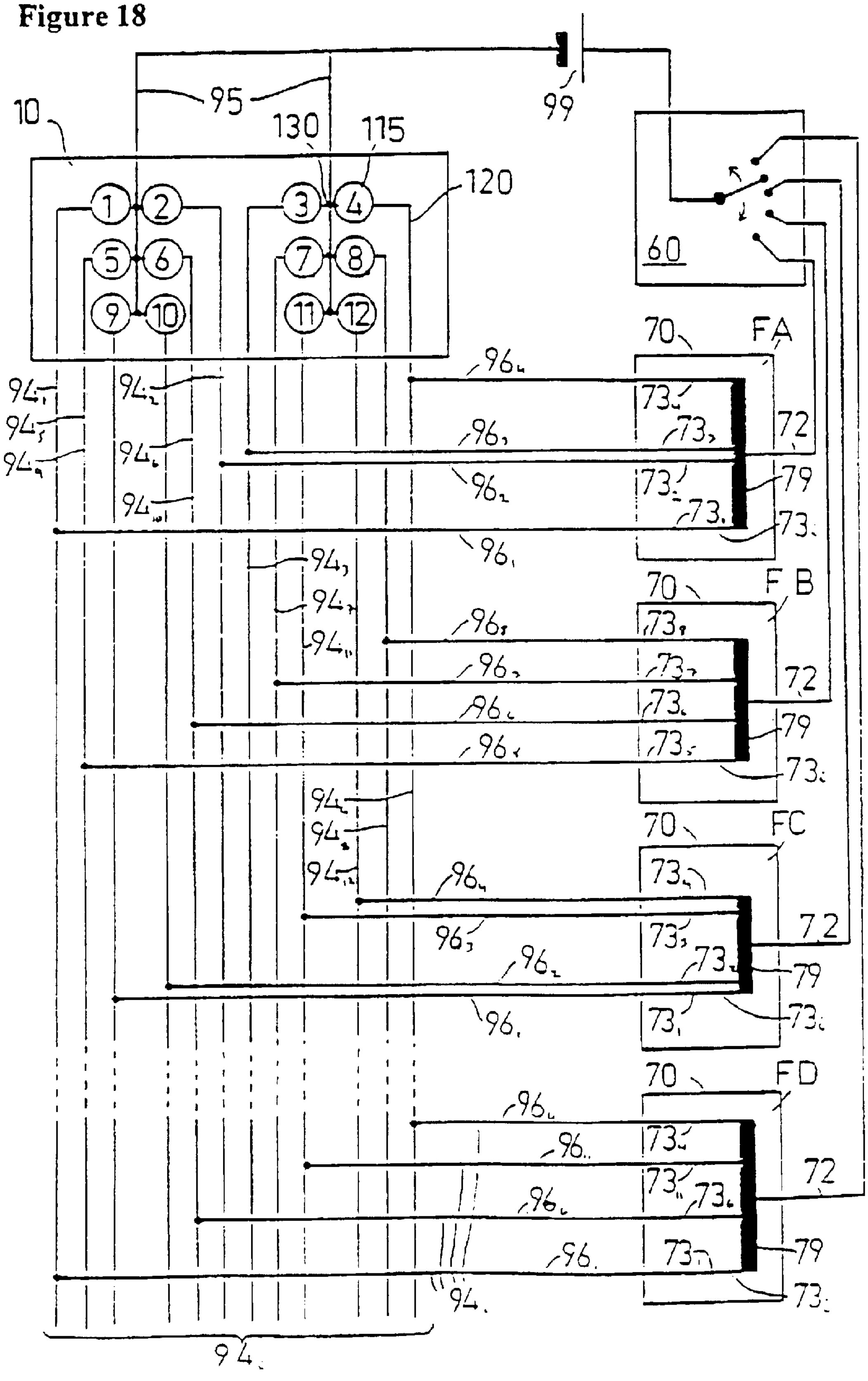
FIG. 18 illustrates schematically another embodiment of a display device comprising a plurality of colour cells illustrated in any one of in FIGS. 1, 2 and 4 to 16, operatively connected to a power source via sequencing means and a plurality of frame circuit boards.

Referring to FIGS. 17 and 18, the device (10) is shown schematically as comprising only twelve colour cells (115) for the sake of simplicity. Of course, in practice the device (10) may comprise from one to virtually any number of colour cells (115) according to the application or need. The colour cells (115) are numbered herein 1 to 12, as illustrated, for convenience. One of the electrical connection means of each cell (115), say the output electrical connection means (130), is connected to a terminal or input/output line of a suitable electrical power source (99). The output connection means (130) of each cell (115) may be individually connected to the said negative terminal, or alternatively by means of one or more common output lines (95), as shown. The other electrical connection means of each cell (115), in this case the input connection means (120), may be electrically connected to corresponding input lines, designated ($94_i$), where the subscript "i" denotes the corresponding number of the colour cell (115), i.e., 1, 2, . . . 12. Said input lines ($94_i$) may be operatively connected to virtually any number of frame circuit boards (70), represented by the dotted lines in FIGS. 17 and 18, as), as hereinafter described.

The said frame circuit board (70) essentially comprises an electrical input line (72), connectable directly or indirectly to said power source (99), said input line (72) branching out, preferably by means of a common conducting element (79), into a number of output lines ($73_i$) (in the present example, from zero up to any combination of said twelve output lines ($73_1$) to ($73_{12}$)), where the subscript "i" denotes the corresponding number of the colour cell (115) to which the output line ($73_i$) will eventually be connected. Thus, for the purposes of example, frame circuit FX in FIG. 17 comprises output lines ($73_4$), ($73_{11}$), ($73_6$) and ($73_1$), which are connected to colour cells 4, 11, 6 and 1, respectively, via lines ($94_4$), ($94_{11}$), ($94_6$) and ($94_1$), respectively as hereinafter described.

In the embodiment shown in FIG. 17, the input lines ($94_i$) are connected in parallel to successive groups (A), (B), (C), . . . (X), of terminals or conductors. Thus, each said group (A), (B), (C) . . . (X), comprises (in the present example) 12 terminals or conductors ($96_1$) to ($96_{12}$) which are connected to the input lines ($94_1$) to ($94_{12}$), respectively.

Thus, the output lines ($73_i$) for each frame circuit board (70) are connected to the corresponding terminals or conductors ($96_i$) of the corresponding group (A), (B), (C) . . . (X) of terminals or conductors. Thus, in the case of frame circuit FX referred to above, output lines ($73_4$), ($73_{11}$), ($73_6$) and ($73_1$), are connected to colour cells 4, 11, 6 and 12, respectively, via terminals or conductors ($96_4$), ($96_{11}$), ($96_6$) and ($96_1$), respectively, and lines ($94_4$), ($94_{11}$), ($94_6$) and ($94_1$), respectively as herein described.

In the embodiment shown in FIG. 18 , the output lines ($73_i$) of each frame circuit board (70) is directly connected to the corresponding input line ($94_i$).

The embodiment shown in FIG. 17 provides any number of groups of terminals or conductors ($96_i$), each group potentially connecting all the cells (115) of the device (10) to any particular fame circuit board. As such, this arrangement enables one design of input lines ($94_i$) and corresponding groups of terminals or conductors ($96_i$) to be designed for use with any number of different frame circuit boards (70), each comprising any desired combinations of lines ($73_i$).

The embodiment of FIG. 18, while perhaps less versatile than that of FIG. 17 and requiring that all the connections from each frame circuit board (70) to be predetermined, it is nonetheless simpler and more spatially economical, resulting in the device (10) being more compact.

The present invention also relates to sequencing means which are novel per se and which enable electrical contact to be established between successive pairs of electrical contacts of a series of consecutive pairs of electrical contacts. Typically, establishing electrical contact with each said pair of contacts closes a unique electrical or electronic circuit.

In particular, the present invention relates to sequencing means (60) enabling the said power source (99) to be selectively connected to only one of a plurality of said frame circuit boards (70) at a time via the corresponding input line (72) thereof. The sequencing means (60) may be configured to connect the power source (99) to any particular one of the said frame circuit boards (70) on demand by a user, and may comprise, for example, a series of suitable discrete on/off switches (each switch operatively connected to a corresponding frame circuit board (70) and preferably operable by a user of the device), enabling the user to connect any particular frame circuit board (70) to the power source (99). Alternatively or additionally, the sequencing means (60) may be configured to connect the power source (99) to any number of the said frame circuit boards (70) in a predetermined sequence.

In particular, the said sequencing means (60) electrically connects said power source (99) to each successive frame circuit board (70) of said plurality of frame circuit boards of a predetermined sequence at a predetermined rate. Said predetermined rate may be between about 1 and about 30 frame circuit board connections per second, and preferably about 15 frame circuit board connections per second. Nonetheless, the said rate may be greater than 30 or lower than 1 frame circuit board connections per second.

As described above, each said frame circuit board (70) may be configured such as to enable a predetermined image to be exhibited by the said device (10), by appropriately choosing which of the colour cells (115) to activate simultaneously. The said predetermined images corresponding to consecutive frame circuit boards (70) may be chosen such as to produce an illusion of movement of an image in correlation to the sequential connection of said plurality of frame circuit boards (70) to said power source (99) by means of said sequencing means (60).

The said sequencing means (60) may further operate in consecutive cycles, whereby in each said cycle the said sequencing means (60) electrically connects said power source (99) to each said frame circuit board (70) of said plurality of frame circuit boards (70) in said predetermined sequence.

Optionally, said sequencing means may comprise a suitably programmed microprocessor chip.

The present invention also relates to a first switch for electrically connecting between at least one pair of electrical conductors comprising:

- a suitable substantially non-electrically-conducting fluid medium in the form of a closed loop and having a free upper surface;
- said closed loop bounded by at least an inner wall and an outer wall, said inner and outer walls being substantially concentric one to the other and comprising an upper inner wall portion and an upper outer wall portion, respectively, protruding from the mean level of the said fluid free surface;
- at least one said pair of conductors, one said conductor of said pair comprising a suitable first electrical contact on said upper inner wall portion, and the other said conductor comprising a suitable second electrical contact on said upper outer wall portion;
- at least one electrically actuable oscillating element immersed in said fluid medium capable of providing at least one travelling wave on said free surface in response to suitable vibrations thereof;
- an electrically-conductive dynamic contact element, substantially on said free surface and capable of being carried by said wave, said contact element extending at least between said first electrical contact and said second electrical contact;
- whereby when said oscillating element is suitably vibrated, at least one travelling wave is provided on said free surface carrying the said dynamic element along said free surface element alternately to a position providing electrical contact between said first contact and said second contact and to a position in which said first contact and said second contact are electrically disconnected.

In particular, one conductor of said pair is electrically connectable to a suitable power source and the other conductor of said pair is connectable to a corresponding frame circuit board.

Optionally, said first contact and said second contact of each said pair of conductors are substantially facing one another.

Optionally, said first switch comprises a plurality of said pairs of conductors, and optionally the said first contact of each of said plurality of said pairs of conductors are electrically interconnected. Further, the said first contact of each of said plurality of said pairs of conductors may be in the form of a suitable single electrical contact. In particular, said single electrical contact may be in the form of a conducting band on said upper inner wall portion.

Optionally, the said second contact of each of said plurality of said pairs of conductors are electrically interconnected, and optionally said second contact of each of said plurality of said pairs of conductors are in the form of a suitable single electrical contact. Further, said single electrical contact is in the form of a conducting band on said upper outer wall portion.

Figure 19A:
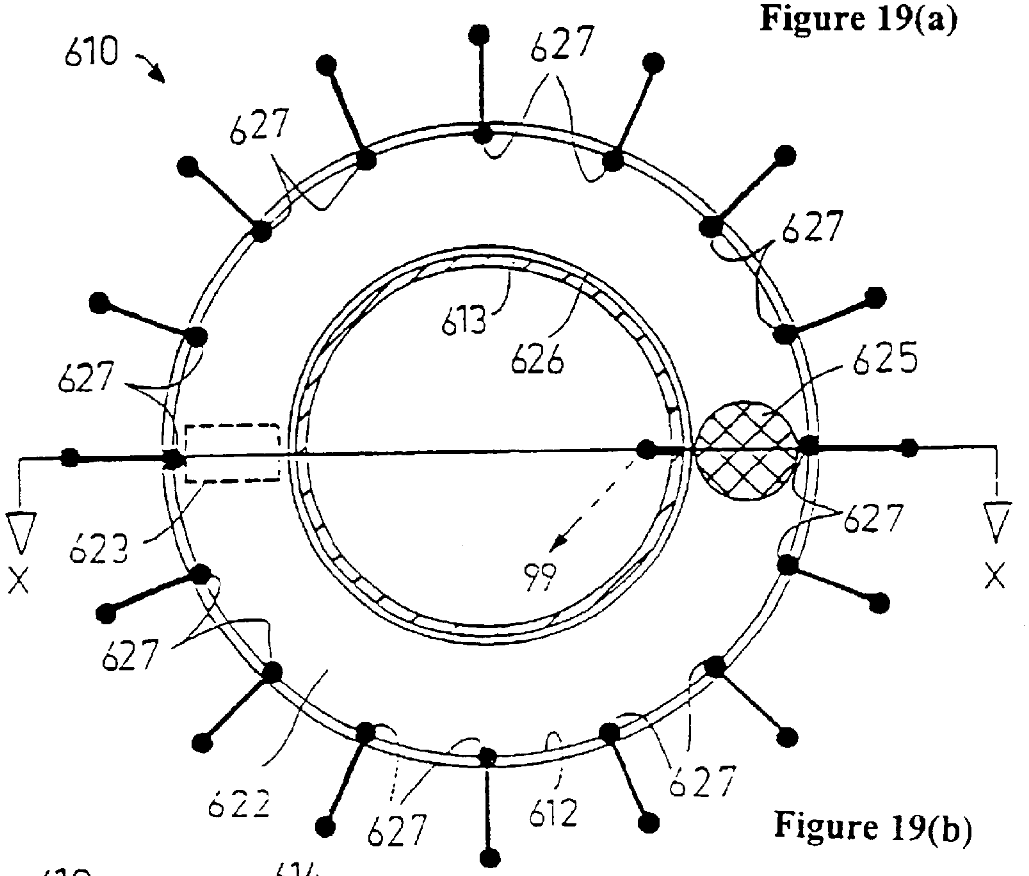
FIG. 19 illustrates a first embodiment of the sequencing means of FIGS. 17 and 18, in plan view (FIG. 19(*a*)) and cross-sectional view (FIG. 19(*b*)) taken along X—X.
Figure 19B:
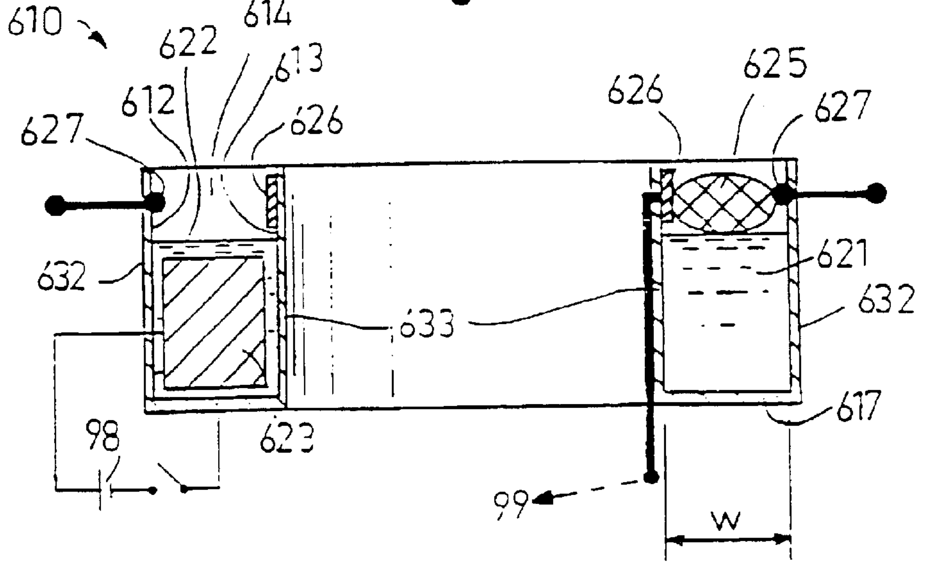

Thus, with reference to FIG. 19, a first embodiment of said sequencing means (60) comprises a first switch (610). Said first switch (610) comprises a channel (611) which is in the form of a closed loop, and in particular a smoothly contoured closed loop. Preferably, said channel (611), and therefore the closed loop, is substantially annular, typically flanked by an inner substantially cylindrical wall (633) having an upper wall inner wall portion (613) and an outer substantially cylindrical wall having an upper outer wall portion (612), and a further comprising a substantially annular base (617) extending between the lower parts of said inner wall portion (613) and said outer wall portion (612). Alternatively, the said channel (611) may be substantially circular, elliptical, superelliptical, polygonal or any other suitable shape. The cross-section of the channel (611), i.e., of each arm thereof, is typically substantially rectangular, but may be partially circular, semicircular, U-shaped, semielliptical partially elliptical or any other suitable shape providing a reasonable free surface (622).

The said channel comprises a substantially non-electrically-conducting fluid medium (621), typically a liquid, having a free upper surface (622). Said fluid medium (621) may comprise, for example oil. An oscillating element (623) connected to a suitable power source (98) is immersed in said liquid medium (621). Typically, said oscillating element (623) comprises a suitably configured piezoelectric crystal, but may alternatively comprise any material which is capable of vibrating when acted on by an electric current, for example a suitable gel or a Polyacrilamid material. The oscillating element (623) is characterised in being able to produce a travelling wave or waves on the free surface (622) of the liquid medium (621) along a desired direction. The oscillating element (623) is operatively connectable to a suitable electrical power source.

The shape of the oscillating element (623) where appropriate is preferably chosen to be complementary with the cross-sectional shape of the channel (611). The said inner wall (633), outer wall (632) and base (617) may be made from any suitable plastic or any other suitable material, preferably as an integrated molded component. Alternatively, the said inner wall (633), outer wall (632) and base (617) may be integrated in the topography of a microprocessor circuit, for example, where appropriate.

Said inner wall portion (613) comprises a first series of inner contact points at least above the level of the said free surface (622). Advantageously, if said first series of inner contact points are all to be ultimately connected to the same electrical point, for example one terminal of an electrical power source (99), said series of inner contact points are cross-connected and comprise a conducting ring (626) on said inner wall portion (613) said ring (626) being at least above the level of the said free surface (622). Said outer wall portion (612) comprises a second series of outer contact points (627) at least above the level of the said free surface (622), each of said outer contact points (627) being connectable to an electrical or electronic circuit. In particular, the said outer contact points (627) may be electrically connected one each to the said input line (72) of a corresponding frame circuit board (70).

The said first switch (610) further comprises a dynamic contact element (625) on said free surface (622) for establishing contact between the said conducting ring (626) (or each corresponding inner contact points) and each of the said outer contact points (627) in turn. Said dynamic contact element (625) is made from an electrically-conductive material, having physical properties enabling the said contact element (625) to remain substantially on the free surface (622). The said dynamic contact element (625) may comprises any suitable liquid, solid or hollow solid, and is preferably in the form of a droplet, bubble or any suitable form including from substantially spherical through substantially cylindrical, floating on said liquid medium (621) while in contact with said inner wall portion (613) and said outer wall portion (612), in particular, ring (626) and said outer contact points (627). Thus, the said contact element (625) may comprise, for example a droplet of non-distilled water, mercury, or a droplet of any other suitable conducting liquid. Typically, said contact element (625) is of a lower density than the said liquid medium (621). Nonetheless, the density of the contact element may be substantially equal to or greater than that of the liquid medium (21), in which case the said contact element may still remain substantially on the surface (622) due to other physical considerations such as, for example, surface tension effects.

When an electrical current activates the said oscillating element (625), it begins to vibrate in a predetermined manner in order to produce waves on the said free surface (622) which travel around the said channel (611) in a predetermined direction and speed. The travelling waves carry the said contact element (625) around the said channel sequentially establishing contact between said conducting ring (626) (or each corresponding inner contact points) and each one of the said outer contact points (627) in turn.

Thus, when the said outer contact points (627) are electrically connected to the said input line (72) of corresponding frame circuit boards (70), and the said conducting ring (626) is connected to the said power source (99) as hereinbefore described, the said first switch (610) enables a series of frame circuit boards (70) to each be individually connected to the power source (99) in a consecutive manner, and thus provide the illusion of a moving image on said device (10), as described hereinbefore. Moreover, since the said channel (611) is in the form of a closed loop, the traveling wave created by the said oscillating element (621) travels around the channel in endless loops until the oscillating element (621) is deactivated, and thus the said frame circuit boards (70) are correspondingly cyclically connected to said power source (99) by the first switch (610).

The first switch (610) may be configured to produce a travelling wave having a velocity such that contact between the conducting ring (626) (or each corresponding inner contact points) and each consecutive outer contact points (627) is established every 1/15 of a second, for example. Optionally, the first switch (610) may also be configured to produce a single or a group of travelling waves such that contact between the conducting ring (626) (or each corresponding inner contact points) is only established with one consecutive outer contact points (627) and maintained there until the next activation of the oscillating element (621).

While the overall diameter of the switch may be virtually of any size, the width (W) of the channel (611) between the said inner wall portion (613) and outer wall portion (612), particularly at the level of said surface (622) is typically between about 0.1 mm and about 10 mm, and preferably about 1 mm.

The present invention also relates to a second switch for electrically connecting between at least one pair of electrical conductors comprising:

- an inner substantially non-electrically-conducting ring and an outer concentric substantially non-electrically-conducting ring;
- at least one said pair of conductors, one said conductor of said pair comprising a suitable first electrical contact on said inner ring, and the other said conductor comprising a suitable second electrical contact on said outer ring;
- an electrically-conductive dynamic contact element, substantially extending at least between said first electrical contact and said second electrical contact;
- a suitable motor suitably operatively connected to at least one of said inner ring, said outer ring and said contact element such as to provide relative rotational motion between said contact element and at least one of said inner ring and said outer ring;
- whereby when said motor provides suitable relative rotational motion between said contact element and at least one of said inner ring and said outer ring, the said dynamic element is brought alternately to a position providing electrical contact between said first contact and said second contact and to a position in which said first contact and said second contact are electrically disconnected.

In particular, one conductor of said pair may be electrically connectable to a suitable power source and the other conductor of said pair may be connectable to a corresponding frame circuit board.

Optionally, said first contact and said second contact of each said pair of conductors are substantially facing one another.

Optionally, said second switch comprises a plurality of said pairs of conductors.

Optionally the said first contact of each of said plurality of said pairs of conductors may be electrically interconnected. Further, the said first contact of each of said plurality of said pairs of conductors may be in the form of a suitable single electrical contact. In particular, said single electrical contact may be in the form of a conducting band on said inner ring.

Optionally, the said second contact of each of said plurality of said pairs of conductors are electrically interconnected, and optionally the said second contact of each of said plurality of said pairs of conductors are in the form of a suitable single electrical contact. Further, said single electrical contact is in the form of a conducting band on said outer ring.

Figure 20A:
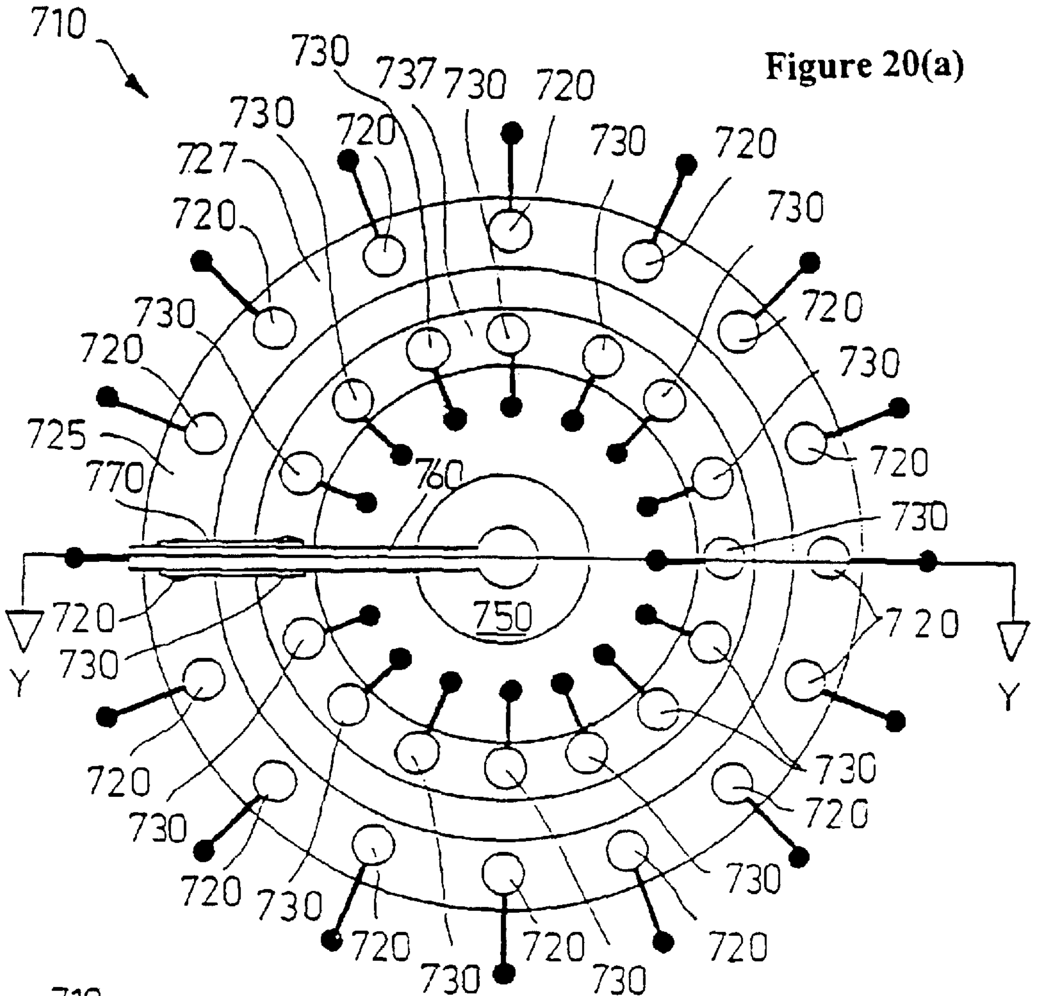
FIG. 20 illustrates a second embodiment of the sequencing means of FIGS. 17 and 18, in plan view (FIG. 20(*a*)) and cross-sectional view (FIG. 20(*b*)) taken along Y—Y.
Figure 20B:
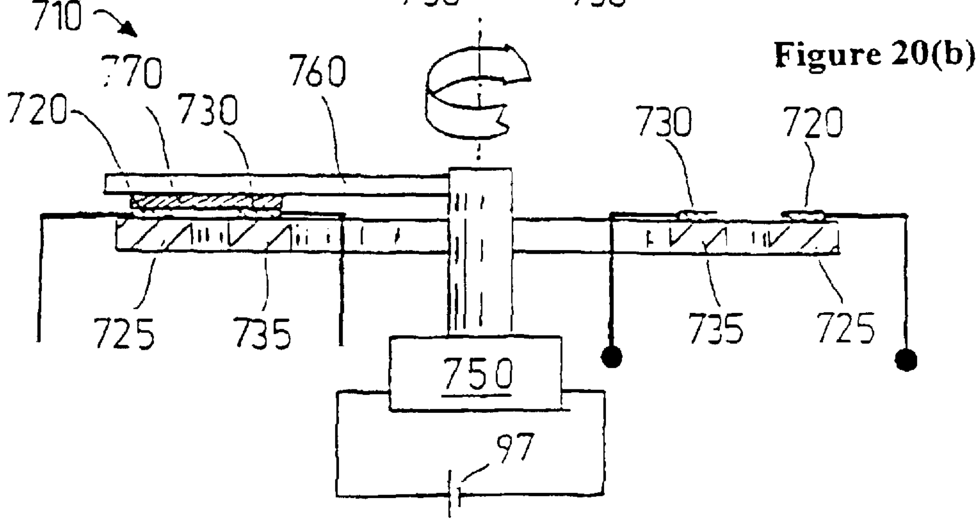

Thus, with reference to FIG. 20, a second embodiment of said sequencing means (60) comprises a second switch (710). Said second switch (710) comprises a flat motor (750) operatively connected to a suitable power source (97), which may be the same power source (99) of the said device (10), said motor (750) operating by means of a suitably configured piezoelectric crystal, for example. Such flat motors are well-known in the art. The second switch (710) further comprises an inner ring (735) and an outer substantially coplanar concentric ring (725), each ring (725), (735) comprising a series of contact points, (720) and (730), respectively.

The motor (750) provides suitable relative rotational motion between a contact element (770) and at least one of said inner ring (735) and said outer ring (725), and the said dynamic element (770) is brought alternately to a position providing electrical contact between said first, or inner, contact point (730) and said second, or outer, contact point (720) and to a position in which said first contact point (730) and said second contact point (720) are electrically disconnected.

Thus, the said dynamic contact element (770) may be relatively static, wherein the said inner ring (735) and outer ring (725) may rotate at substantially equal angular velocities. Optionally, where said series of said outer contacts (720) may be interconnected and comprise, for example, a single conducting ring which is always in contact with said conducting element (770), the said inner ring (735) may be rotated by means of said motor (750), while the outer ring (725) and the said contact element (770) remain substantially static. Alternatively, said series of said inner contacts (730) may be interconnected and comprise, for example, a single conducting ring which is always in contact with said conducting element (770), wherein the said outer ring (725) may be rotated by means of said motor (750), while the inner ring (735) and the said contact element (770) remain substantially static.

Preferably, said inner ring (735) and said outer ring (725) are substantially static, and said dynamic element (770) is suitably carried on a rotor arm (760) operatively connected to said motor capable of rotating about the common axis of said inner ring (735) and said outer ring (725). The contact points (720) and (730) are arranged in pairs such that the inner contact point (730) and the outer contact point (720) of each said pair may be electrically connected by means of said contact element (770). Thus, if the said rotor arm (760) extends radially from the axis of rotation of same, the contacts (720) and (730) of each said pair are disposed at substantially identical angular dispositions on said rings (725) and (735), respectively.

Thus, when the motor (750) rotates the rotor arm (760), the conducting element (770) establishes contact with each pair of contact (720), (730), successively, breaking contact between each previous pair before establishing contact with each subsequent pair, by means of suitable non-conducting spaces (727), (737) between adjacent contacts (720), (730), respectively, in each said ring (725), (735) respectively.

Preferably, said dynamic contact element (770) comprises a suitable electrical conductor.

Where appropriate, either said series of said outer contacts (720) or said series of said inner contacts (730) may be interconnected and comprise instead a single conducting ring which is always in contact with said conducting element (770).

Each of the outer contact (720) and each corresponding inner contact (730) are connectable to an electrical or electronic circuit. In particular, each of said outer contact (720) may be electrically connected to the said input line (72) of each corresponding frame circuit board (70), and the corresponding inner contact (730) of each said pair (or equivalent conducting ring) is connectable to said power source (99). Alternatively, each of said inner contact (730) may be electrically connected to the said input line (72) of each corresponding frame circuit board (70), and the corresponding outer contact (720) of each said pair (or equivalent conducting ring as hereinbefore described) is connectable to said power source (99).

The second switch (710) may be configured to enable said rotor arm (760) to rotate about the motor axis at a velocity such that contact between each consecutive pair of inner contact (730) and outer contact (720) is established every 1/15 of a second, for example. Optionally, the said second switch (710) may also be configured to enable the rotor arm (760) to establish contact with one said pair of outer contact (720) and (730), remaining there until the next activation of the motor (750).

Further, since the motor enables the rotor arm (760) to rotate substantially endlessly about its axis until the motor (750) is deactivated, each consecutive pair of contacts (720) and (730) is electrically interconnected in corresponding cycles. Thus where each of the said frame circuit boards (70) of a plurality of frame circuit boards is connected to one of said contacts (720) or (730) of a said pair, and the other contact (730) or (720), respectively, is connected to said power source (99), the conducting element (770) on the rotor arm (760) interconnects the power source (99) to each consecutive frame circuit board (70) cyclically.

The present invention also relates to a third switch for electrically connecting between a first electrical conductor and a plurality of electrical output conductors comprising:

a base;

a plurality of suitable bimetallic strips, each said bimetallic strip being suitably attached at a first end thereof to said base, said bimetallic strips being reversibly deformable from a first configuration to a second configuration in response to at least a predetermined change in temperature of said bimetallic strip, such that the second end of each said bimetallic strip is correspondingly displaced from a first position to a second position, respectively;

a first electrical conductor electrically connected at least to each said first ends of said bimetallic strips;

a second electrical conductor spaced from said base, said second end of each said bimetallic strip being substantially free to reciprocate between said first position and said second position, respectively capable of establishing and breaking electrical contact between said bimetallic strip and said second electrical conductor;

said first electrical conductor and said second electrical conductor being operatively connectable to a suitable electrical power source;

said bimetallic strips being electrically heatable to at least to said predetermined change in temperature when said second ends thereof are in electrical contact with said second conductor;

a plurality of electrical output conductors, wherein each said output conductor is suitably disposed with respect to said second end of a corresponding said bimetallic strip such that said output conductor may be brought into common electrical contact with said corresponding bimetallic strip and said second conductor only when said corresponding bimetallic strip is in electrical contact with said second conductor;

characterised in that the heating and/or cooling rates of at least one of the said plurality of bimetallic strips may be different from the heating and/or cooling rates, respectively, of at least one other bimetallic strip, wherein said difference in heating and/or cooling rates enables at least one said output conductor to be electrically connected to a corresponding bimetallic strip and said second conductor while at least another said output conductor is concurrently electrically disconnected from its corresponding bimetallic strip and said electrical conductor.

In particular, said first electrical conductor are electrically connectable to a suitable power source and each said electrical output conductor are connectable to a corresponding frame circuit board.

Figure 21A:
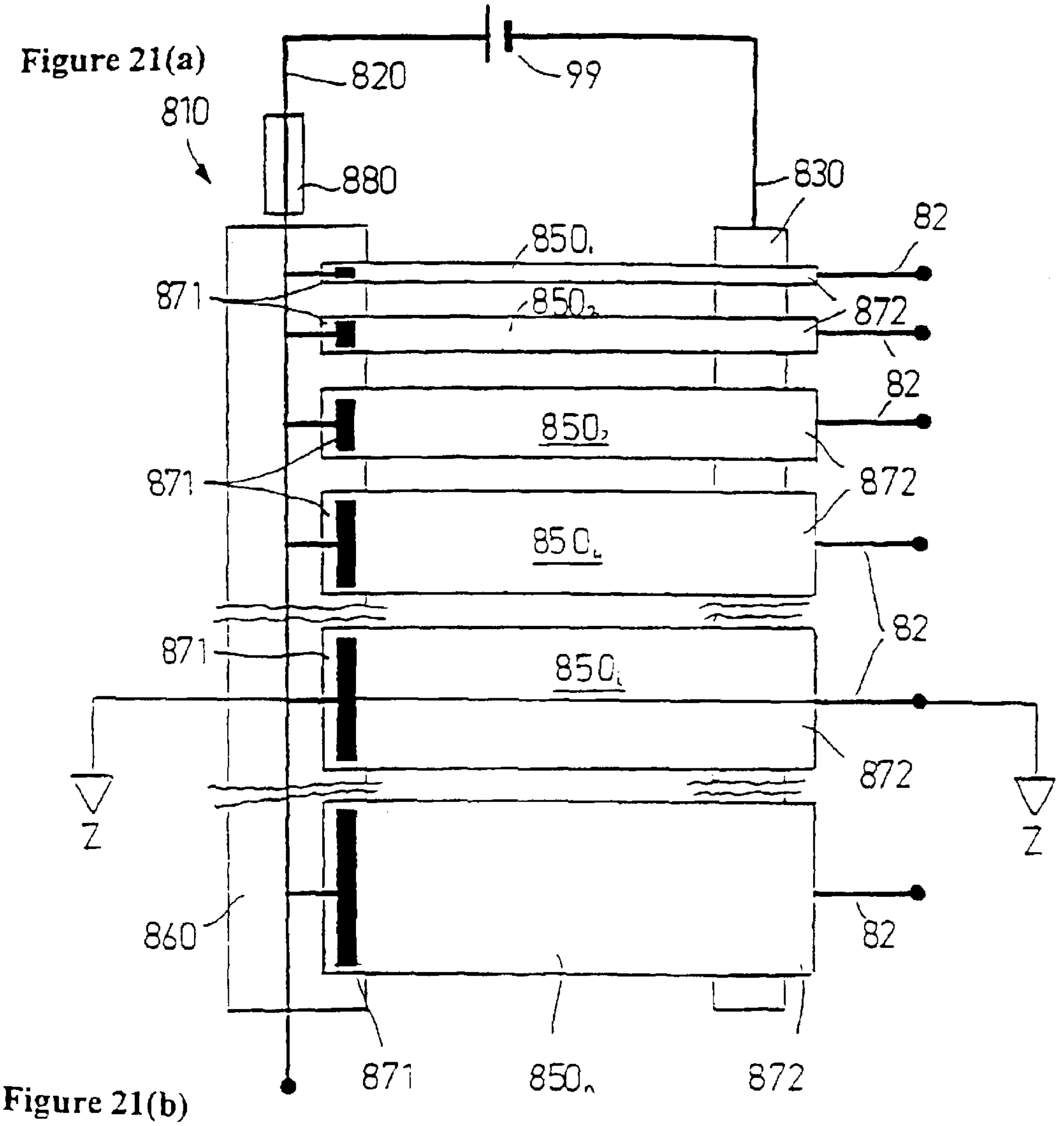
FIG. 21 illustrates a third embodiment of the sequencing means of FIGS. 17 and 18, in plan view (FIG. 21(*a*)) and cross-sectional view taken along Z—Z when a bimetallic strip is connected to an electrical power source (FIG. 21(*b*)) and when disconnected from same (FIG. 21(*c*)).
Figure 21B:
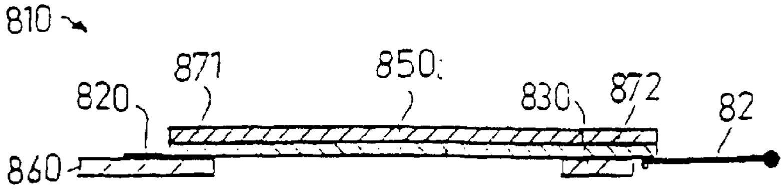
Figure 21C:
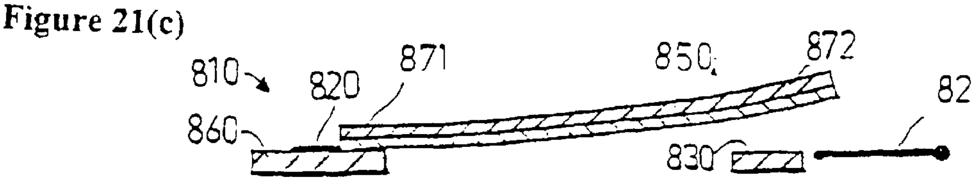

Thus, with reference to FIG. 21, a third embodiment of said sequencing means (60) comprises a third switch (810), comprising a series of "n" bimetallic strips ($850_1$) to ($850_n$) each bimetallic strip ($850_i$) being bonded at a first end (871) thereof to a common base (860), and having as a common electrical input (or output) line first electrical conductor (820). Optionally, said first electrical conductor (820) and said base (860) are integral. The second end (872) of each bimetallic strip ($850_i$) is free, and the bimetallic strips ($850_i$) are all configured having a datum (cold) configuration in which all the said strips ($850_i$) are in contact with a second electrical conductor (830). Preferably, each bimetallic strip ($850_i$) comprises an output conductor (82) capable of being connected to an independent circuit, in particular, to any particular frame circuit board (70) via the corresponding said conductor (72) thereof. Alternatively, said output conductor (82) may be disposed in relation to said second electrical conductor (830) and said second end (872) of each corresponding strip ($850_i$) such that the when strip ($850_i$) is in electrical contact with said second electrical conductor (830), it is also in electrical contact with said corresponding output conductor (82); likewise, electrical contact between said output conductor (82) and said strip ($850_i$), and between said strip ($850_i$) and said second electrical conductor (830) is substantially simultaneous. Said first electrical conductor (820) and second electrical conductor (830) are electrically connected to a suitable power source (99), the flow of current through the bimetallic strips ($850_i$) heating the same and causing each one thereof to bend away from the said second electrical conductor (830) and ultimately break contact therewith. Optionally, each said strip ($850_i$) may comprise a heating element which may be heated electrically when said strip ($850_i$) is electrically connected to said second electrical conductor (830). As each bimetallic strip ($850_i$) breaks contact with the second electrical conductor (830), the strip ($850_i$) immediately begins to cool, and eventually returns to its original position reestablishing contact with said second electrical conductor (830). The cycle is repeated endlessly until the power source (99) is disconnected from the said first electrical conductor (820) or second electrical conductor (830). Whenever any said bimetallic strip ($850_i$) is in contact with said second electrical conductor (830), the corresponding conductor (82) of the bimetallic strip ($850_i$) enables a corresponding external circuit to be closed, in particular connecting a corresponding frame circuit board (70), to the power source (99).

The said bimetallic strips ($850_i$) are characterised in that each strip ($850_i$) has different heating and cooling rates one from the other strips ($850_i$), said bimetallic strips ($850_i$) being preferably arranged on said first electrical conductor (820) in descending order with respect to heating and cooling rates. In other words, the last bimetallic strip ($850_n$) has a slower heating and cooling rate than its neighbour strip ($850_{n-1}$), than its neighbour ($850_{n-2}$) and so on until the first bimetallic strip ($850_1$), which has the highest heating and cooling rate. Alternatively, the bimetallic strips ($850_i$) may be arranged in any order whatsoever, in terms of their relative heating and/or cooling rates. The differences in the heating and cooling rates between each of the bimetallic strips (850$_i$) may be achieved, for example, by correspondingly altering the thickness or width of each strip (850$_i$).

Thus, when the said power source (99) is electrically connected to said conductors (820) and (830), initially all the strips (850$_i$) are in contact with the second electrical conductor (830) and begin to heat up. At the same time, the individual frame circuit boards (70) connected to the corresponding strips (850$_i$) are activated by closing the circuits between said frame circuit board and the power source (99), thereby activating all the cells (115) of the device (10), as defined by the sum of all the conductors (73$_i$) of all the frame circuit boards (70). The resulting image is thus a superposition of all the images together corresponding to the frame circuit boards (70). As the bimetallic strips (850$_i$) heat up, the first strip (850$_i$) disconnects first from the second electrical conductor (830), followed by the second strip (850$_2$) and so on up to the last strip (850$_i$). The strips (850$_1$) are also characterised in that the heating and cooling rates of each strip (850$_i$) in relation to the corresponding rates of another strip, for example an adjacent strip (850$_{i+1}$) or (850$_{i-1}$) are such that after all the strips (850$_i$) are initially heated and disconnected from the said second electrical conductor (830), only one strip (850$_i$) at any one time reconnects with said second electrical conductor (830). Thus, after all the strips have been initially heated and disconnected from the second electrical conductor (830), the first bimetallic strip (850$_1$) has been cooling down the longest and reestablishes contact with the second electrical conductor (830), thus activating a frame circuit board (70) connected to the strip (850$_1$) via conductor (82). On reestablishing contact with second electrical conductor (830), the strip (850$_1$) begins to heat again and disconnects from the conductor (830), also disconnecting the corresponding (first) frame circuit board (70) from the power source (99). By this time, the second strip (850$_2$) reestablishes contact with the conductor (830), enabling the second frame circuit board (70) to be activated, the strip (850$_2$) itself becoming heated and subsequently disconnecting from the second electrical conductor (830). Similarly, each strip (850$_i$) in turn connects to and subsequently disconnects from the second electrical conductor (830), according to the order of the relative heating and cooling rates of the strips (850$_i$), which is not necessarily the order in which the strips (850) are arranged in said third switch (810), enabling each subsequent frame circuit board (70) to be activated in turn. By the time the last of the strips (850$_i$) connects with and disconnects from the said second electrical conductor (830), the first strip (850$_1$) has cooled down sufficiently to reestablish contact with the second electrical conductor (830), beginning a new cycle. Optionally, the heating and cooling rates of the said strips (850$_i$) may be chosen so that there is a certain "overlap" in the image displayed by the device (10) between a preceding and a subsequent image, in that the corresponding strips (850$_i$) are simultaneously connected at least for a predetermined length of time before one of the said strips (850$_i$) disconnects from said second electrical conductor (830).

Optionally, the said first electrical conductor (820) and said second electrical conductor (830) are substantially parallel. Further optionally, said plurality of bimetallic strips (850$_i$) are substantially parallel one to another.

Optionally, the said third switch (810) may further comprise at least one common bimetallic strip (880) connected in series with the said first electrical conductor (820) and/or said second electrical conductor (830). Initially, the common bimetallic strip (880) is in contact with the said first electrical conductor (820) or second electrical conductor (830), enabling current to flow through the said third switch (810), but when heated sufficiently, the common bimetallic strip (880) breaks contact with the first electrical conductor (820) or second electrical conductor (830), thereby effectively disconnecting the said third switch (810) from the power source (99). The heating and cooling rate of the said common bimetallic strip (880) is preferably chosen such as to enable the said common bimetallic strip (880) to remain in contact with the said first electrical conductor (820) or second electrical conductor (830), until the end of one cycle, as hereinbefore described. Thus, said at least common bimetallic strip has a heating rate which is substantially slower than the heating rate of any one of said plurality of bimetallic strips, and preferably also a cooling rate which is substantially slower than the heating rate of any one of said plurality of bimetallic strips.

The said common bimetallic strip (880) disconnects the power source (99) from the said third switch (810), enabling all the strips (850$_i$) to cool down and resume contact with the said second electrical conductor (830), after which the common bimetallic strip (880) itself cools down and reconnects the power source (99) to the said third switch (810) to begin a new cycle.

The present invention also relates to a fourth switch for electrically connecting between a first electrical conductor and a plurality of electrical output conductors comprising:

a base;

a plurality of suitable piezoelectric elements, each said piezoelectric element being suitably attached at a first end thereof to said base, each said piezoelectric element being vibratory between a first amplitude and a second amplitude in response to the supply of a suitable electrical current and/or voltage to said piezoelectric element, such that the second end of each said piezoelectric elements is correspondingly displaced from a first position to a second position, respectively;

a first electrical conductor electrically connected at least to each said first ends of said piezoelectric elements;

a second electrical conductor spaced from said base, said second end of each said piezoelectric elements being substantially free to reciprocate between said first position and said second position, respectively capable of establishing and breaking electrical contact between said piezoelectric elements and said second electrical conductor;

said first electrical conductor and said second electrical conductor being operatively connectable to a suitable electrical power source;

said piezoelectric elements being vibratory when said second ends thereof are in electrical contact with said second conductor;

a plurality of electrical output conductors, wherein each said output conductor is suitably disposed with respect to said second end of a corresponding said piezoelectric element such that said output conductor may be brought into common electrical contact with said corresponding piezoelectric element and said second conductor only when said corresponding piezoelectric element is in electrical contact with said second conductor;

characterised in that the phase of vibration of at least one of the said plurality of piezoelectric elements may be different from the phase of vibration of at least one other piezoelectric element, wherein said phase difference enables at least one said output conductor to be electrically connected to a corresponding piezoelectric element and said second conductor while at least another said output conductor is concurrently electrically disconnected from its corresponding piezoelectric element and said electrical conductor.

In particular, said first electrical conductor is electrically connectable to a suitable power source and each said electrical output conductor is connectable to a corresponding frame circuit board.

Figure 22A:
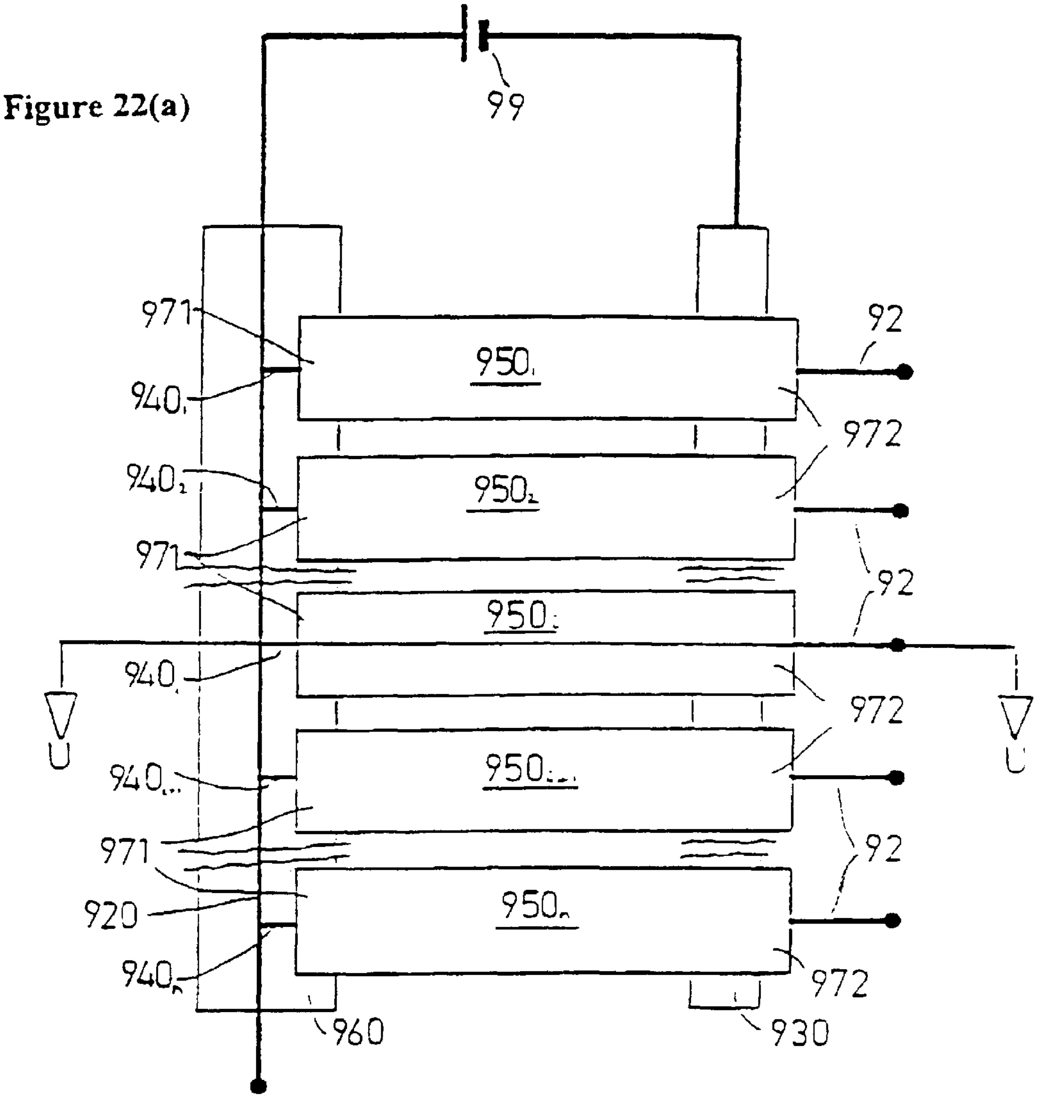
FIG. 22 illustrates a fourth embodiment of the sequencing means of FIGS. 17 and 18, in plan view (FIG. 22(*a*)) and cross-sectional view taken along U—U when a piezoelectric element is connected to an electrical power source (FIG. 22(*b*)) and when disconnected from same (FIG. 22(*c*)).
Figure 22B:
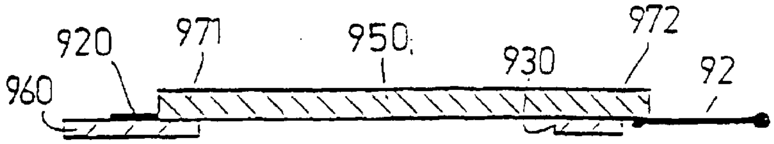
Figure 22C:
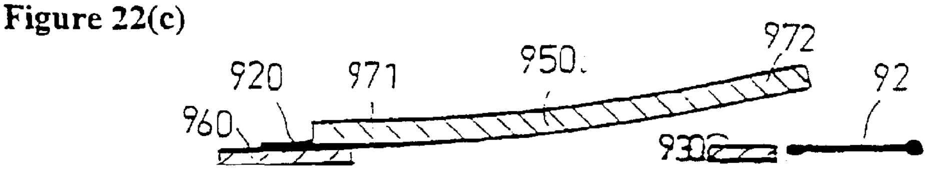

Thus, with reference to FIG. 22, a fourth embodiment of said sequencing means (60) comprises a fourth switch (910), comprising a series of "n" piezoelectric elements (950$_1$) to (950$_n$) in the form of relatively thin strips, each piezoelectric element (950$_i$) being bonded at a first end (971) thereof to a common base (960), and each piezoelectric element (950$_i$) having a conductor (940$_i$) connected to a common electrical input (or output) line or first electrical conductor (920). Preferably, said first electrical conductor (920) and said base (960) are integral. The second end (972) of each piezoelectric element (950$_i$) is free, and the piezoelectric elements (950$_i$) are all configured having a datum (unexcited) configuration in which all the said piezoelectric elements (950$_i$) are in contact with a second electrical conductor (930). Preferably, each piezoelectric element (950$_i$) comprises an output conductor (92) capable of being connected to an independent circuit, in particular, to any particular frame circuit board (70) via the corresponding said conductor (72) thereof. Alternatively, said output conductor (92) may be disposed in relation to said second electrical conductor (930) and said second end (972) of each piezoelectric element (950$_i$) such that the when piezoelectric element (950$_i$) is in electrical contact with said second electrical conductor (930), it is also in electrical contact with said corresponding output conductor (92); likewise, electrical contact between said output conductor (82) and said piezoelectric element (950$_i$), and between said piezoelectric element (950$_i$) and said second electrical conductor (930) is substantially simultaneous. Said first electrical conductor (920) and second electrical conductor (930) are electrically connected to a suitable power source (99), the flow of current through the piezoelectric elements (950$_i$) exciting the same and causing each one thereof to bend away from the said second electrical conductor (930) and ultimately break contact therewith. As each piezoelectric element (950$_i$) begins to oscillate, it alternately breaks contact with the second electrical conductor (930) and returns to its original position reestablishing contact with said second electrical conductor (930). The cycle is repeated endlessly until the power source (99) is disconnected from the said first electrical conductor (920) or second electrical conductor (930). Whenever any said piezoelectric element (950$_i$) is in contact with said second electrical conductor (930), the corresponding conductor (92) of the piezoelectric element (950$_i$) enables a corresponding external circuit to be closed, in particular connecting a corresponding frame circuit board (70), to the power source (99).

Optionally, said first electrical conductor (920) and said second electrical conductor (930) are substantially parallel. Further optionally, said plurality of piezoelectric elements (950$_i$) are substantially parallel one to another.

The oscillation rates of all the piezoelectric elements (950$_i$) are set to be substantially equal, so that they all take the same time to connect to the said second electrical conductor (930), as well as to disconnect therefrom.

Further, the period of time in which each piezoelectric element (950$_i$) is disconnected from said second electrical conductor (930), i.e., the disconnect time (T1), is typically set to be greater than the period of time in which each piezoelectric element (950$_i$) is connected to said second electrical conductor (930), i.e., the connect time (T2).

The piezoelectric elements (950$_i$) are advantageously configured such that the disconnect time (T1) is equal or greater than the sum total of the connect times (T2) of all the piezoelectric elements (950$_i$) in the said fourth switch (910), in other words:

$$T1 \geqq (n.T1)$$

Thus, the said fourth switch may be configured so that after the first piezoelectric element (950$_1$) connects to and subsequently disconnects from said second electrical conductor (930), each subsequent piezoelectric element (950$_i$) begins its connect disconnect cycle just after disconnection of the preceding piezoelectric element (950$_{i-1}$), such that at any one time not more than one piezoelectric element (950$_i$) is connected to the said second electrical conductor (930). Nonetheless, the disconnect time (T1) may be set to be smaller than the sum total of the connect times (T2), providing is a certain "overlap" in the image displayed by the device (10) between a preceding and a subsequent image, in that the corresponding piezoelectric elements (950$_i$) are simultaneously connected to said second electrical conductor (930) at least for a predetermined length of time before one of the said piezoelectric elements (950$_i$) disconnects from said second electrical conductor (930).

Such an arrangement regarding the relative start times for the oscillations i.e., the difference in phase of vibration between adjacent piezoelectric elements, may be achieved by live-connecting the said power source (99) to said first ends (971) of said plurality of piezoelectric elements (950$_i$) at a predetermined rate. Thus, during the last stages of manufacture of the said fourth switch (910), each of the piezoelectric elements (950$_i$) is bonded to said common base (960) and is in contact with said second electrical conductor (930). The power source (99) is then connected to said second electrical conductor (930), and then first electrical conductor (920) is formed on said base (960), such that the first electrical conductor (920) successively establishes contact with each subsequent piezoelectric element (950$_i$) of the fourth switch (910) while the said first electrical conductor (920) is live, i.e., all the time connected to the power source (99). This may be achieved by suitable printing methods, for example, in which the electrical conductor (920) is printed in the form of a conducting ink on said base (960) by means of a suitable applicator, such that the connection of first electrical conductor (920) to each successive piezoelectric element (950$_i$) occurs at a particular time interval after the connection of the preceding piezoelectric element (950$_{i-1}$). Thus, when connection is initially established between the said first electrical conductor(920) and the first piezoelectric element (950$_1$), via the corresponding conductor (940$_1$), the said first piezoelectric element (950$_1$) begins its oscillation cycles and continues until, typically, the power source is disconnected or is exhausted. The first electrical conductor (920) is then continued to be formed on the said base (960) such as to reach and establish contact with each subsequent piezoelectric element (950$_i$) at a certain time interval ΔT after having established contact with the previous piezoelectric element (950$_{i-1}$). The interval ΔT is advantageously chosen to be not smaller than the time taken by the preceding piezoelectric element (950$_i$) to disconnect from the said second electrical conductor (930). In this way, the piezoelectric elements (950$_1$) all have oscillation start times which are slightly delayed with respect to the preceding piezoelectric element ($950_{i-1}$). Since the disconnect time (T1) of each of the piezoelectric elements ($950_i$) is greater than the sum total of the connect times (T2) of all "n" piezoelectric elements ($950_1$), the first piezoelectric element ($950_1$) once connected to the power source (99) via said first electrical conductor (920), will not reestablish contact with said second electrical conductor (930) until at least the last piezoelectric element ($950_n$) has been disconnected from the said second electrical conductor (930), thereby commencing another cycle. Alternatively, said time interval ΔT may be chosen in order to create any desired degree of overlap between some or all consecutive images, as hereinbefore described, for example.

Thus, once the common line first electrical conductor (920) has been connected to all the piezoelectric elements ($950_i$), each one of said piezoelectric elements ($950_i$) will be in turn connected to said second electrical conductor (930), thus activating a corresponding frame circuit board (70) connected to the piezoelectric element ($950_1$) via conductor (92).

The structure of the said sequencing means (60), according to each one of the first, second, third, and fourth, embodiments, respectively, thereof is thus relatively simple, enabling the sequencing means (60), and thus also the device (10) incorporating the same to be mass produced easily and relatively inexpensively. This leads to a very low unit cost per said sequencing means (60) and/or said device (10), significantly lower, by orders of magnitude, than other display devices known in the art. In fact the unit cost of such said sequencing means (60) individually or incorporated in said display devices (10) is sufficient low to enable the said sequencing means (60), as well as said device (10) incorporating same, to be regarded as disposable, since it may be discarded after use with relatively negligible loss to the user.

The picture display device (10) according to any one of the said embodiments described herein may be used in any number of applications, including the following applications, for example.

The said device (10) according to any one of the said embodiments described herein may be attachable to an article of manufacture or to packaging means, in particular, wherein said device is integral with said packaging means.

Optionally, the said device (10) according to any one of the said embodiments described herein may further comprise suitable interface means for using said device as a suitable display screen optionally for use with a computer, television/video means or telephone means. Such an interface would enable the display signals from the computer, television/video means or telephone means to be converted to a form compatible for use with the device (10). For example, with respect to a device (10) comprising cells (15) and/or (15A) according to the first aspect and/or second aspect of the preferred, first embodiment, wherein the cells (15) and/or (15A) are controlled by means of input lines (L1) and (L2), and a microprocessor (91) as hereinbefore described, the interface would serve to control the voltage and/or current to these lines according to the image being displayed, given the particular format of the display signals received from the computer, television/video means or telephone means, the said format being preprogrammed into the interface. For said device (10) comprising colour cells according to any one of the preferred through eighth embodiments, the interface comprises all necessary connections to all the cells of the device (10), and further controls the voltage and/or current to each cell according to the image being displayed, given the particular format of the display signals received from the computer, television/video means or telephone means, the said format being preprogrammed into the interface.

Optionally, the said device (10) according to any one of the said embodiments described herein may comprise frame circuit cards that are suitably configured such as to enable said device to display images corresponding to normally-printed matter, i.e. textual and image material that is normally or predominantly found in printed form, including texts and pictures. Such normally-printed matter may include any book, newspaper, magazine, booklet, manual, greeting card, personal card, seasonal card, visiting card, advertisement card, postage and other stamp, postcard, sticker, label, poster, banner, flag, emblem, badge, prospectus, illustration guide, map, picture, and printed propaganda, among others.

Optionally, the said device (10) according to any one of the said embodiments described herein may further comprise suitable chronometer means operatively connected thereto, wherein said frame circuit cards are suitably configured such as to enable said device to display images corresponding to the time and/or the date. Such chronometer means advantageously comprises an interface means for connecting to and controlling the cells of the device (10), optionally as described herein with reference to computer, television/video means or telephone means, mutatis mutandis.

Optionally, the said device (10) according to any one of the said embodiments described herein may further comprise suitable meter means operatively connected thereto, wherein said frame circuit cards are suitably configured such as to enable said device to display images corresponding to the magnitude of a variable quantified by said meter. Such meter means advantageously comprises an interface means for connecting to and controlling the cells of the device (10), optionally as described herein with reference to computer, television/video means or telephone means, mutatis mutandis.

Optionally, the said device (10) according to any one of the said embodiments described herein may further comprise suitable chronometer means operatively connected thereto, wherein said frame circuit cards are suitably configured such as to enable said device to display different images according to the current to the time and/or the date. Such chronometer means advantageously comprises an interface means for connecting to and controlling the frame circuit cards of the device (10), optionally as described herein with reference to computer, television/video means or telephone means, mutatis mutandis.

Optionally, the said device (10) according to any one of the said embodiments described herein may be suitably configured as a traffic or road sign. Such traffic or road signs advantageously comprise an interface means for connecting to and controlling the cells of the device (10), optionally as described herein with reference to computer, television/video means or telephone means, mutatis mutandis.

Optionally, the said device (10) according to any one of the said embodiments described herein may be adapted for use as a lottery ticket. Such lottery tickets advantageously comprise an interface means for connecting to and controlling the cells of the device (10), optionally as described herein with reference to computer, television/video means or telephone means, mutatis mutandis.

Optionally, the said device (10) according to any one of the said embodiments described herein may be adapted for use as a credit card. Such credit cards advantageously comprise an interface means for connecting to and controlling the cells of the device (10), optionally as described herein with reference to computer, television/video means or telephone means, mutatis mutandis.

Optionally, the said device (10) according to any one of the said embodiments described herein may be adapted for use as an identity card or identity document. Such ID cards or identity document advantageously comprises an interface means for connecting to and controlling the cells of the device (10), optionally as described herein with reference to computer, television/video means or telephone means, mutatis mutandis.

Optionally, the said device (10) according to any one of the said embodiments described herein may be adapted for use as a billboard for outdoor use. Such billboards advantageously comprise an interface means for connecting to and controlling the cells of the device (10), optionally as described herein with reference to computer, television/video means or telephone means, mutatis mutandis.

Optionally, said picture display device (10) according to any one of the said embodiments described herein may be adapted for use as a display for an in-flight entertainment system. Such in-flight entertainment systems advantageously comprise an interface means for connecting to and controlling the cells of the device (10), optionally as described herein with reference to computer, television/video means or telephone means, mutatis mutandis.

Optionally, said picture display device (10) according to any one of the said embodiments described herein may be adapted for use as a display for an electronic or electromechanical slot-machine. Such slot-machines advantageously comprise an interface means for connecting to and controlling the cells of the device (10), optionally as described herein with reference to computer, television/video means or telephone means, mutatis mutandis.

Optionally, said picture display device (10) according to any one of the said embodiments described herein may be adapted for use as a display of an electronic game. Such electronic games advantageously comprise an interface means for connecting to and controlling the cells of the device (10), optionally as described herein with reference to computer, television/video means or telephone means, mutatis mutandis.

Although only a few embodiments have been described in detail in the foregoing description, the present invention is not limited thereto and is only defined by the scope of the claims.

What is claimed is:

1. A picture display device comprising a suitable substrate carrying a plurality of colour cells wherein each colour cell is capable of exhibiting a change in its external colour from a first colour to a second colour, each said colour cell comprising: an upper substantially transparent layer comprising an inverted substantially transparent prismatic element protruding from a lower surface thereof, said transparent layer being superposed over said substrate and distanced therefrom by suitable spacing means; a substantially transparent movable element comprising an upper concavity complementary to and substantially aligned with said prismatic element, said movable element capable of being displaced a first distance between a first position and a second position, wherein in said first position said concavity is spaced from said prismatic element by a predetermined spacing, and wherein in said second position said concavity is substantial direct optical contact with said prismatic element; a colour layer comprising said second colour disposed below said movable element and in optical communication therewith; guiding means for enabling said movable element to reciprocate between said first position and said second position; at least one actuator element in abutting contact with said movable element comprising at least one suitable electrical input connection means and at least one suitable electrical output connection means capable of connecting said actuator element to a suitable electrical power source, said actuator element characterised in being capable of increasing at least one dimension thereof in the direction of displacement of said movable element by said first distance in response to the supply of a predetermined voltage and/or current thereto, thereby displacing said movable element to said first position; whereby said at least one actuator element increases said at least one dimension thereof by said first distance in response to the supply of a predetermined voltage and/or current to said actuator element, thereby propelling said movable element from said first position to said second position and bringing said concavity is substantial direct optical contact with said prismatic element thereby enabling said second colour on said colour layer to be exhibited by said colour cell, and whereby said actuator element returns to its datum dimension when said electrical power source is subsequently disconnected or alternatively when the polarity of the said voltage and/or current supply is reversed, returning said movable element to the said first position and establishing said spacing between said prismatic element and said concavity, said prismatic element having a configuration such as to internally reflect light entering said cell via said upper transparent layer thereby enabling said colour cell to exhibit a first colour as determined by the reflection of external light by said prismatic element.

2. A picture display device comprising a suitable substrate carrying a plurality of colour cells wherein each colour cell is capable of exhibiting a change in its external colour from a first colour to a second colour, each said colour cell comprising: a first, upper, substantially transparent layer comprising an inverted substantially transparent prismatic element protruding from a lower surface thereof; said transparent layer being superposed over: a second, lower, substantially transparent layer comprising an upper concavity complementary to and substantially aligned with said prismatic element, said second transparent layer being superposed over said substrate; said first transparent layer capable of being displaced a first distance between a first position and a second position, wherein in said first position said concavity is substantial direct optical contact with said prismatic element, and wherein in said second position said concavity is spaced from said prismatic element by a predetermined spacing; a colour layer comprising said first colour disposed below said second transparent layer and in optical communication therewith; at least one actuator element in abutting contact with first transparent layer comprising at least one suitable electrical input connection means and at least one suitable electrical output connection means capable of connecting said at least one actuator element to a suitable electrical power source, said at least one actuator element characterised in being capable of increasing at least one dimension thereof in the direction of displacement of said first transparent layer by said first distance in response to the supply of a predetermined voltage and/or current thereto, thereby displacing said first transparent layer to said first position; whereby said actuator element increases said at least one dimension thereof by said first distance in response to the supply of a predetermined voltage and/or current to said actuator element, thereby propelling said first transparent layer from said first position to said second position and establishing said spacing between said prismatic element and said concavity, said prismatic element having a configuration such as to internally reflect light entering said cell via said upper transparent layer thereby enabling said colour cell to exhibit a second colour as determined by the reflection of external light by said prismatic element, and whereby said actuator element returns to its datum dimension when said electrical power source is subsequently disconnected or alternatively when the polarity of the said voltage and/or current supply is reversed, returning said first transparent layer to the said first position and bringing said concavity is substantial direct optical contact with said prismatic element thereby enabling said first colour on said colour layer to be exhibited by said colour cell.

* * * * *